United States Patent
Breskvar et al.

(10) Patent No.: US 12,197,608 B2
(45) Date of Patent: Jan. 14, 2025

(54) INTER SYSTEM POLICY FEDERATION IN A DATA-DRIVEN SECURE AND SAFE COMPUTING ENVIRONMENT

(71) Applicant: Beyond Semiconductor, d.o.o., Ljubljana-Crnuce (SI)

(72) Inventors: Matjaž Breskvar, Ljubljana (SI); Uroš Čibej, Logatec (SI); Jurij Mihelič, Kamnik (SI)

(73) Assignee: BEYOND SEMICONDUCTOR, D.O.O., Ljubljana-Crnuce (SI)

( * ) Notice: Subject to any disclaimer, the term of this patent is extended or adjusted under 35 U.S.C. 154(b) by 80 days.

(21) Appl. No.: 17/740,154

(22) Filed: May 9, 2022

(65) Prior Publication Data

US 2022/0391525 A1    Dec. 8, 2022

Related U.S. Application Data

(60) Provisional application No. 63/186,446, filed on May 10, 2021.

(51) Int. Cl.
G06F 21/62    (2013.01)

(52) U.S. Cl.
CPC ................ *G06F 21/6218* (2013.01)

(58) Field of Classification Search
None
See application file for complete search history.

(56) References Cited

U.S. PATENT DOCUMENTS

| | | | |
|---|---|---|---|
| 4,573,119 | A  | 2/1986  | Westheimer et al. |
| 5,608,861 | A  | 3/1997  | Mead et al. |
| 6,219,706 | B1 | 4/2001  | Fan et al. |
| 6,272,533 | B1 | 8/2001  | Browne |
| 6,986,052 | B1 | 1/2006  | Mittal |
| 7,203,844 | B1 | 4/2007  | Oxford |
| 7,386,841 | B2 | 6/2008  | Huang et al. |
| 7,590,644 | B2 | 9/2009  | Matsakis et al. |
| 8,332,660 | B2 | 12/2012 | Paver et al. |
| 8,438,392 | B2 | 5/2013  | Oxford |
| 8,590,011 | B1 | 11/2013 | Legault et al. |
| 8,958,475 | B2 | 2/2015  | Ravenndan |
| 8,972,746 | B2 | 3/2015  | Johnson et al. |
| 9,575,906 | B2 | 2/2017  | Oxford |
| 9,705,677 | B2 | 7/2017  | Oxford |
| 9,710,617 | B2 | 7/2017  | Oxford |

(Continued)

FOREIGN PATENT DOCUMENTS

EP    3387577    10/2018

OTHER PUBLICATIONS

Notice of Allowance issued for U.S. Appl. No. 16/919,934, mailed Jan. 11, 2023, 11 pages.

(Continued)

*Primary Examiner* — Trang T Doan
(74) *Attorney, Agent, or Firm* — SPRINKLE IP LAW GROUP

(57) ABSTRACT

System and methods for the processing of data in a secure and safe manner are disclosed. Embodiments of such system and methods may ensure the operation of cross compartment policies in a manner that is dependent on the inherent properties of the data being operated on as well as the operations that are performed on that data.

13 Claims, 33 Drawing Sheets

(56) References Cited

U.S. PATENT DOCUMENTS

| | | | |
|---|---|---|---|
| 10,037,187 | B2 | 7/2018 | Akidau et al. |
| 11,165,428 | B1 | 11/2021 | Ross et al. |
| 11,165,753 | B1* | 11/2021 | Kawale .................. G06F 9/546 |
| 11,645,425 | B2 | 5/2023 | Breskvar |
| 11,755,720 | B2* | 9/2023 | Seksenov ................ G06F 21/53 |
| | | | 726/22 |
| 12,130,951 | B2 | 10/2024 | Breskvar |
| 2004/0181670 | A1 | 9/2004 | Thune et al. |
| 2007/0108293 | A1 | 5/2007 | Odate et al. |
| 2008/0077705 | A1 | 3/2008 | Li et al. |
| 2008/0184016 | A1 | 7/2008 | Erlingsson et al. |
| 2009/0292930 | A1 | 11/2009 | Marano et al. |
| 2011/0066602 | A1 | 3/2011 | Studer et al. |
| 2011/0302397 | A1 | 12/2011 | Mitola, III |
| 2013/0031374 | A1 | 1/2013 | Thom et al. |
| 2015/0100542 | A1 | 4/2015 | Li et al. |
| 2015/0271150 | A1 | 9/2015 | Barnett et al. |
| 2016/0359673 | A1 | 12/2016 | Gupta et al. |
| 2018/0314448 | A1 | 11/2018 | Grossman et al. |
| 2019/0391971 | A1 | 12/2019 | Bernat et al. |
| 2021/0004493 | A1 | 1/2021 | Breskvar |
| 2021/0084038 | A1* | 3/2021 | Feasel ................... G06F 21/629 |
| 2021/0150020 | A1* | 5/2021 | Lewis ...................... G06F 21/53 |
| 2021/0240818 | A1* | 8/2021 | Seksenov .............. G06F 16/986 |
| 2023/0244818 | A1 | 8/2023 | Breskvar |

OTHER PUBLICATIONS

Office Action issued for U.S. Appl. No. 18/193,951, mailed Oct. 26, 2023, 13 pages.
International Preliminary Report on Patentability (IPRP) issued by the International Bureau of WIPO for PCT Application No. PCT/IB2022/054302, mailed Nov. 23, 2023, 16 pages.
International Search Report and Written Opinion issued for PCT Application No. PCT/IB2020/056278, mailed Aug. 27, 2020, 11 pages.
International Preliminary Report on Patentability (IPRP) issued for PCT Application No. PCT/IB2020/056278, mailed Jan. 13, 2022, 7 pages.
Office Action issued for U.S. Appl. No. 16/919,934, mailed Dec. 15, 2021, 14 pages.
Feustel, Edward A., "On the Advantages of Tagged Architecture," IEEE Transactions on Computers, vol. C-22, No. 7, Jul. 1978, 14 pages.
Zhao, Yongwang, "A Survey on Formal Specification and Verification of Separation Kernels," National Key Laboratory of Software Development Environment (NLSDE), Jul. 12, 2016, 32 pages.
Greve, et al., "A Separation Kernel Formal Security Policy," ACL2 Workshop 2003, 12 pages.
Hardin, David S., "Design and Verification of Microprocessor Systems for High-Assurance Applications," 2010, 444 pages.
Brygier, et al., "Safe and Secure Virtualization in a Separation Microkernel," SYSGO White Paper, 2013, 4 pages.
Bobaru, et al., "NASA Formal Methods," Third International Symposium, NFM 2011, 546 pages.
Murray, et al., "seL4: from General Purpose to a Proof of Information Flow Enforcement," 2013 IEEE Symposium on Security and Privacy, pp. 415-429.
Alves-Foss, et al., An Analysis of the GWV Security Policy, Center for Secure and Dependable Systems, University of Idaho, 2003, 12 pages.
Klein et al., "seL4L: Formal Verification of an OS Kernel," 2010 ACM, Inc., 18 pages.
Vachharajani, et al., "RIFLE" An Architectural Framework for User-Centric Information-Flow Security, Proceedings of the 37th International Symposium on Microarchitecture (MICRO-37'04), 12pages.
Qin et al., "LIFT: A Low-Overhead Practical Information Flow Tracking System for Detecting Security Attacks," 2006 39th Annual IEEE/ACM International Symposium on Microarchitecture (MICRO'06), 2006, 12 pages.
Dhawan et al., "Architectural Support for Software-Defined Metadata Processing," ASPLOS 2015, Mar. 14-18, 2015, Istanbul, Turkey, pp. 487-502.
Office Action issued for U.S. Appl. No. 16/919,934, mailed Sep. 9, 2022, 11 pages.
International Search Report and Written Opinion issued for PCT Application No. PCT/IB2022/054302, mailed Oct. 28, 2022, 22 pages.
Sullivan et al., "The Dover Inherently Secure Processor," IEEE, 2017, 5 pages.
Notice of Allowance issued by the U.S. Patent and Trademark Office (USPTO) for U.S. Appl. No. 18/193,951, mailed Jun. 6, 2024, 12 pages.

* cited by examiner

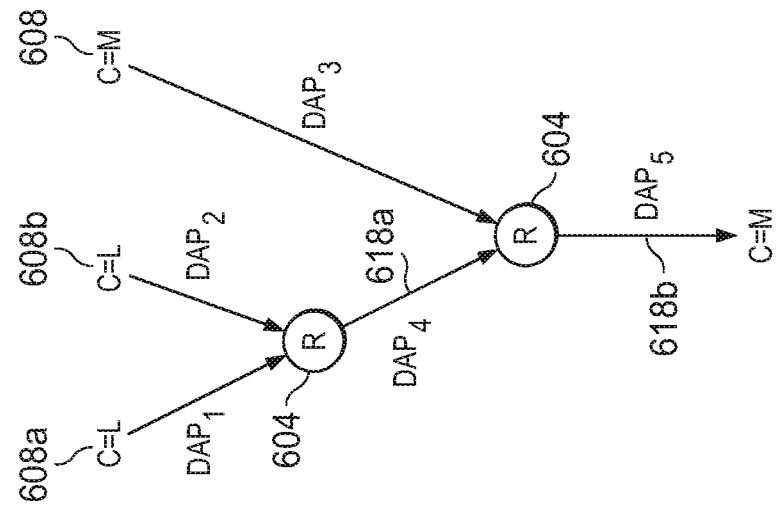
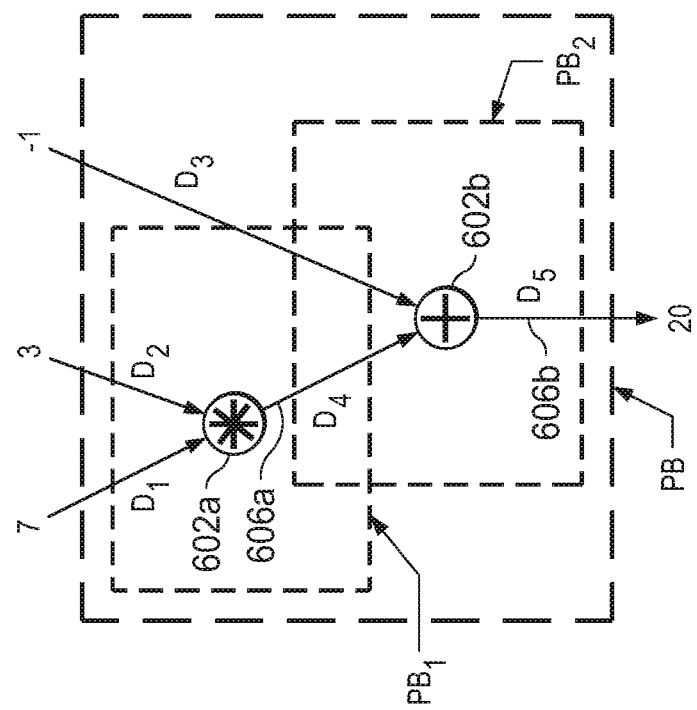
FIG. 6B
FIG. 6A

INTER SYSTEM POLICY FEDERATION IN A DATA-DRIVEN SECURE AND SAFE COMPUTING ENVIRONMENT

CROSS-REFERENCE TO RELATED APPLICATION(S)

The present application claims the benefit of priority under 35 U.S.C. § 119(e) of U.S. Provisional Patent Application No. 63/186,446 filed May 10, 2021, entitled "Inter System Policy Federation," by Breskvar et al, which is hereby fully incorporated by reference herein.

TECHNICAL FIELD

This disclosure relates generally to the field of computer security. More specifically, the disclosure relates to embodiments of systems and methods for secure computing architectures. More particularly, embodiments of this disclosure relate to hardware security architectures that allows arbitrary code or data to be independently secured. Even more particularly, embodiments of this disclosure relate to hardware security architectures that allows arbitrary code or data to be independently secured between computing systems.

BACKGROUND

Existing secure processing techniques for computer processing hardware or software, such as tamper-resistant "Secure Elements" or "Hardware Security Module" (HSM) based designs, are mostly dependent on their constrained capabilities as well as by placing hard constraints on data memory space accesses. In other words, these designs are considered mostly secure simply because there are only a very limited number of functions that they can accomplish, and a limited amount of data that they can process. By constraining the operations that may be executed to a small subset of the universal Turing machine computational model and by placing hard limits on the memory space that may be accessed, the security (e.g., the proof of the security) for these systems can be made more credible, since the total solution space can be nearly exhaustively evaluated. However, even some of these very tightly-constrained secure systems have been shown to have serious vulnerabilities under certain circumstances.

More advanced, more general implementations of these kinds of secure processing concepts include arbitrary code segment execution in segmented memory spaces. Examples of such architectures include Arm's TrustZone™, Intel's SGX™ or AMD's PSP architectures. While these approaches may support more general execution options than the Secure Element designs mentioned earlier, this additional flexibility comes along with an associated increase in the difficulty of assessing, or proving, their security. The security of such systems is mainly based on the ability of the system to limit the available memory to a given secure process or secure operational thread. Such systems are frequently exploited by clever manipulation of their segmented memory controller mechanisms. Unfortunately, since the system memory controller is such a low-level element in most high-level designs, some of these vulnerabilities have proven highly difficult to detect, not to mention correct.

All of these technologies are thus variations of the same basic model; that of fixed perimeter security. This idea of a secure "barrier" inside which system security can be "guaranteed" by controlling the data that can cross the barrier (in either direction) is ultimately based on the archaic concept of physical security practice. The general idea is that if the border across which data must cross can be controlled, you can control the interior (e.g., the secure area), but that principle simply does not work in the longer term. That is, if a given vulnerability is present in a system when it is put into service, then the longer the system stays in service, the more likely it is that the vulnerability will be found. This is due to such a system's inherent inability to adapt to compromises in real time. In other words, unless a vulnerability is discovered, it cannot be fixed. Such "undiscovered weaknesses" even have a widely-recognized name; Zero-Day vulnerabilities.

What is desired, then, are improved systems and methods for security in computing processing device.

SUMMARY

To those ends, among others, and systems and methods presented herein that allow for the security of data (e.g., code or other data) utilized in (or output from) a processing block (e.g., a set of processing hardware or logic or associated code). Such a processing block (also referred to herein as a transformation block or unit (TU)) may perform a transformation (e.g., processing) on incoming data (or a datum) supplied to the transformation unit to produce a data (or a datum) output. Such incoming data may be associated with one or more properties (referred to as a data associated property (DAP) or properties (DAPs)) that may designate one or more composable properties about corresponding input data provided to the transformation block.

These DAPs may be provided to a properties propagation block (unit or PPU). The properties propagation unit comprises logic for determining an output DAP associated with a corresponding data output generated by the transformation unit, where the output DAP was generated based on an input DAP associated with the input data from which the corresponding data output was generated by the transformation unit. To put it in a different manner, in embodiments, for each determination of output data through application of the transformation unit on the corresponding input data, there is a corresponding determination of the output DAP by the properties propagation unit such that the output DAP corresponds to the input DAP that is associated with such input data.

Such a properties propagation unit may provide such output DAP's for corresponding output data from the transformation unit substantially regardless of the actual processing or transformation applied by the transformation unit. Thus, systems and methods as disclosed may be usefully utilized on almost any arbitrary complex processing or transformation unit to provide output DAP's associated with data output by the transformation unit.

These data properties may include properties such as confidentiality, integrity, quality, availability, freshness, risk or almost any other property of data desired. Thus, by having DAP's associated with data output by the transformation unit (e.g., based on the corresponding input data associated properties associated with input data from which the output data was generated), a number of security measures may be implemented. Such measures may include the application of input security policies or output security policies using perimeter guard (PG) logic.

These perimeter guards may include input perimeter guards and output perimeter guards. Input perimeter guards may receive input data and a policy. Based on the policy and the input data, an input perimeter guard may produce a output data and corresponding DAP. In this manner, input perimeter guards may be utilized, for example, as enforcers or gates for data input to a processing system (e.g., a transformation unit or associated properties propagation unit). For example, input perimeter guards may take as input data retrieved, accessed, or input, from devices or media of a computing system and determine (e.g., based on a user policy associated with the data or input source) whether to provide such data to the transformation unit, what of such data should be provided to the transformation unit, or what the corresponding DAP for that input data should be. The input perimeter guard may also determine an enforcement action to assure that such actions (or other actions) are taken or the associated policy is enforced.

Similarly, output perimeter guards may receive input data, a corresponding DAP, and a policy. Based on the policy (and potentially the DAP), an output perimeter guard may produce a corresponding output data for the received input data. In this manner, output perimeter guards may be utilized, for example, as enforcers or gates for data output from a processing system (e.g., a transformation unit or associated properties propagation unit). For example, output perimeter guards may take as input data output from the transformation unit and the corresponding DAP output from the properties propagation unit and determine whether to provide that data to an output device (e.g., to output such data on a network, store such data on a storage media, etc.). Embodiments of an output perimeter guard may also determine an enforcement action to assure that such actions (or other actions) are taken, or the associated policy is enforced.

Accordingly, embodiments may utilize a properties propagation unit in association with a transformation unit (e.g., a CPU or the like) of a computing system along with zero or more input perimeter guards or output perimeter guards to enforce one or more user policies on both code or data utilized during processing of the computing system as well as the data leaving such a computing system.

It will be noted here that the terms input data, input DAP, output data and output DAP are to be taken as descriptive relative to the local block or unit with which the term is used and not as generally applicable, as the output (e.g., data or data associated property) of one block or unit may be utilized as the input (e.g., data or DAP) to another block or unit.

As can be seen then, in contrast with the limitations of prior processing security systems, embodiments described herein may take a radically different approach. Such approaches may involve a real-time evaluation of a given security policy on a set of (e.g., each and every) datum present in the system during a set of (e.g., every) operations. Essentially, embodiments may utilize an extra (e.g., security-related) data field (e.g., the DAP's) added to each and every datum (or memory location) in the system. This supplemental (e.g., security) data field may be used to evaluate (effectively in real time) the consequences of performing any operation on any datum—as resolved against the security policy that is in effect as these operations are executed. This results in an update of each (e.g., security) data field (i.e., the DAP) for each datum every time an operation occurs on that datum.

Thus, embodiments may include systems for a secure computing paradigm where the output of this system is dependent on not just the contents or source of the input data, but on both of these as well as on a well-defined security policy. We refer to such a system as data driven secure computing and it is comprised of a computing system including a transformation unit and a properties propagation unit that may be distinct from the transformation unit. The transformation unit includes first logic for processing input data by applying a transform to the input data to generate an output data corresponding to an input datum of the input data received at the transformation unit. A common example of such a transformation unit is a Central Processing Unit or CPU, and on different hierarchical level the Arithmetic Logic Unit or ALU of a CPU. In this data-driven secure computation model, however, each and every input datum received at the transformation unit may have a corresponding input DAP distinct from that input datum but nonetheless specific to that input datum.

The properties propagation unit may include second logic for receiving the input DAP corresponding to the input datum received at the transformation unit and generate an output DAP corresponding to, and synchronized with, the output datum generated by the transformation unit by applying a relation to the input DAP. The relation is based on a policy defining a composability rule associated with the input data associated property. This relation may or may not be based on the transform applied by the transformation unit.

As described, then, embodiments may provide for dynamic information assurance guarantee for securing information flows within a particular "compartment". It may be desirable, however, to provide similar security with respect to data flowing between compartments. Specifically, designing software with high information assurance guarantees is hard and time consuming. Even harder is knowing and showing that such information assurances are actually met. One strategy of tackling these problems is to divide the software into smaller modules with well-defined interfaces and functionality, isolate the modules performing critical functions, demonstrate to sufficient level the correctness of implementation of such critical modules and reuse them wherever possible. Embodiments as disclosed may enable high assurance isolation of critical modules in compartments with efficient, policy controlled and hardware enforced cross-compartment information flows.

Thus, one implementation as disclosed herein may include governing intra compartment information flow assurance and also handling the cross compartment information flow assurance. Embodiments may be applied in a variety of contexts as disclosed. In case of intra compartment instructions and simple inner relations just using intra compartment information assurances may be substantially less complex, more performant and efficient that governing both types of information flows. On the other hand, implementing separation equivalent to multiple compartments may require complex inner relations with many data-associated property (DAP) levels (states) leading to reduced performance and efficiency. Furthermore, such multi compartment emulating policies may quickly become complex to understand and evaluate against data assurance targets. Embodiments as disclosed herein may thus be especially valuable when used in combination with intra compartment governance.

Specifically, embodiments of inter compartment data governance as disclosed herein may solve a number of issues related to securing information follow. One of these problems is referred to as the label creep problem. Specifically, using simple and efficient relations (e.g. MIN, MAX as described herein below) for intra compartment information security often leads to the so called label creep problem, where data-associated properties (DAPs) converge towards their extreme values.

For example, in case of confidentiality DAP and MAX relation, the confidentiality may only increase (or stay the same), never decrease. In real world applications it is often unavoidable to have a way of downgrading DAPs, (e.g. decrease confidentiality) in a controlled way. While downgrade functionality is possible to achieve, it requires (much) more complex relations and policies that make the systems harder to implement, less efficient, less performant and harder to reason about (and thus to show they are secure or safe), etc.

Embodiments may address such shortcomings by introducing domains (as discussed herein below) and outer relations allowing controlled information flows between such domains and in accordance with the outer policy to efficiently handle controlled downgrade functionality. Embodiments enable the use of "simple" (efficient) relations and policies for the vast majority of operations (e.g. where downgrade functionality is not required) in combination with cross domain operations to efficiently implement e.g. downgrade functionality.

Another problem is sizing and dynamic capacity extension. When implementing intra compartment security in hardware it is often necessary to hardwire the relation(s), number of different DAPs, number of different properties (e.g. low, mid, high confidentiality), etc. to achieve desired power efficiency, area and performance requirements. Thus, the designer of a system often needs to make decisions ahead of knowing how the system is going to be used (e.g., an ASIC designer implementing a security capable processor in most cases will not know the software that will run on it or even what an application is). This leads to overprovisioning or risking that the device will be limited in which applications it can serve efficiently.

Embodiments give flexibility to dynamically extend the number of DAPs through use of multiple compartments. For example, suppose a relation is MAX, property is confidentiality and only two DAP levels are implemented (CL=1: low confidentiality and CL=2: higher confidentiality). In such case certain systems are not able to handle the case where three confidentiality levels are needed (CL=1: low confidentiality, CL=2: higher confidentiality, CL=3: highest confidentiality). Using embodiments as disclosed, the user of a system may construct an (outer) policy such that two compartments are used to enable (in this case) four (virtual) confidentiality levels.

Embodiments may also enable realization of complex relations by combining (through outer relation spanning multiple compartments) a number of simpler relations. For example, MAX and MIN are both transitive and can efficiently be implemented in logic without a lookup (e.g. in memory). However, transitivity prevents downgrading and other functionalities that are useful and required in real world applications. Using a combination of multiple simple inner relations in combination with outer relations takes advantage of fast and efficient inner relation calculations where possible (usually vast majority of operations) and flexibility of outer relations where needed.

Embodiments may also provide faster security and safety evaluations. Where only transitive relations are used it is easier to see and reason about information assurance guarantees since transitivity prevents downgrading (e.g., a property is confidentiality, relation is MAX: once data confidentiality is high it can never be reduced to low). Embodiments enables a system where most of the data processing is performed within compartments using (e.g., only) transitive (inner) relations where it is easy to see that, for example, no exfiltration is possible. The downgrading and other functionality that cannot be realized with transitive relations only is then realized using outer relations that move data and information flows between compartments in explicit and controlled way.

Embodiments may also address the problem of complex systems and multiple domains. Devices will often operate as a part of a more complex heterogeneous system comprising multiple heterogeneous systems. The devices may be controlled by different policies and be more or less trustworthy, further contributing to complexity and diversity of a system. The problem arises when processing on different devices is to be consolidated to one device, keeping the same level of separation as when using multiple distinct devices. While it may be possible to construct policies (and relation) that enforces the same level of separation as when using physically distinct devices, the policies (and relation) would quickly become very complex. Besides being hard (or even reasonably impossible) to understand for a person, it would also require complex hardware, which may limit the performance and efficiency of the system. Embodiments thus offer a way to consolidate processing from distinct physical devices onto one by utilizing compartments and controlled (by outer policy and outer relation) cross-compartment information flows.

Embodiments may also address controlled and rate limited data exfiltration. Often some data exfiltration to less trusted domains is not problematic or is even required. Embodiments enable efficient policy control of cross-compartment data (and information flow) passing. For example, suppose a security-sensitive system where it is desired to use third-party non-trusted password checking code. The password checking code is placed into own compartment to limit security risks. However, the code still needs to receive the (secret) password itself and produce an output indicating if password is strong or not. The policy needs to allow moving data into the compartment (to receive the password) and from the compartment (to transmit the result if the password is strong enough or not). Since the code is non-trusted, there is a risk that it would try to exfiltrate the secret (password), e.g. by encoding it into the resulting output ("strong"/"weak"). Embodiments enable policies where e.g. only one bit of data (e.g. indicating "strong"/"weak") is allowed to pass from the compartment for each new password being generated, thus limiting exfiltration to practically acceptable level.

Accordingly, embodiments herein outline advancements in the area of hardware or software logic to enable novel mechanisms for the processing of data in a secure and safe manner. One of the foundational concepts of embodiments thus involves a rethinking of how to perform generalized policy enforcement. Embodiments of this new approach may be accomplished by using a mechanism (e.g., a perimeter guard) that ensures the proper operation of security or functional safety related or even other, more general policies in a manner that is dependent on the inherent properties of the data being operated on as well as the operations that are performed on that data.

Embodiments can thus be contrasted with the more traditional method of security or functional safety policy implementation, where the security or functional safety of a system is defined only by the structure and operation of the code that is manipulating its data or the location in memory of such code or such data. With embodiments of this data-dependent computational model as disclosed herein, any generalized policy implementation, as well as its associated proof guarantees, can be made much simpler and more direct. This allows security (e.g., and corresponding proofs) to be more easily implemented or constructed and enables more general and more robust security and functional safety implementations than that which is available on systems using traditional functional safety and secure processing methodologies.

Specifically, modern day high assurance systems need to take into account both functional safety and security challenges. Embodiments as disclosed herein are unique in that they may simultaneously address both of these challenges and needs in a way that enables formal (e.g., mathematical) system guarantees at a fraction of the effort that is required for traditional high assurance architectures. When implemented in association with a given processor (e.g., CPU or transformation unit) design, embodiments can provide guarantees that software will adhere to an arbitrary high level functional safety, security or other policy at substantially all times. Thus, a one-time investment in a formal proof of the correctness of such processor implementation can translate to high-assurance guarantees of arbitrary functional safety, security or other policy enforcement with any software executing on that processor.

In one embodiment, a system for data driven secure computing may comprise a computing system including a processor and an outer policy enforcer operating according to an outer policy, the outer policy enforcer comprising logic for receiving an input datum associated with a transaction for that input datum between a source compartment and a destination compartment; logic for receiving a first data associated property distinct from the input datum that is synchronized with the input datum and specific to that input datum, and logic for receiving a second data associated property distinct from the input datum that is synchronized with the input datum and specific to that input datum. Moreover, the first data associated property may be associated with a first compartment identifier specifying the source compartment for the input datum associated with the input data and the second data associated property is associated with a second compartment identifier specifying the destination compartment for the input datum associated with the input data.

Embodiments of the outer policy enforcer are adapted to determine when an output datum and a first associated output data associated property can be sent to the destination compartment based on an outer policy, and when the output datum and the associated output data associated property can be sent to the destination compartment synchronously outputting the output datum on a output datum line and the associated first output data associated property on an output data associated line, and when the output datum cannot be sent to the destination compartment, outputting an enforcement action.

In certain embodiments the outer policy enforcer comprises relation logic adapted to receive the first data associated property and the second data associated property, wherein the relation logic is adapted to determine compliance with the outer policy based on the first data associated property and the second data associated property and output a second output data associated property based on the outer policy and the first data associated property or the second data associated property.

In some embodiments, the second output data associated property signals whether transaction is allowed by the currently set policy In a particular embodiment, the relation logic is a lookup table. Such a lookup table can be, for example, populated based on the outer policy.

In an embodiment, the lookup table includes a default data associated property and the relation logic is adapted to output the default data associated property if no entry in the lookup table is associated with the first data associated property or the second data associated property. A default data associated property may signal, for example, a forbidden transaction.

In one embodiment, the first data associated property or the second data associated property comprise an addresses associated with the source compartment or the destination compartment.

In a specific embodiment, the first data associated property or second data associated property comprises a first data confidentiality level.

In an embodiment, the first output data associated property comprises a second data confidentiality level associated with the output datum.

In another embodiment, the outer policy enforcer comprises outer perimeter guard logic adapted to determine the associated first output data associated property based on the second output data associated property from the relation logic. The outer perimeter guard may be a switch, for example.

In still other embodiments, input datum comprises an instruction for a transformation unit coupled to the outer policy enforcer.

In one embodiment, a system for data driven secure computing, comprising a computing system including a processor and an outer policy enforcer operating according to a policy. The outer policy enforcer comprises logic for receiving an input datum associated with a transaction for that input datum, wherein that input datum is a first value for a program counter associated with the processor, the first value associated with a first corresponding instruction scheduled for execution by the processor and received before that first corresponding instruction is executed by the processor. The outer policy enforcer also includes logic for receiving a first data associated property distinct from the first value for the program counter, the first data associated property synchronized with the first value of the program counter and specific to that first value of the program counter and receiving a second data associated property distinct from the first data associated property, wherein the second data associated property is synchronized with a second value for the program counter, the second value associated with a second corresponding instruction for execution by the processor before the first corresponding instruction.

The logic of the outer policy enforcer can determine a third data associated property based on the first data associated property and the second data associated property; and synchronize the third data associated property with the first value for the program counter before execution of the first corresponding instruction associated with the first value for the program counter before the execution of the first corresponding instruction by the processor, wherein the third data associated property defines a compartment for execution of the first corresponding instruction. Such an instruction can be, for example, a jump instruction (e.g., XJUMP Jump to Instructions, etc.).

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIGS. 6A and 6B are block diagrams depicting examples of data flow graphs.

DETAILED DESCRIPTION

Figure 1B:
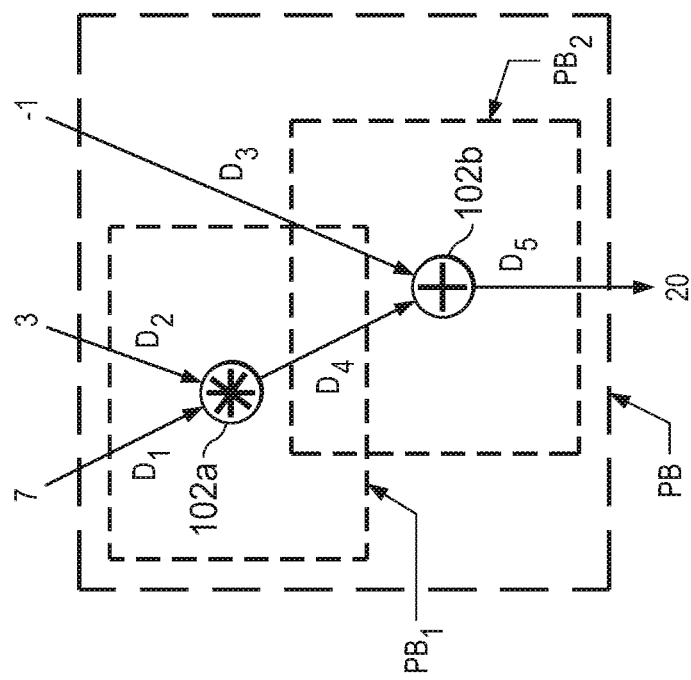
FIGS. 1A and 1B are block diagrams depicting examples of data flow graphs.

The invention and the various features and advantageous details thereof are explained more fully with reference to the nonlimiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions or rearrangements within the spirit or scope of the underlying inventive concept will become apparent to those skilled in the art from this disclosure.

As discussed above, attention is now directed to embodiments and systems and methods presented herein that allow for the security of data (e.g., code or other data) utilized in a processing block (e.g., a set of processing hardware or logic or associated code). Such a processing block (also referred to as the transformation block or unit) may perform a transformation (e.g., processing) on incoming data (or a datum) supplied to the transformation unit to produce a data output (or an output datum). Such incoming data may be associated with one or more data associated properties (or DAPs) that may designate one or more composable properties about the corresponding input data (or datum) provided to the transformation block.

The DAP's may be provided to a properties propagation block (unit). The properties propagation unit comprises logic for determining an output DAP associated with a corresponding data output generated by the transformation unit, where the output DAP was generated based on an input DAP associated with the input data from which the corresponding data output was generated by the transformation unit. Thus in some embodiments, for each determination of output data through application of the transformation unit on the corresponding input data, there is a corresponding determination of the output DAP by the properties propagation unit such that the output DAP corresponds to the input DAP that is associated with such input data.

Such a properties propagation unit may provide such output DAP's for corresponding output data from the transformation unit, substantially regardless of the actual processing or transformation applied by the transformation unit. Thus, systems and methods as disclosed may be usefully utilized on almost any arbitrary complex processing or transformation unit to provide output DAP's associated with data output by the transformation unit.

These DAP's may include properties such as confidentiality, integrity, quality, availability, freshness, risk. Thus, by having output DAP's associated with data output by the transformation unit (e.g., based on the corresponding input DAP's associated with input data from which the output data was generated), a number of security or safety measures may be implemented. Such measures may include the application of input security policies or output security policies using perimeter guard logic.

As can be seen then, embodiments as described herein may take a radically different approach than prior processing security systems, with their well-known limitations. Such new approaches may involve a real-time evaluation of a given (e.g., security) policy on a set of data (e.g., each and every datum) present in the system during a set of (e.g., every) operations. Essentially, embodiments may utilize an extra (e.g., security-related) data field (e.g., the DAP's) added to each and every datum (or memory location) in the system. This supplemental (e.g., security) data field may be used to evaluate (effectively in real time) the consequences of performing any operation on any datum—as resolved against the (e.g., security) policy that is in effect as these operations are executed. This results in an update of each (e.g., security) data field for each datum every time an operation occurs on that datum.

However, before delving into embodiments in more detail, some additional context of embodiments may be useful. Data processing is essentially the practice of applying a certain transformation to input data, resulting in output data. In principle, the resulting output data thus depends on the input data, and this relationship between the input and the output data can thus be referred to as a set of data dependencies.

Many data processing blocks (e.g., hardware logic), comprising data inputs, data transformations and data outputs can often be broken down into multiple, simpler data processing blocks that are also comprised of inputs, transformations and outputs (although not necessarily the same number and type of inputs, outputs and transformations). When such simplified processing blocks' inputs and outputs are appropriately connected, they can be shown to be equivalent to the original higher-level data processing block. The structure of such a connection of simplified data processing blocks and the connections between their outputs and inputs can be presented with a data flow graph or a data (flow) dependency graph.

In fact, any generalized data processing operation can be described by such a data flow graph. In the case of a Central Processing Unit (CPU) a data flow graph is usually not static. Moreover, even different executions of the same program by the CPU may result in different data flow graphs, since the execution of the program often depends on both internal and external factors, such as data input values, the timing or order of arrival of different inputs, etc. Thus, whether the data flow is static or dynamic with complex control flow may or may not be material. What is significant is that a data flow graph accurately captures the dependencies that are relevant for each specific case (e.g., each use case for a particular data block).

From a data dependency graph, it may thus be clear (at least in principle) which transformations, and their inputs (and so on recursively) influence the output of a given transformation. These recursive dependencies (i.e., the dependencies, the dependencies of dependencies, and so on) are referred to as the dependency cone. How far and how deep the dependency cone goes will depend on the context. In the vast majority of cases, the starting time, the events included, and the scope of a dependency cone are all context dependent.

The decomposition of higher-level blocks into smaller blocks is possible in multiple hierarchical levels and along different (often intertwined) dimensions. One example of such a dimension includes time. For example, compare the operation of two different implementations of the same numerical divider procedure. In one version, each circuit clock cycle may produce a single-bit intermediate result. In another version (or implementation) of the same high-level transformation, a monolithic divider circuit may also produce partial results each clock cycle, but nonetheless not expose the final result until the operation is complete. Additionally, this complete result may not be produced in a constant amount of time, since the overall execution time may potentially depend on the input data.

Another option for such an operational decomposition includes the complexity of a transformation. For example, a high-level vector multiply-and-accumulate operation may be broken into separate multiply-and-accumulate operations then further into separate multiplications and additions, and further into gates, transistors, etc. Yet another hierarchical decomposition example includes most software, where high-level libraries can be broken down into individual functions, which can be further broken down into individual instructions, each of which can potentially be broken down into individual logical operations, etc.

Figure 1A:
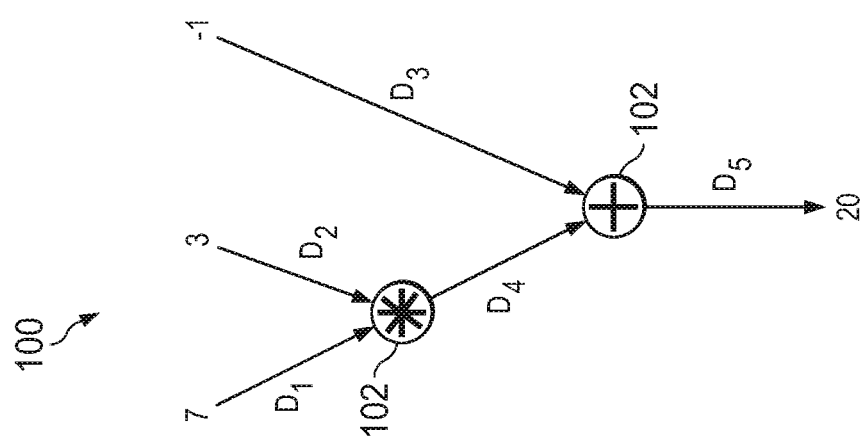

FIGS. 1A and 1B depict examples of such data flow graphs for a simple processing block. In FIG. 1A for example, a data flow graph 100 is presented with marked dependencies. The $D_1$ and $D_2$ dependencies are inputs into one transformation 102 (a multiplication transformation denoted "*") and thus dependencies of this transformation result in the output $D_4$. $D_4$ and $D_3$ are inputs into the second transformation 102 (an addition transformation denoted "+") and thus represent dependencies of the $D_5$ output from the "+" transformation 102.

In FIG. 1B, a breakdown of the dependency graph of FIG. 1A is depicted. Here, three processing blocks (PB, $PB_1$ and $PB_2$) are illustrated on two hierarchical levels. The PB processing block has inputs $D_1$, $D_2$ and $D_3$, a transformation that comprises the two transformations 102 (denoted "*" and "+"), and the PB output, marked as $D_5$. The PB processing block can be broken down to two processing blocks, $PB_1$ and $PB_2$. The $PB_1$ processing block has inputs $D_1$, $D_2$, a transformation 102a (denoted "*"), and the $PB_1$ output, marked as $D_4$. The $PB_2$ processing block has inputs $D_3$, $D_4$, a transformation 120b (denoted "+"), and the $PB_2$ output, marked as $D_5$. The PB processing block can be constructed from $PB_1$ and $PB_2$ by creating the appropriate connections (as depicted). Note here that $D_1$, $D_2$, $D_3$ and $D_4$ are all in the "dependency cone" of $D_5$. However, the immediate dependencies of $D_5$ can be seen to include only $D_3$ and $D_4$.

Accordingly, data that is processed by processing blocks may, according to embodiments, have data associated properties (or DAP's). A DAP is an indication, signal or identifier of a property (or a value of a property) of a datum. For purposes of this disclosure, it is convenient to refer to DAP's as a collection of composable properties of the data to which they are associated. For example, confidentiality, integrity, quality, availability, freshness, risk, etc. are all examples of such composable properties. In general, properties are referred to as composable if it is possible to combine multiple such properties into a conjoined property, according to pre-determined composability rules.

For example, consider that a new document (a reference which may also be interchangeably utilized herein to also apply to general data) is created somehow from a set of existing documents, where the existing documents include a mixture of data with the following associated properties: high confidentiality (HC), medium confidentiality (MC) and low confidentiality (LC). Without needing to know anything about how the new document is created or how the source documents were combined, a valid conclusion can nevertheless be reached (at least from the most conservative perspective) regarding the confidentiality property of the new document resulting from the combination of the existing documents. In the most conservative case (e.g., unless we know that no HC data was used in creation of the new document), it can be concluded that the new document should be classified as HC (i.e., its confidentiality property should have the value HC) as at least one of the documents combined to form the new document included HC data. It is, of course, possible that the "HC" data is not used in the construction of the new document, and even if that is the case, the only consequence is that the "HC" determination is overly conservative. Note that a (conservatively) valid conclusion can be reached about the confidentiality of the new document without needing to know anything more than: (1) knowing the data associated properties (DAP's—which may be taken herein to refer to a set of data associated properties) of the input source data (e.g., the input dependencies), in this case the existing documents, and (2) understanding the composition of the confidentiality property (i.e., knowing the compositional rules of the confidentiality property).

In the example above, the source (input) data (documents) were transformed into resulting (output) data (documents) in an arbitrary and possibly even unknown manner. Irrespective of the details of this transformation, the (most conservative interpretation of the) confidentiality of the output data can be determined by simply applying the compositional rules of the confidentiality property to the confidentiality properties of the input data.

The reasoning behind this determination is that since the output data (e.g., document) is derived from input documents, the output data properties (DAP's) must therefore be determined by some relation to the input data properties (DAP's). The rule that output DAPs must be determined in relation to the input DAP's is the composition rule—or properties propagation rule (as will be discussed).

Thus, the rules of (data associated) property composition can be described by defining the relations between the (data associated) properties and by observing the rule that the combined properties must be based on—or in relation to—all of the properties that were combined. For example, suppose HC (high confidentiality) is considered greater-than-or-equal to (≥) the MC (medium confidentiality), which is in turn greater-than-or-equal to (≥) LC (low confidentiality). In this example, the data associated properties are HC, MC, LC—more formally—are elements of set S={HC, MC, LC}. So it can be asserted that HC is in greater-than-or-equal-to relation with MC, and MC is in greater-than-or-equal-to relation with LC. Thus, combining data (e.g., documents) with HC and MC data associated properties will, according to the rule, result in data with HC data associated properties, because HC is in the afore-mentioned relation with MC.

If a relation is transitive and if such a composition rule is applied during multiple transformations, it will result in a final combined property that is in relation with all of the data associated properties of dependencies throughout the entire data dependency cone (e.g., of a transformation or processing unit).

The DAP's and the composition rules may be simple, like in the confidentiality example above, and can thus be modeled as elements of a set with transitive and antisymmetric (often also reflexive) binary relations. Of course, some situations may not be so simple and the relation can be much more complex, in general a k-ary relation (or simply a relation).

As an example of a complex relation, suppose a DAP "risk" takes values of HR (high risk), MR (medium risk) and LR (low risk). As may be realized, data associated with a "risk" DAP may also have other DAP's, such as confidentiality (as defined above) or integrity (e.g., an identifier of how trustworthy the data may be). The risk relation could thus be defined such that if confidentiality increases and integrity decreases at the same time then HR is in relation with MR.

The definition of such DAP's and k-ary relations may thus be application-specific. In principle, the DAP is arbitrary and may also include all the data itself or data properties that are associated with the data dependency cone (e.g., of a processing block), either in-part or in-full. In the security and functional safety fields, such a system can be evaluated with (potentially multiple) simple binary relations. For clarity, the following set of properties more precisely describes possible realizations using binary relations—without precluding systems with more complex k-ary relations or systems with other binary relations:

1) Values of the data associated properties (DAP's) are elements of set S.
2) There exists a relation R between elements of set S with the following properties (these are not necessarily always needed, but are often useful):
    a) antisymmetry: $\forall a, b \in S$: (a R b) $\wedge$ (b R a)=>a=b, if an element a is in relation with element b and the element b is in relation with element a then the elements are the same.
    b) transitivity: $\forall a, b, c \in S$: (a R b) $\wedge$ (b R c)=>(a R c), if an element a is in relation with the element b and the element b is in relation with element c then element a is in relation with element c.
3) The output data associated properties are determined such that for $DAP^{out}$ is in relation with all of the input data associated properties $DAP_i^{in}$, more specifically that the following formula F holds: $(DAP^{out} \ R \ DAP_1^{in}) \wedge (DAP^{out} \ R \ DAP_2^{in}) \wedge \ldots \wedge (DAP^{out} \ R \ DAP_n^{in})$, where "$\wedge$" is logical "and", and R is a relation, as defined above.

Note that respect to the above that in order to guarantee that $DAP^{out}$ can always be determined the set S should contain the "join" element M, such that M is in relation with each of elements of S, specifically $\forall \ a \in S$: M R a. Note also that an implementation of the system without the "join" element is possible and can be useful. In such a case, when the formula F cannot be satisfied, the system can assign a predetermined value to $DAP^{out}$, or trigger some predefined action, such as an exception, stop of computation, etc. Note as well that any $DAP^{out}$ that fulfills the above condition may acceptable. However, it may be beneficial in certain cases (e.g., not to be overly conservative) that the "lowest" is selected. More precisely, if multiple $DAP_1^{out}, DAP_2^{out}, \ldots DAP_{lowest}^{out}$ satisfy the formula F then $DAP_{lowest}^{out}$ is the "lowest" among them if $DAP_{lowest}^{out}$ is at most in relation with itself.

To illustrate an example, suppose the data associated properties are elements of the set S={0, 1, 2, 3, 4, 5} and that the relation R is greater-than-or-equal-to "≥". If n=3 (there are 3 input data associated properties) and $DAP_1^{in}=0$, $DAP_2^{in}=0$, $DAP_3^{in}=2$, then $DAP^{out}$ satisfying the above condition may be 2, or 3, or 4, or 5. Any of these will result in working system, but choosing $DAP^{out}$ not to be 2 may result in over conservatism. Now suppose that data associated property 0 means lowest confidentiality and 5 the highest confidentiality. Data comprised of inputs of confidentiality 0 and 2 can be labeled as having a data associated property (DAP) of 2, but also 3, 4, or 5 would not result in in under classification. Clearly, the over conservatism may often not be desired.

It will thus be realized that equivalent operation of a system can be achieved by assigning different meanings to the data associated properties (DAP's) and changing the relation appropriately. For example, consider two systems, system A and system B. In system A suppose data associated properties are elements of set S={0, 1, 2, 3, 4, 5}, where 0 means lowest confidentiality and 5 the highest, and the relation R is greater-than-or-equal-to "≥". In system B suppose data associated properties are elements of set S={0, 1, 2, 3, 4, 5}, where 0 means highest publicity and 5 the lowest, and the relation R is less-than-or-equal "≥". By mapping the data associated property 0 of system A into 5 of system B, and 1 of system A into 4 of system B and so forth, and by mapping the relation greater-than-or-equal-to "≥" of system A to relation less-than-or-equal "≥" of system B, (and assuming everything else of system A and B are equal or of no impact), it is clear that system A and system B can be shown to result in equivalent behavior.

According to the above discussion then, a property (P1) can be defined whereby if the relation R additionally fulfills the reflexivity property: $\forall a \in S$: a R a, then there may exist one $DAP_i^{in}$ which is in relation with itself and all the other $DAP_k^{in}$ and thus, if assigned to $DAP^{out}$, the $DAP^{out}$ will comply with formula F and minimize conservatism. In many embodiments, implementation of a system that minimizes conservatism may be preferred.

It may be useful here to illustrate some examples of this property P1. Suppose first that the relation R is greater-than-or-equal-to "≥", then the above Property P1 is fulfilled for the relation R and: if $DAP^{out}=MAX(DAP_1^{in}, DAP_2^{in}, \ldots, DAP_n^{in})$ then $(DAP^{out} \geq DAP_1^{in}) \land (DAP^{out} \geq DAP_2^{in}) \land \ldots \land (DAP^{out} \geq DAP_n^{in})$ thus satisfying the formula F. Since the MAX function can be efficiently implemented (e.g., in processing logic), this is one possible efficient way of an embodiment of the system (or portions thereof).

Suppose now that the relation R is less-than-or-equal "≤", then the above property P1 is fulfilled for such a relation R and: if $DAP^{out}=MIN(DAP_1^{in}, DAP_2^{in}, \ldots, DAP_n^{in})$ then $(DAP^{out} \leq DAP_1^{in}) \land (DAP^{out} \leq DAP_2^{in}) \land \ldots \land (DAP^{out} \leq DAP_n^{in})$ thus satisfying the formula F. Since the MIN function can be efficiently implemented (e.g., in logic), this is another possible efficient way of implementing an embodiment of the system (or portions thereof).

As another example, suppose the data associated properties are elements of set S={0, 1, 2, 3, 4, 5}, where 0 means lowest confidentiality and 5 the highest, and the relation R is greater-than-or-equal-to "≥". Here, the $DAP^{out}$ that complies with formula F can be efficiently determined by calculating the MAX function of the input data associated properties. If, for instance, n=3 (there are 3 input data associated properties) and $DAP_1^{in}=0, DAP_2^{in}=0, DAP_3^{in}=2$, then $DAP^{out}$ satisfying formula F can be obtained as $DAP^{out}=MAX(DAP_1^{in}, DAP_2^{in}, DAP_3^{in})=MAX(0, 0, 2)=2$. It can be easily checked that this corresponds to the smallest confidentiality level that satisfies $(DAP^{out} \geq DAP_1^{in}) \land (DAP^{out} \geq DAP_2^{in}) \land (DAP^{out} \geq DAP_3^{in})$. Other examples, simple or complex relationships will be apparent from a review of the above. For instance, another example, of a simple relation is one where output DAP's are an upper bound for the input DAP's.

In some cases, there may be multiple transformation outputs from a transformation unit or processing block. When there are multiple transformation outputs (e.g., and thus multiple output DAP's), they may be determined such that all output DAP's are related with all input DAP's (more specifically that the formula F holds for all $DAP_j^{out}$). In many instances it is easiest and best to simply assign the same value satisfying formula F to all. If the goal is to minimize conservatism (as discussed above) then the "lowest" value satisfying the formula F should be used for all output DAP's. It will be understood that throughout this disclosure, the terms "generic data" and "data" are used interchangeably. The term "generic data" is introduced to emphasize that the "data" being discussed herein can be virtually any type of data (including the actual code or instructions being processed by a transformation unit or processing block). The same holds true for the case of DAP's versus "generic" DAP's, which may be further shortened to just "properties".

Not only may there be multiple transformation outputs, but additionally, in some embodiments there may be a complex relationship between input DAP's and output DAP's. In the general case, there can be systems with N sets of input DAP's and M sets of output DAP's. One possibility is that each output DAP is defined to be such that it is in relation with all input DAP's.

The relation is a k-ary relation (where k=N+1), described by ordered tuples $(x_1^{in}, x_2^{in}, \ldots, x_N^{in}, x_i^{out})$, where $1 \leq i \leq M$, and $x_1^{in} \in S_1^{in}, \ldots, x_N^{in} \in S_N^{in}$, and $x_1^{out} \in S_1^{out}, \ldots, x_M^{out} \in S_M^{out}$. In general, the elements $x_j^{in}$, where $1 \leq j \leq N$ may include all DAP's of all inputs and the DAP's may all be of distinct types (elements of distinct sets).

As some examples, for a first example assume the input sets are: confidentiality properties input set: $S_C^{in}=\{iCL, iCM, iCH\}$, the integrity properties input set: $S_I^{in}=\{iIL, iIM, iIH\}$ and the risk properties input set: $S_R^{in}=\{iRL, iRM, iRH\}$. Here the output sets may be: confidentiality properties output set: $S_C^{out}=\{oCL, oCM, oCH\}$, integrity properties output set: $S_I^{out}=\{oIL, oIM, oIH\}$ and the risk properties output set: $S_R^{out}=\{oRL, oRM, oRH\}$.

As another example, the following is an example of a 4-ary relation R for risk (which, in the example discussed here may be different than before), assuming only one input and one output: where $(c^{in}, i^{in}, r^{in}, r^{out}) \in R$, R is relation on $S_C^{in} \times S_I^{in} \times S_R^{in} \times S_R^{out}$ and the $r^{out}$ is selected such that it is in relation with all 3 input properties. The risk can also be expressed with binary relation B if a new set of ordered tuples are defined: $T=S_C^{in} \times S_I^{in} \times S_R^{in}$, and appropriate relation B from set T to the set $S_R^{out}$ where $(t, r) \in B$ and $t \in T$, $r \in S_R^{out}$. The same may be the case equivalently for all other outputs (e.g., 2 additional relations are obtained).

Considering multiple inputs (e.g., for the above example), there may be multiple choices. Embodiments may require that the output is in 4-ary relation with each of the 2 inputs, specifically: $(c_1^{in}, i_1^{in}, r_1^{in}, r^{out}) \in R$ and $(c_2^{in}, i_2^{in}, r_2^{in}, r^{out}) \in R$. Embodiments may also require that the output is in the 7-ary relation U, specifically: $(c_1^{in}, i_1^{in}, r_1^{in}, c_2^{in}, i_2^{in}, r_2^{in}, r^{out}) \in U$, or some other combination thereof.

Another possibility is that each output DAP is determined such that it is in relation with all the input and other output DAP's. So, in certain cases it may be also possible to have a k-ary relation (where k=N+M), described by ordered tuples $(x_1^{in}, x_2^{in}, \ldots, x_N^{in}, x_1^{out}, x_2^{out}, \ldots, x_M^{out})$, where $x_1^{in} \in S_1^{in}, \ldots, x_N^{in} \in S_N^{in}$, and $x_1^{out} \in S_1^{out}, \ldots, x_M^{out} \in S_M^{out}$.

Figure 2:
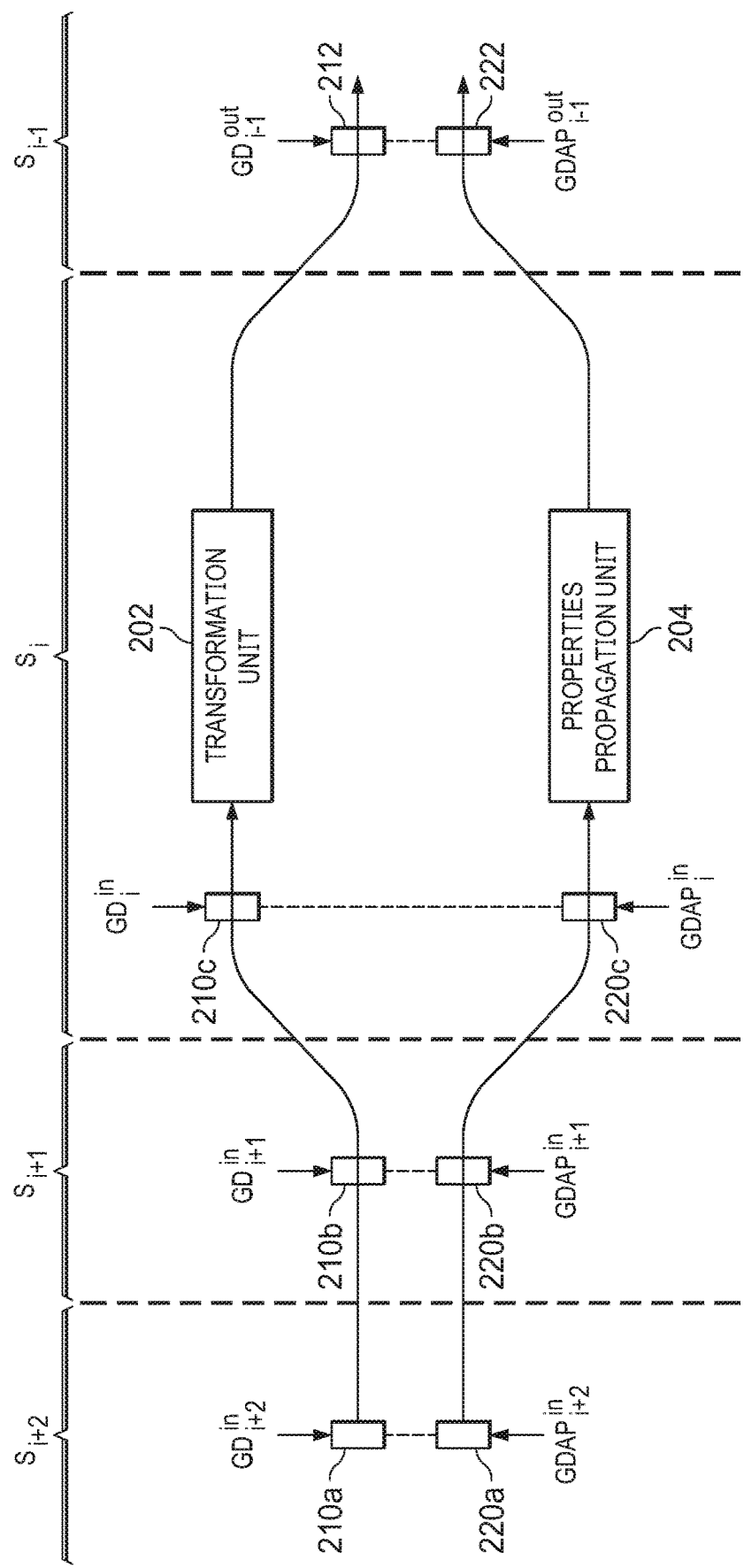
FIG. 2 is a block diagram for an embodiment of a computing system for securing data through the generation of data associated properties.

Moving then to FIG. 2, a block diagram for an embodiment of a system for securing data (or enforcing other properties) through the generation of DAP's is depicted. Here, the system comprises a computing system including a transformation unit 202 and a corresponding properties propagation unit 204. Transformation unit 202 can perform any (arbitrary) transformation T on the input generic data (GD) 210 to produce the transformed generic data at the output. The transformation unit 202 may thus be a collection of processing logic such as a Central Processing Unit (CPU) or Arithmetic Logic Unit (ALU) or almost any other type of processing device.

Thus, embodiments of a computing system include properties propagation unit 204 distinct from the transformation unit 202. The transformation unit 202 includes first logic for processing input data (e.g., data, including an instruction for the transformation unit 202) by applying a transform to the input data to generate an output datum corresponding to an input datum of the input data received at the transformation unit 202. Each and every input datum received at the transformation unit may have a corresponding input DAP distinct from that input datum and specific to that input datum. The DAP can, for example, comprise a data confidentiality level or a data integrity level.

The properties propagation unit 204 may include second logic for receiving the input DAP corresponding to the input datum received at the transformation unit 202 and generate an output DAP corresponding to, and synchronized with, the output datum generated by the transformation unit by applying a relation to the input DAP. This relation may (or not) be, for example, based on the transform applied by the transformation unit 202.

More specifically, the transformation unit 202 may (or not) have an internal state, and the resulting generic data may (or not) depend on internal state of the transformation unit 202. Generic data 210 (e.g., $GD_i^{in}$, $GD_{i+1}^{in}$ and $GD_{i+2}^{in}$) is used as input to the transformation unit 202. Any aspect of this input data 210 may change between each application of the transformation T applied by the transformation unit 202. Note that $GD_i^{in}$ is not required to be independent or different from $GD_{i-1}$. $GD_i^{in}$ may even comprise $GD_{i-1}$. This implies there may be a feedback loop in the data dependencies, which is not uncommon in many algorithms.

It may be understood that the mechanism that controls the flow of operands to and from the transformation unit 202 (and thus defines or constructs its dependencies cone) is essentially how a generic data processing device or system operates (be it CPU, GPU, DSP, database, document system, etc.). The design and description of such a mechanism will be understood as being specific to a given implementation of a data processing device or system. However, it is assumed such a mechanism exists (otherwise the data processing device or system cannot operate) and thus, it is clear that it would be straightforward for the designer of a data processing device of the system to be able to tap into it (or to replicate it) in order to meet the requirements related to the dependency cone of the properties propagation unit.

Generic data 212 (e.g., $GD_{i-1}^{out}$) is thus output from the transformation unit 202. The generic data output 212 by the transformation unit 202 depends on the corresponding generic data input 210 to the transformation unit 202 to which the transformation T was applied, as well as the transformation T itself.

It will noted here that the generic data is marked as $GD_i^{in}$, $GD_i^{out}$ etc., where the superscript "in" or "out" is just notational help indicating if a transformation (e.g., T) was already applied to it or not, and the subscript is an index to distinguish between "chunks" of generic data that are the inputs to or outputs of one application of the transformation. The form of the generic data can be arbitrary, including content, size, multiplicity, type and formatting and any of these may (or may not) vary with the index.

Steps ($S_{i+2}$, $S_{i+1}$, $S_i$, $S_{i-1}$) each indicate a step in which the transformation T is applied once to one or more of generic input data 210 by the transformation unit 202 to obtain the generic output data 212. In other words, in step $S_i$, the transformation is applied to $GD_i^{in}$ to produce the output $GD_i^{out}$. The depiction of FIG. 2, includes generic data belonging to four steps, the i−1$^{th}$, the i$^{th}$, i+1$^{th}$ and i+2$^{th}$ step. The transform T is still to be applied to $GD_i^{in}$, $GD_{i+1}^{in}$ and $GDP_{i+2}^{in}$, while the $GD_{i-1}^{out}$ is the result of transform's application to $GD_{i-1}^{in}$. The application of transform T on the generic input data that results in generic output data in step i may be written as $$GD_i^{in} \xrightarrow{\text{transform T}} GD_i^{out},$$

or equivalently $GD_i^{out} = T(GD_i^{in})$. The number of steps and thus number of applications of the transform T is not limited. Moreover, the generic data inputs $GD_i^{in}$ may influence the transformation in an arbitrary way. For example, in case of a CPU, the generic data $GD_i^{in}$ may comprise either 'data' or 'code'. CPU instructions with immediate values (for example addi r5,r7,0x11, where 0x11 is immediate) are simple examples of how data and code can be intertwined.

Generic DAP's 220 (e.g., $GDAP_i^{in}$, $GDAP_{i+1}^{in}$ and $GDAP_{i+2}^{in}$) associated with the generic data 210 provided to the transformation unit 202 are provided as input to the properties propagation unit 204. Each $GDAP_i^{in}$ 220 may comprise multiple different properties, for example confidentiality, integrity, risk, freshness, etc. These properties track the properties of the corresponding generic data $GD_i^{in}$ 210 to which they are associated. For example, $GD_i^{in}$ generic data 210c may comprise two 32-bit values (V1 and V2), and each of these may have distinct confidentiality (c) and integrity (i) properties associated with the values. In such a case the $GDAP_i^{in}$ 220c may comprise $\{c_{V1}, i_{V1}, c_{V2}, i_{V2}\}$.

These generic DAP's 220 are associated with input generic data 210, such that the i-th $GDAP_i^{in}$ is associated with the i-th $GD_i^{in}$ and so forth (e.g., generic DAP 220a is associated with generic input data 210a, generic DAP 220b is associated with generic input data 210b, etc.).

Based on the input generic DAP's 220 ($GDAP_i^{in}$, $GDAP_{i+1}^{in}$ and $GDAP_{i+2}^{in}$), the properties propagation unit 204 will determine output generic DAP's 222 (e.g., $GDAP_{i-1}^{out}$) associated with output generic data 212 (e.g., $GD_{i-1}^{out}$). The properties propagation unit 204 determines these generic output DAP's 222 based on the input generic DAP's 220 (e.g., $GDAP_i^{in}$, $GDAP_{i+1}^{in}$ and $GDAP_{i+2}^{in}$) corresponding to the generic data 210 (e.g., $GD_1^{in}$, $GD_{i+1}^{in}$ and $GD_{i+2}^{in}$) provided to the transformation unit 202 (e.g., on which the transformation T was applied by the transformation unit 202 to generate output generic data 212 (e.g., $GD_{i-1}^{out}$)).

The properties propagation unit 204 determines the generic output DAP's 222 in such a way that the generic output DAP's 222 are in relation R with generic input data associated properties (e.g., $GDAP_i^{in}$, $GDAP_{i+1}^{in}$ and $GDAP_{i+2}^{in}$). The relation R may comprise multiple relations. For example: if a GDAP is comprised of the confidentiality property and an integrity property, then the relation R may have a property that it is comprised of relation Rc defined between the confidentiality properties and relation Ri defined between the integrity properties. The relation R in such a case is separable into two relations, Rc and Ri.

Figure 3:
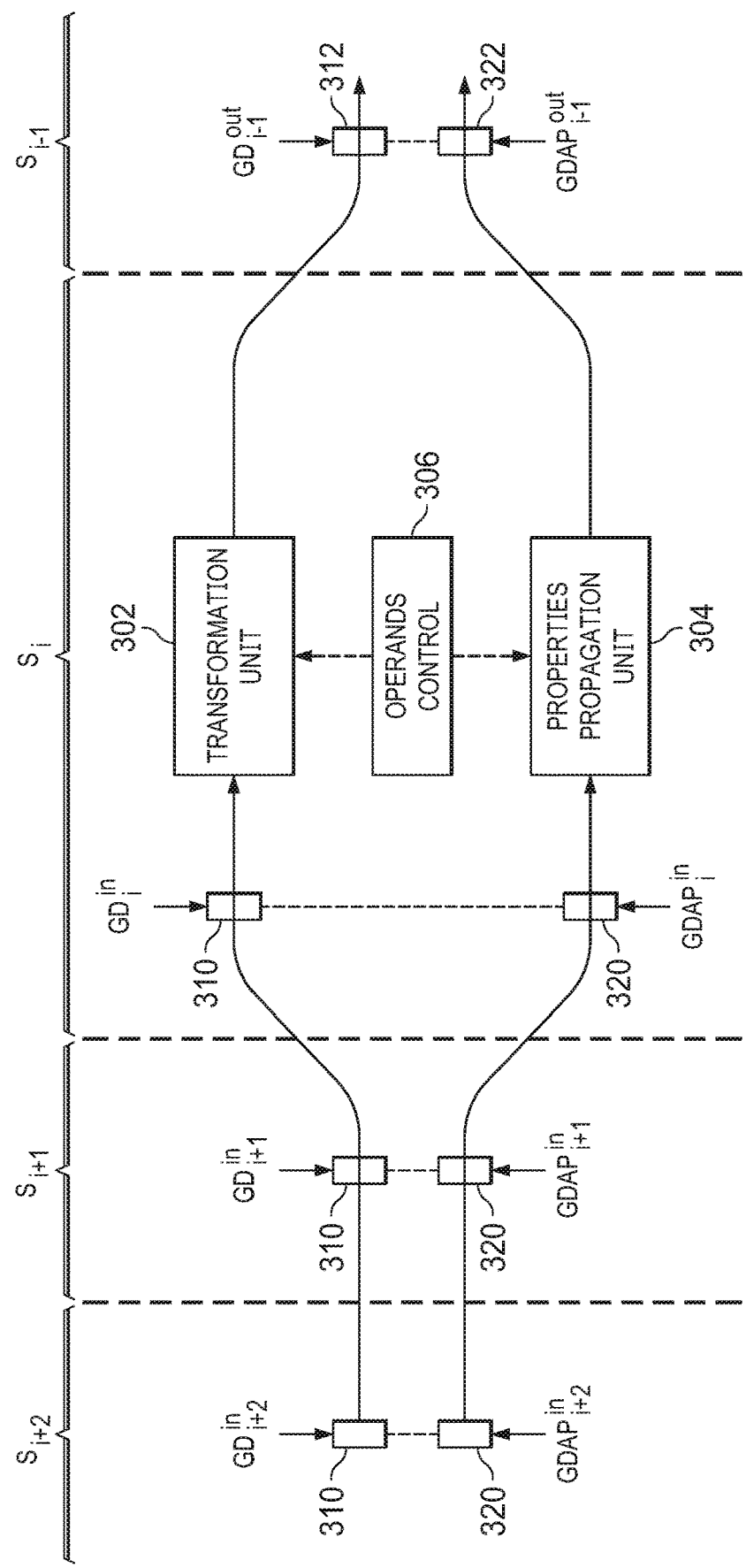
FIG. 3 is a block diagram depicting an embodiment of a computing system for securing data.

It will be noted then, that in some embodiments, the properties propagation unit will operate in synchronicity with the transformation unit. FIG. 3 depicts an embodiment of a system of securing data that highlights that in certain embodiments, the dependency cones of operands entering the transformation unit 302 and properties propagation unit 304 will match. To coordinate these dependency cones, embodiments may utilize operands control logic 306 that controls the operand flow of transformation unit 302 (e.g., which is part of the data processing device or system) and leverage it to also control the flow of operands into properties propagation unit 304. Thus, operands control logic 306 utilized to control the flow of generic data $GD_i^{in}$ into transformation unit 302 may also control the flow of generic data associated properties $GDAP_i^{in}$ into properties propagation unit 304 such that the input of generic data $GD_i^{in}$ into transformation unit 302 is synchronized with the input of the corresponding generic data associated properties $GDAP_i^{in}$ into properties propagation unit 304.

To describe this synchronization in another way, for each determination of the output GD 312 through application of transformation T on the input GD 310 by transformation unit 302, there is a corresponding determination of the output GDAP 322 such that the output GDAP 322 is in relation R with the corresponding input GDAP 320 that is associated with such input GD 310.

In the case with multiple input 310 and multiple output GD's 312, for each transformation by transformation unit 302 of GD inputs 310 resulting in one or more GD outputs 312, there is a corresponding determination of GDAP outputs 322 such that each output GDAP 322 is in relation R with all input GDAP's 320 that are associated with such input GD's 310.

Specifically, in certain embodiments, a set of input data may be received at the transformation unit and a set of output data may be generated by the transformation unit by applying the transform to generate the set of output data based on the set of input data.

Each of the set of input datums may have corresponding input DAP's distinct from that input datum and specific to that input datum, where each of the corresponding input DAP's for the set of input datums is provided to the properties propagation unit. The properties propagation unit can generate a set of output DAP's comprising each output DAP corresponding to each of the set of output datums generated by the transformation unit.

Figure 4:
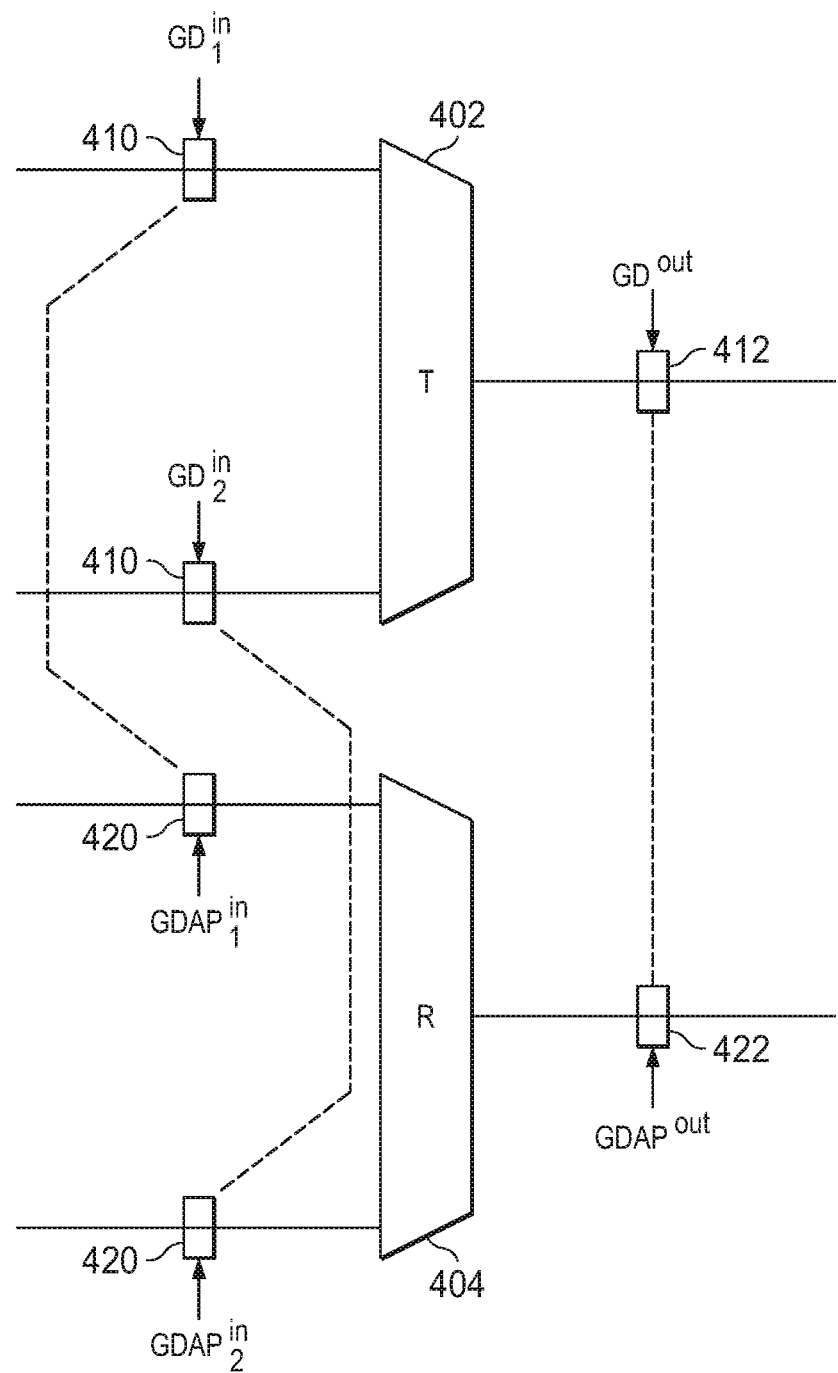
FIGS. 4 and 5 are block diagrams depicting synchronization of multiple inputs and multiple outputs.
Figure 5:
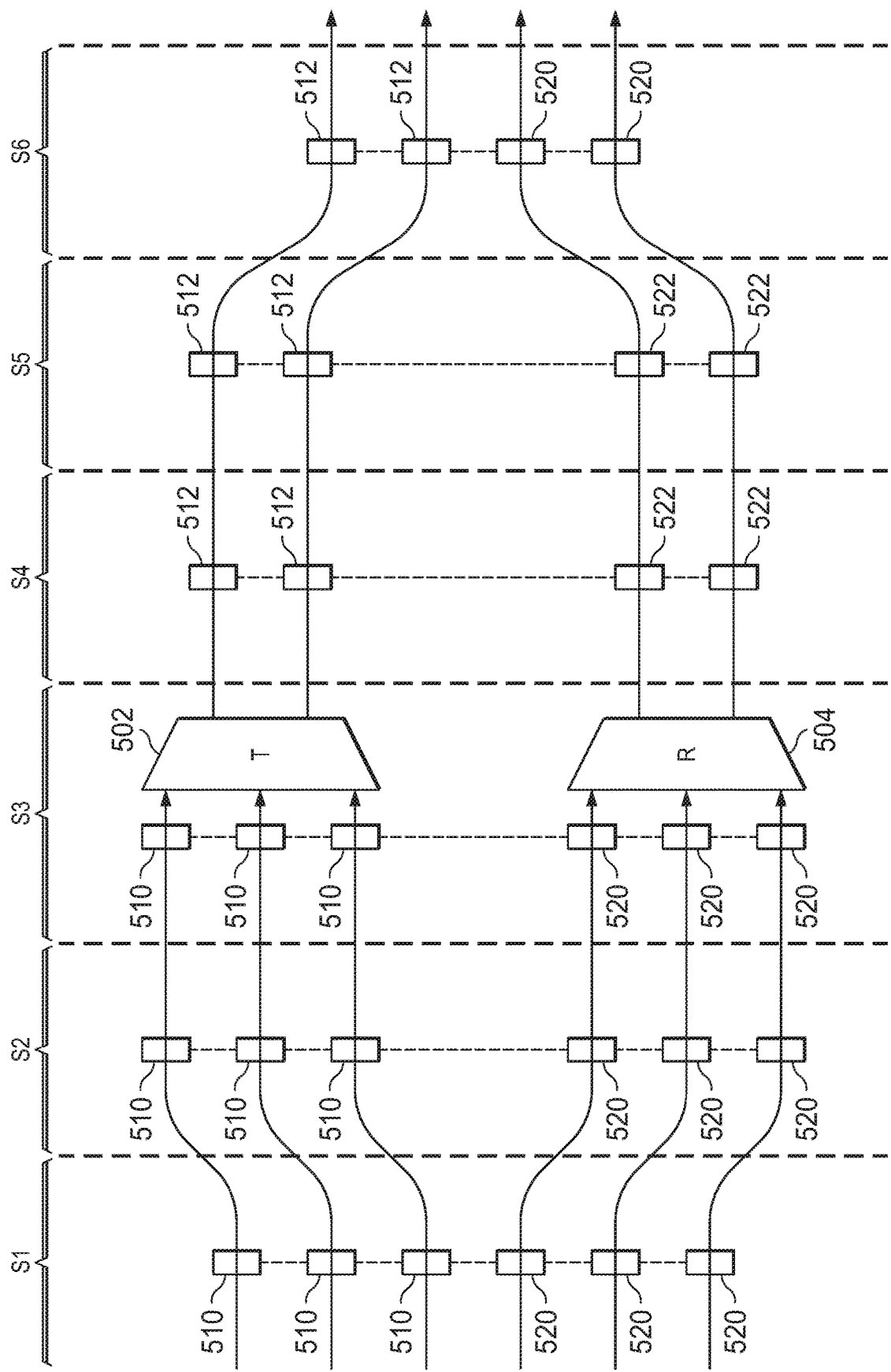

This synchronization of multiple inputs and multiple outputs according to embodiments is illustrated in FIGS. 4 and 5. FIG. 4 is a block diagram depicting an example of a two input GD's 410 into a transformation unit 402 and their association with corresponding input GDAPs 420 into properties propagation unit 404 such that the output GDAP 422 is associated with output GD 412 and is in relation R with the corresponding input GDAPs 420 that are associated with such input GD's 410 that resulted in output GD 412. FIG. 5 is a block diagram illustrating an example of an embodiment with multiple GD inputs 510 transformed into multiple GD outputs 512 by transformation unit 502. In each step (S1, S2, etc.), each of the output GDAP's 522 is determined by properties propagation unit 504 such that it is in relation with all of the input GDAP's 520 of said step (S).

As embodiments of the systems for securing data disclosed may utilize a properties propagation unit generating DAP's associated with generic output data generated by a transformation unit, embodiments of the system can be understood in terms of two independently-operating domains: a data domain and a properties domain. The data domain (sometimes referred to as a mission domain) is where the generic data GD is processed as it would be in any data processing system by passing through (at least) one transformation applied by a transformation unit. The way generic data is processed determines the data flow dependency graph. The additional properties domain is where the generic data associated properties GDAP associated with the generic data GD are processed according to the same data flow dependency graph as the data domain—with the difference that the transformation(s) T of the transformation unit are replaced with relation(s) R of the properties propagation unit.

Note then that the synchronization between data processing by the transformation unit and properties processing by the properties propagation unit may not be necessarily evaluated in real time, simultaneously, or even interleaved, but rather on the level of the data flow dependency graph, which is determined by the data domain processing path of the transformation unit. This data processing dependency cone is then used by the properties domain processing of the properties propagation unit.

Embodiments may thus achieve synchronization of the transformation unit and the properties propagation unit in a number of different manners. In one embodiment, a bus carrying GD (e.g., to the transformation unit) is extended to additionally carry the GDAP (e.g., to the properties propagation unit). Just before entering the transformation unit, such a bus may be split into two separate buses; one carrying GD and going into the transformation unit and the other going to the properties propagation unit. The bus exiting the transformation unit and carrying the output GD is then combined with the bus exiting the properties propagation unit carrying the GDAP. If required, the properties propagation unit output or transformation unit output is delayed so that GD and GDAP outputs are in sync.

In some embodiments, the data flow dependency graph is logged during data processing. The operation of the properties propagation unit on GDAP is then performed out of order with data processing. In the case where the data flow dependency graph is known ahead of time (e.g., because it is static), the data flow dependency graph can be used to determine GDAP even before the data processing is performed—as long as input GDAP's are also known ahead of time. An example of such a case is when GDAP's of data are determined according to a device from which the data originates.

The transformation unit and properties propagation unit may be realized as two (or more) processors working in synchronization (e.g., in lockstep mode), where the processor T of the transformation unit handles the data processing and a second (e.g., possibly simplified) processor P of the properties propagation unit implements the logic for determining the resulting data associated properties. The data dependency flow graph of the processor T that is not deducible by processor P may be transmitted in the form of trace data from processor T to processor P. One possible realization of this communication is to use the trace data from the processor T's trace port, such as a trace port intended for debugger support or the like.

Accordingly, the GD and GDAP that are associated with each other may be always transferred as one single transaction (e.g., a single transaction, in the sense of an atomic transaction on an interconnect bus or an atomic database transaction, where either all elements of the transaction are performed or none are). The GD transformation and GDAP determination is then computed as an atomic operation. The results may then also be transmitted as one transaction.

It may now be useful to illustrate a few examples. FIGS. 6A and 6B are a block diagram illustrating an example of the operation of embodiments in the data domain and the properties domain. Specifically, in FIG. 6A an example of a data flow graph with processing blocks marked as PB, $PB_1$ and $PB_2$. In FIG. 6B is the same data flow dependency graph for the properties propagation, with the "*" and "+" transformations 602a, 602b of FIG. 6A each replaced by an instance of relation R 604. The DAP in the example shown is "c", the confidentiality, where L means "low" confidentiality and M means "high" confidentiality. Thus, FIG. 6A is an example of the data flow graph (e.g., data processing steps achieved through the application of transformations "*" 602a and "+" 602b on the inputs $D_1$, $D_2$, $D_3$ and $D_4$) while an illustration of the corresponding DAP's determination is shown in FIG. 6B.

As can be seen, the "+" transformation 602b cannot be performed before all its inputs are resolved. The example data processing is thus performed in two steps; and accordingly, the determination of the data associated properties must also be performed in two steps as is illustrated in FIG. 6B.

Specifically, in this example, DAP's 608 (and 618) are from the set S={L, M, C}. The relation R 604 is reflexive, antisymmetric and transitive with the following pairs of elements of S being in relation R: M R L, C R M, C R L (and as follows from reflexivity, L R L and M R M and C R C). This example illustrates that generic data may be comprised of multiple parts (which is also generic data). Below the $GD_{S1}^{in}$ is input generic data of the Step S1 (e.g., $PB_1$). The $D_1$ and $D_2$ are also generic data. As can be seen, this is similarly the case for GDAP's 608.

In step S1, the input generic data $GD_{S1}^{in}$ comprises $D_1$ and $D_2$: $GD_{S1}^{in}=\{D_1, D_2\}=\{7, 3\}$. The input generic data associated properties $GDAP_{S1}^{in}$ comprises $DAP_1$ 608a and $DAP_2$ 608b $GDAP_{S1}^{in}=\{DAP_1, DAP_2\}=\{L, L\}$. The output generic data $GD_{S1}^{out}$ 606a is obtained by applying the transformation "*" 602a to input generic data:

$$GD_{S1}^{in} \xrightarrow{\text{transform *}} GD_{S1}^{out},$$

Here, the $GD_{S1}^{out}$ 606a comprises $D_4$.

The output generic DAP's $GDAP_{S1}^{out}$ 618a are determined such that $GDAP_{S1}^{out}$ 618a are in relation R with $GDAP_{S1}^{in}$:

$$GDAP_{S1}^{out} \xrightarrow{\text{is in relation R with}} GDAP_{S1}^{in},$$

specifically that $(DAP_4 \text{ R } DAP_1) \wedge (DAP_4 \text{ R } DAP_2)$. $DAP_4=L$ is the least conservative possibility. The $GDAP_{S1}^{out}$ comprises $DAP_4$: $GDAP_1^{out}=\{DAP_4\}=\{L\}$.

In step 2 (S2), the input generic data $GD_{S2}^{in}$ comprises $D_4$ and $D_3$: $GD_2^{in}=\{D_4, D_3\}=\{21, -1\}$. The input generic data associated properties $GDAP_{S2}^{in}$ comprises $DAP_4$ and $DAP_3$: $GDAP_{S2}^{in}=\{DAP_4, DAP_3\}=\{L, M\}$. The output generic data is obtained by applying the transformation "+" to input generic data:

$$GD_{S2}^{in} \xrightarrow{\text{transform +}} GD_{S2}^{out},$$

The $GD_{S2}^{out}$ 606b comprises $D_5$.

The output generic data associated properties $GDAP_{S2}^{out}$ 618b are determined such that $GDAP_{S2}^{out}$ 618b is in relation R with $GDAP_{S2}^{in}$:

$$GDAP_{S2}^{out} \xrightarrow{\text{is in relation R with}} GDAP_{S2}^{in},$$

specifically that $(DAP_5 \text{ R } DAP_4) \wedge (DAP_5 \text{ R } DAP_3)$. $DAP_5=M$ may be the least conservative possibility. The $GDAP_{S2}^{out}$ comprises $DAP_5$: $GDAP_{S2}^{out}=\{DAP_{S2}^{out}\}=\{M\}$.

It will be noted that embodiments of the system may work as intended also if the internal details (implementation) of processing block PB are either not known or are ignored. In such a case, only the generic data input (e.g., comprising $D_1$, $D_2$, $D_3$) and output generic data ($D_5$) of the transform implementing complete PB block functionality are important (and the internal details of the transform and its composition of "*" and "+" are not relevant). In such a case, the $DAP_5$ is determined such to be in relation R with all of $DAP_1$, $DAP_2$ and $DAP_3$.

Figure 7B:
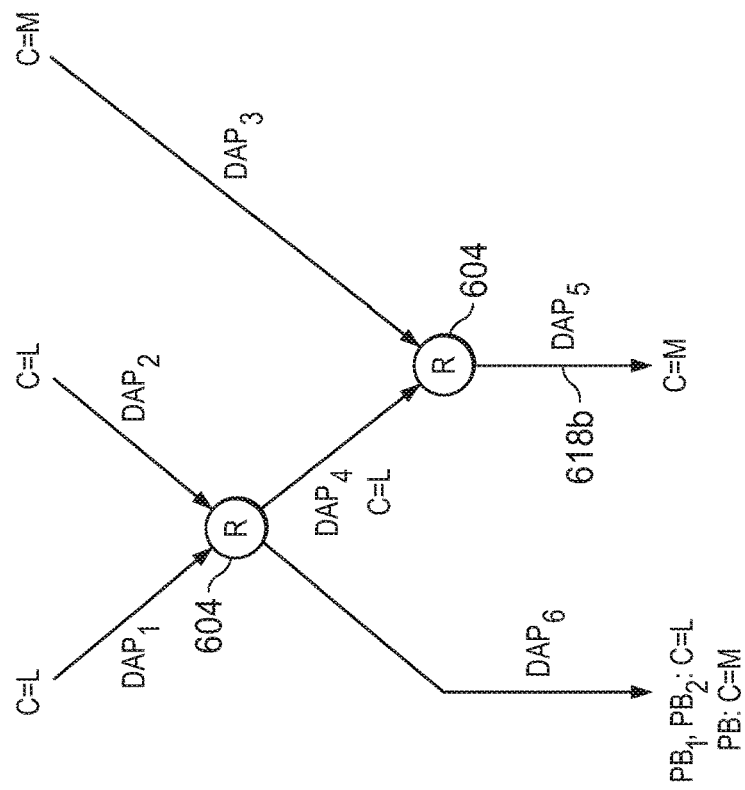
FIGS. 7A and 7B are block diagrams depicting examples of data flow graphs.
Figure 7A:
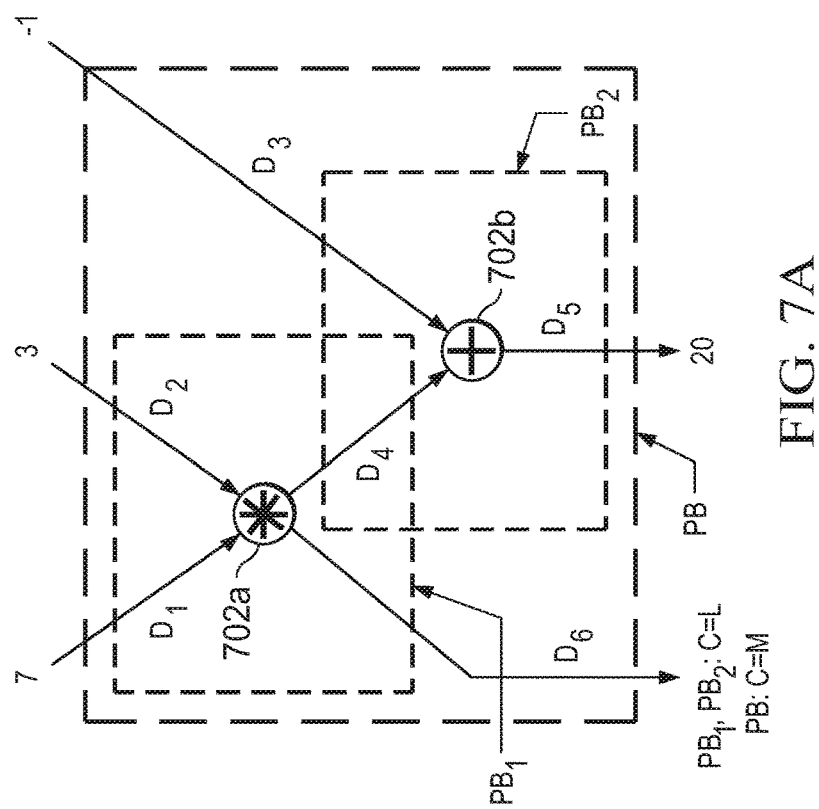

Another example of the operation of embodiments in the data domain and the properties domain is illustrated in FIGS. 7A and 7B, which illustrates an example similar to FIGS. 6A and 6B with an additional $D_6$ generic data output and corresponding generic DAP output $DAP_6$. In FIG. 7A, here the data flow graph for the transformation unit may contain the transformation "*" 702a with an additional output $D_6$ (for the purpose of this example, it does not matter if $D_6$ is the upper part of the multiplication result, or if $D_6$ is a duplication of $D_5$).

In the illustrated example, the internal details of processing block PB (being comprised of two processing blocks $PB_1$ and $PB_2$ such that the transformations "*" 702a and "+" 702b) are connected in the specific manner shown. FIG. 7B depicts a breakdown of the dependency graph of FIG. 7A. The additional $DAP_6$ in FIG. 7B is determined so that it is in relation with both $DAP_1$ and $DAP_2$, and thus can be assigned c=L.

These examples and the partitioning of PB into $PB_1$ and $PB_2$ can be understood in the context of processor microcode. The DAP's may be propagated on the level of instructions (in the example, the multiply-and-accumulate (or MAC) instruction represented by block PB) or on the level of microcode (separated multiply "*" and addition "+" microcode instructions represented by $PB_1$ and $PB_2$).

It is important to note that GDAP's may comprise different properties that are updated (e.g., computed or otherwise generated or obtained) at different hierarchical levels of the processing block. In the illustrated example, the confidentiality property may be determined and updated on a microcode level ($PB_1$, $PB_2$), while some other property like integrity or instruction count may be determined on the consolidated MAC instruction hierarchical level (PB).

Figure 8B:
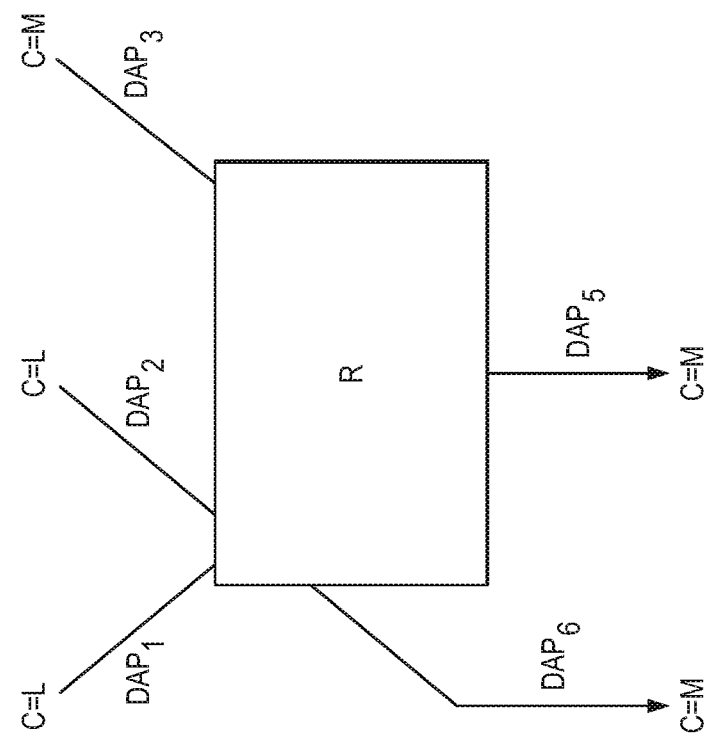
FIGS. 8A and 8B are block diagrams depicting examples of data flow graphs.
Figure 8A:
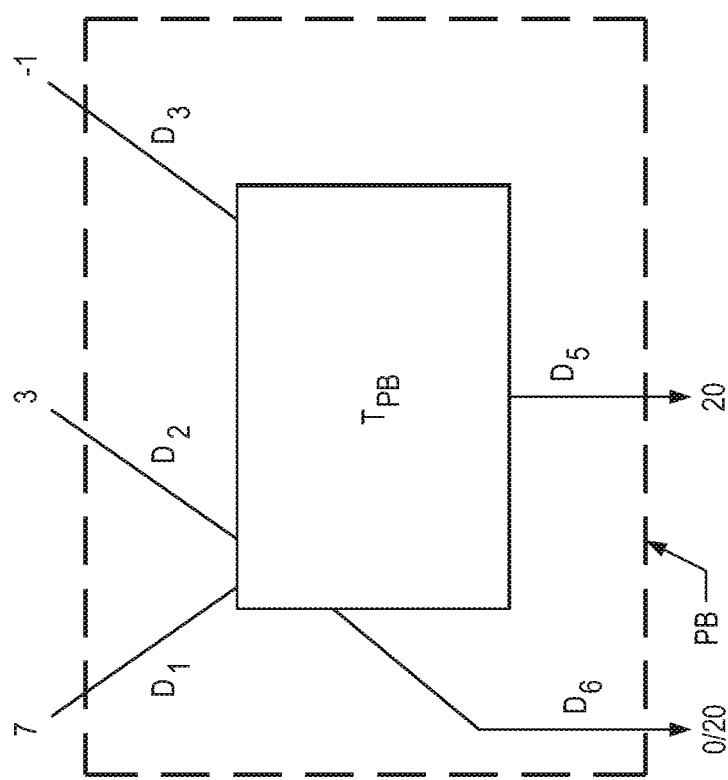

Now referring to FIGS. 8A and 8B, if the details of the PB implementation are not known or simply not relevant, then these details either cannot or need not be taken into account. Thus, in this example, both $DAP_5$ and $DAP_6$ are determined such that they are in the relation R with all $DAP_1$, $DAP_2$, $DAP_3$, resulting in $DAP_5$ and $DAP_6$ both being assigned c=M in the illustrated example.

The illustrated example of FIGS. 8A and 8B show how less detail (either because it is not known or simply not taken into account) may result in more conservative determination of DAP's. In both cases (with more detail as illustrated in FIGS. 7A and 7B and with less detail as illustrated in FIGS. 8A and 8B) the values of $DAP_6$ and $DAP_5$ illustrate that in the dependency cone of $D_5$ and $D_6$ there is no data with DAP c=H. However, if more details of PB are known and taken into account then, as illustrated in FIGS. 7A and 7B, as $D_6$ does not, in fact, depend on any data with DAP c=H or c=M, $DAP_6$ can thus be assigned $DAP_6$=L.

This assignment can be expressed more formally as $D_1$, $D_2$, $$D_3 \xrightarrow{\text{transform T\_PB}} D_5,$$

$D_6$ and thus: $DAP_5$ such that $(DAP_5 \text{ R } DAP_1) \wedge (DAP_5 \text{ R } DAP_2) \wedge (DAP_5 \text{ R } DAP_3)$, and $DAP_6$ such that $(DAP_6 \text{ R } DAP_1) \wedge (DAP_6 \text{ R } DAP_2) \wedge (DAP_6 \text{ R } DAP_3)$.

As mentioned above, embodiments as disclosed herein may be equally effectively utilized when the generic data (GD) comprises code (e.g., instructions) that is actually being executed (or that is to be executed) by the transformation unit of the system.

Figure 9:
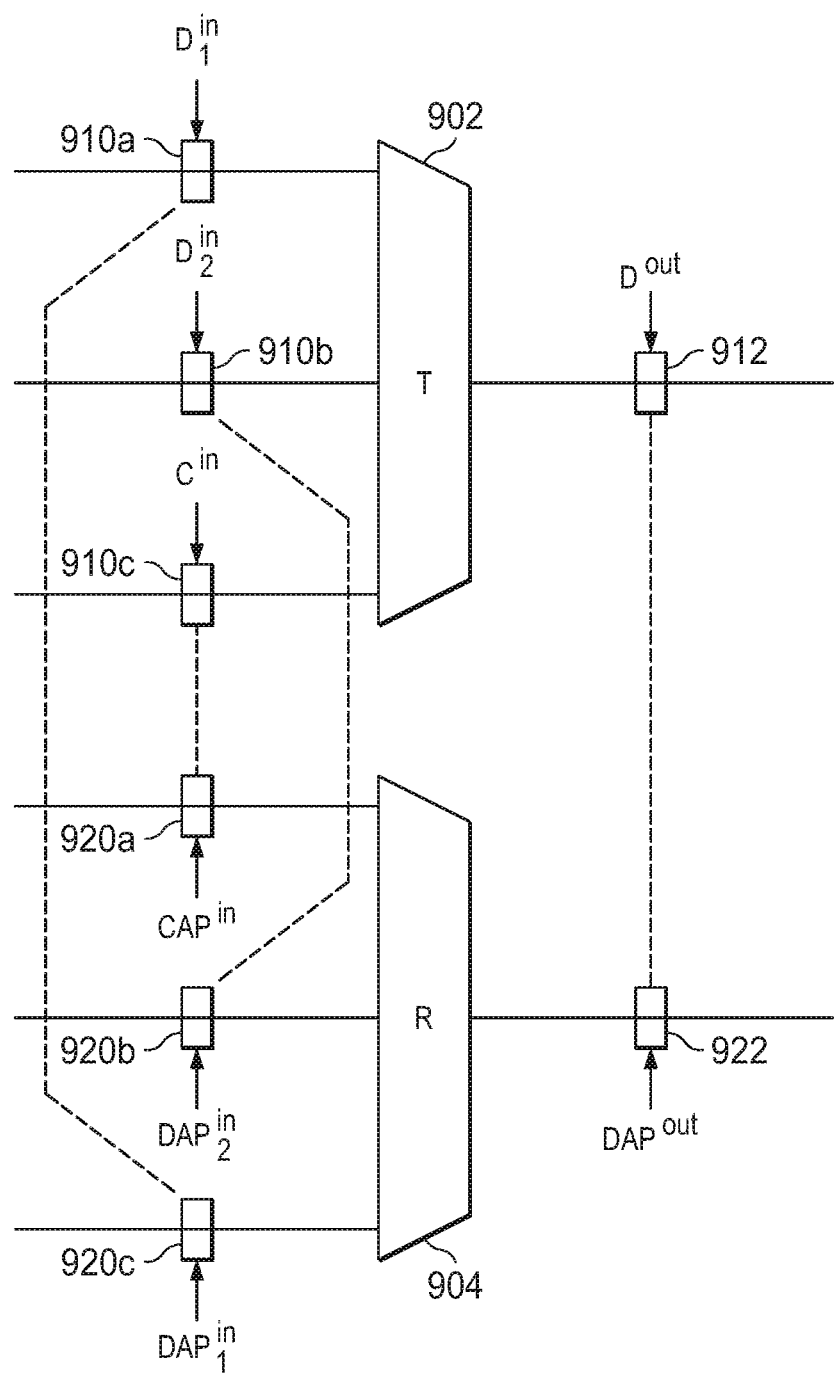
FIG. 9 is a block diagram depicting a computing system according to an embodiment.

FIG. 9 is a block diagram illustrating how some embodiments may handle the generation of data associated properties for generic data that comprises code. In particular, it may be understood that, ultimately, code is just a means to influence the operation of the transformation T of the transformation unit, and it can thus be handled as generic data (or part of it) upon which the output of transform T of the transformation unit depends. Here, only inputs and outputs of one step (e.g., such as a step associated with a processing block) of a transform application are shown with the dotted lines representing associations between the various generic data and the generic DAP's associated to it. Thus, transformation step 902 may receive generic inputs 910, including a (code) generic data input $C^{in}$ 910c and two generic data inputs, $D_1^{in}$ 910a and $D_2^{in}$ 910b. The properties propagation step 904 may thus receive corresponding input generic DAP's 920, including a code data associated property $CAP^{in}$ 920a corresponding to a code generic data input $C^{in}$ 910c, input generic data associated property $DAP_1^{in}$ 920c corresponding to generic data input $D_1^{in}$ 910a and input generic data associated property $DAP_2^{in}$ 920b corresponding to generic data input $D_2^{in}$ 910b. The properties propagation step 904 may thus generate output generic data properties $DAP^{out}$ 922 corresponding to generic output data 912.

Figure 10:
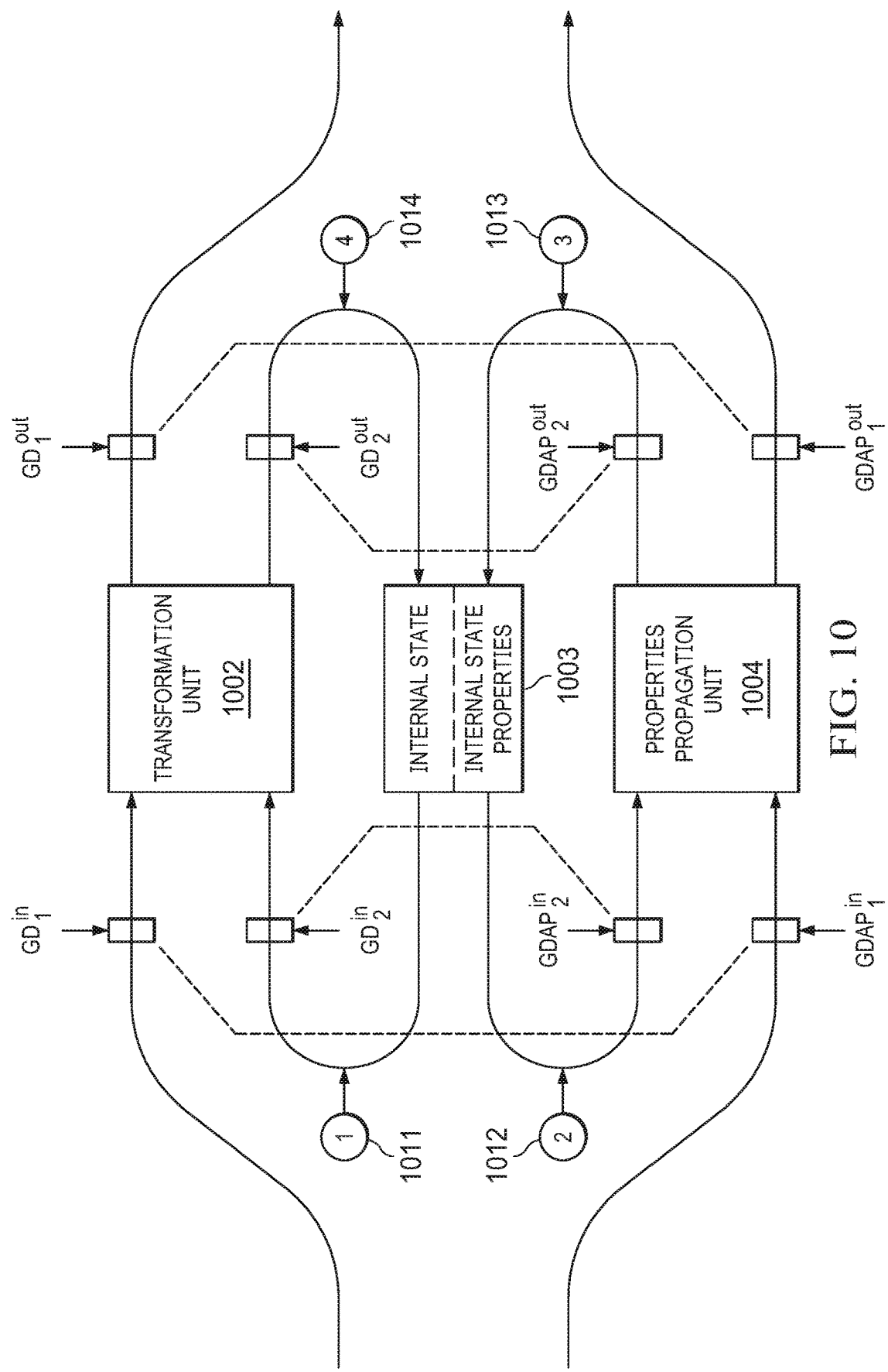
FIG. 10 is a block diagram depicting a computing system according to an embodiment.

FIG. 10 is block diagram illustrating how embodiments may process generic data where this generic data can originate from, and influence, an internal state of the transformation unit or the properties propagation unit of the system. In this embodiment, the system may include the transformation unit 1002, the properties propagation unit 1004 and internal state logic 1003. Internal state logic 1003 may include logic or a computer readable storage medium for storing or passing though generic data, including an internal state.

Internal state logic 1003 may include, for example, a portion for use with transformation unit 1002 or a portion for use by the properties propagation unit 1004. An internal state can be, for example, held in internal state logic 1003 comprising memory (for example flip flops, SRAM, etc.) together with an associated GDAP (e.g., in additional memory of internal state logic 1003), or passed through (for example by simple wires, bus transactions, etc. of internal state logic 1003) together with an associated GDAP (e.g., through additional wires, as part of same bus transaction with GD, etc.).

In certain embodiments then, internal state logic 1003 may store at least one of the set of output datums generated by the transformation unit 1002 and at least one of the corresponding output DAP's generated by the properties propagation unit 1004, and provide at least one subsequent input datum to the transformation unit 1002 and at least one subsequent input DAP corresponding to the at least one subsequent input datum provided to the properties propagation unit 1004.

Examples of such internal states may include a register or register file in a CPU implemented from flip flops. The GD may be the content of each register with additional associated data properties GDAP (e.g., also stored in flip flops), such that every read/write of a register results in a read/write of the associated GDAP. Other examples of such internal states may include a carry bit, indication or flag for supervisor mode, global variables, memory content or other states of transformation unit 1002 or properties propagation unit 1004.

Thus, for example, with respect to transformation unit 1002, generic data that may be input to transformation unit 1002 (e.g., $GD_2^{in}$) may be provided from internal state logic 1003 associated with the transformation unit 1002 while output generic data from the transformation unit 1002 (e.g., $GD_2^{out}$) may be stored (or pass through) internal state logic 1003 associated with the transformation unit 1002, such that it can be provided back to the transformation unit 1002 at a subsequent time as input generic data (or used to influence or determine the subsequent generic data input to transformation unit 1002).

Similarly, with respect to properties propagation unit 1004, generic DAP's that may be input to properties propagation unit 1004 (e.g., $GDAP_2^{in}$) may be provided from internal state logic 1003 associated with the properties propagation unit 1004 while output generic data from the properties propagation unit 1004 (e.g., $GDAP_2^{out}$) may be stored (or pass through) internal state logic 1003 associated with the properties propagation unit 1004, such that it can be provided back to the properties propagation unit 1004 at a subsequent time as input generic DAP (or used to influence or determine the subsequent generic DAP input to properties propagation unit 1004).

It will be noted here that by providing an internal state from internal state logic 1003 as generic data input to transformation unit 1002 (e.g., $GD_i^{in}$) (path 1011), storing generic data output from transformation unit 1002 (e.g., $GD_i^{out}$) in internal state logic 1003 (path 1014), providing an internal state from internal state logic 1003 as generic DAP's input to properties propagation unit 1004 (e.g., $GDAP_i^{in}$) (path 1012) and storing generic DAP outputs from the properties propagation unit 1004 (e.g., $GDAP_i^{out}$) in internal state logic 1003 (path 1013) are independent pathways. Thus, various embodiments may or may not contain any of these explicit GDAP-dedicated pathways.

Figure 11:
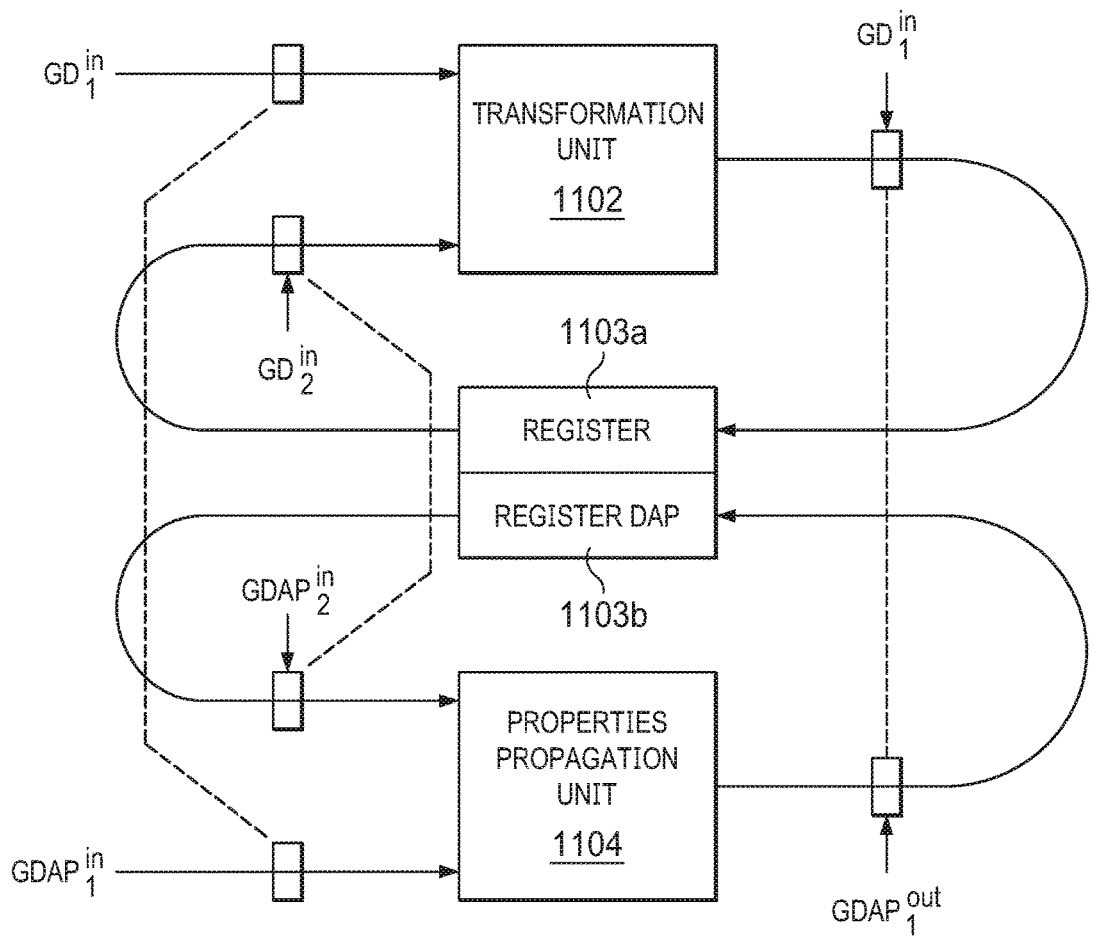
FIG. 11 is a block diagram depicting a computing system according to an embodiment.

Now turning to FIG. 11, we show one embodiment of a system for securing data having internal state logic comprising one or more internal state registers. Here, the system may include a transformation unit 1102, a properties propagation unit 1104 and internal state memory 1103 comprising generic data memory 1103a (for example, in the form of a register file) for generic data to be used with transformation unit 1102, and additional memory 1103b (e.g., a register file) for generic DAP's for use with properties propagation unit 1104. In some embodiments, where transformation unit 1102 is a CPU or the like, the memory can also be directly bypassed.

As an example, consider a simple instruction "addition with immediate value" for use with a transformation unit 1102: addi r, I (r<-r+I), where: r is a register and I is an integer to be added to the value of the register. Such an example may be mapped to the system of FIG. 11 as follows: $GD_1^{in}$ may comprise the instruction "addi r, I" encoding an integer value of "I", $GD_2^{in}$ would represent the value held in the register (e.g., r). $GDAP_1^{in}$ may comprise the GDAP associated with the instruction code (the "addi r,I") and the GDAP is also associated with value of integer "I". $GDAP_2^{in}$ comprises the GDAP that is associated with the register (e.g., "r"). Here, the $GD^{out}$ value is determined by adding I to the value of r, and the $GDAP^{out}$ value is determined such that it is in relation with all $GDAP_1^{in}$ and $GDAP_2^{in}$.

The example above would be similar in nature to the case of another instruction: "multiplication with immediate value". Note that the content of $GD_1^{in}$ controls the operation of the transformation applied by the transformation unit 1102. Consider yet another example instruction: "negate r". In such a case, $GD_1^{in}$ may comprise only the instruction encoding itself (i.e., in this case, it is unnecessary to embed an immediate operand value "I" in the instruction).

As yet another example, consider the instruction "setreg I", which may set the value of a register to the value I in transformation unit 1102. Note that $GD_2^{in}$ (and thus $GDAP_2^{in}$) are redundant in the case of such an instruction (which, for example, can be handled by not having an input, or ignoring its values, etc.).

As has been discussed then, DAP's may be provided to a properties propagation unit which determines an output data associated property associated with a corresponding data output generated by the transformation unit. Such a properties propagation unit may provide such output DAP's for corresponding output data from the transformation unit substantially regardless of the actual processing or transformation applied by the transformation unit. Thus, systems and methods as disclosed may be usefully utilized on almost any arbitrary complex processing or transformation unit to provide output DAP's associated with data output by the transformation unit.

These data properties may include properties such as confidentiality, integrity, quality, availability, freshness, risk. Thus, by having output DAP's associated with data output by the transformation unit (e.g., based on the corresponding input data associated properties associated with input data from which the output data was generated), a number of security, safety and other measures may be implemented. Such measures may include the application of input security policies or output security policies using perimeter guard logic.

These perimeter guards may include input perimeter guards and output perimeter guards. Input perimeter guards may receive input data and a policy. Based on the policy and the input data, an input perimeter guard may produce output data and corresponding data associated property. In this manner, input perimeter guards may be utilized, for example, as enforcers or gates for data input to a processing system (e.g., a transformation unit or associated properties propagation unit). For example, input perimeter guards may take as input data retrieved, accessed or input from devices or media of a computing system and other input, for example a user policy associated with the data or input source. In a similar sense, other policy-related inputs to the input perimeter guard may include safety-related parameters and actions associated with maintaining a safe operating condition for the system under various input data combinations, potentially also taking into account the system's internal state, for example. Based on this aggregated input, the input perimeter guard may then determine whether or not to provide such input data to the transformation unit and, if so, potentially selecting which portions of the input data should be provided to the transformation unit. The input perimeter guard may also determine what the corresponding DAP or DAP's for that input data should be. The input perimeter guard may also determine an enforcement action that should be performed to assure that the associated user policy (or some other constraint such as a system-wide safety policy) is correctly enforced.

Similarly, embodiments of output perimeter guards may receive input data, corresponding DAP's, and a policy. Based on the policy, the data itself and the DAP's associated with that data, an output perimeter guard may produce a corresponding output data derived from the received input data. In this manner, output perimeter guards may be utilized, for example, as enforcers or gates for data output from a processing system (e.g., a transformation unit or associated properties propagation unit). For example, output perimeter guards may take as input data output from the transformation unit and the corresponding DAP output from the properties propagation unit and determine whether to provide that data to an output device (e.g., to output such data to a network connection, store such data on a storage media, etc.).

The output perimeter guard may also determine an enforcement action to assure that specific actions are taken, in order to enforce the associated policy. It will be noted here that the terms input data, input DAP, output data and output DAP are to be taken as descriptive relative to the local block or unit with which the term is used. In other words, the output (e.g., data or DAP) of one block or unit may be utilized as the input (e.g., data or DAP) to another block or unit.

Figure 12A:
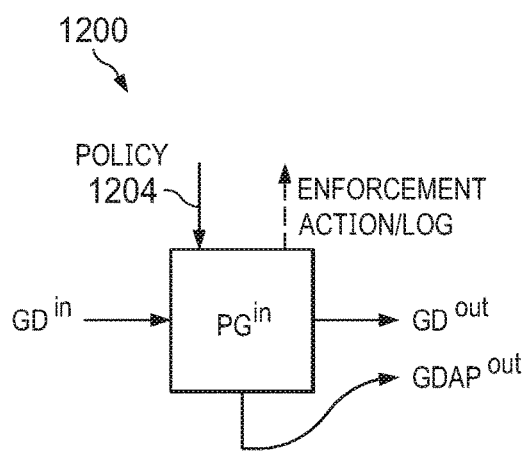
FIG. 12A is a block diagram depicting an embodiment of an input perimeter guard.
Figure 12B:
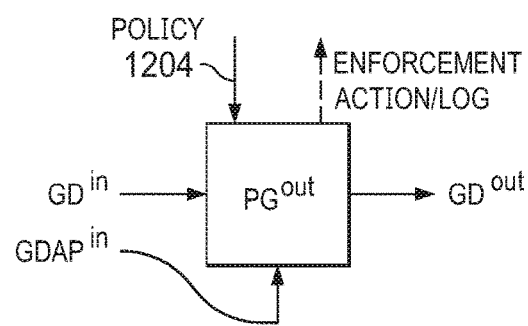
FIG. 12B is a block diagram depicting an embodiment of an output perimeter guard.

Referring now to FIGS. 12A and 12B, FIG. 12A depicts an embodiment of input perimeter guard ($PG^{in}$) 1200 while FIG. 12B depicts an embodiment of output perimeter guard ($PG^{out}$) 1210. A policy input 1204 is depicted logically and may be realized, for example, as separate input or by sending policy data as $GD^{in}$ potentially together with an appropriate $GDAP^{in}$. Thus, input perimeter guard 1200 may take as input generic data (e.g., generic input data $GD^{in}$) and a policy through policy input 1204. The input perimeter guard 1200 may then produce output generic data $GD^{out}$ and corresponding data associated property $GDAP^{out}$ based on the input generic data and the policy received on policy input 1204. In some embodiments, the input perimeter guard may also determine or output an enforcement action or actions (or log) that may be taken in order to assure that the associated policy is correctly enforced.

Similarly, output perimeter guard 1210 may take as input generic data (e.g., generic input data $GD^{in}$), a generic DAP (e.g., $GDAP^{in}$) and a policy through policy input 1204. The output perimeter guard 1210 may then produce output generic data $GD^{out}$ based on the input generic data, input generic DAP and the policy received on policy input 1204. In some embodiments, the output perimeter guard may also determine an enforcement action (or actions or log) that may be taken in order to assure that the associated policy is correctly enforced. Such policy enforcement action may include operations such as "raise an alarm", "trigger an exception", "trigger an interrupt", "zeroize $GD^{out}$", "stop processing", "encrypt", "no action", "block all outputs", "output log", etc., or some combination thereof, or other enforcement actions.

For these perimeter guards, generic input data $GD^{in}$ may need to be assigned an appropriate GDAP (e.g. $GDAP^{out}$), where appropriate may mean according to a user-defined policy. Examples of such a user policy may include assigning GDAP (e.g., $GDAP^{out}$) based on the source of the $GD^{in}$ (e.g., high confidentiality and low integrity if GD is originating from an internal disk, low integrity and low confidentiality if it is originating from Ethernet, etc.). The source of the $GD^{in}$ can, for example, be determined from placement and connectivity of $PG^{in}$ (e.g., a disk is clearly the source if $PG^{in}$ input $GD^{in}$ is connected only to a disk, etc.), or in case of SoC interconnect interfaces, by monitoring addresses of transactions on the bus, etc.

GDAP (e.g., $GDAP^{out}$) can also be assigned based on the content of $GD^{in}$. One such example is when incoming data GD is cryptographically authenticated. In such cases the signature (e.g., indicating the identity of the sender) of GD may be cryptographically checked (by $PG^{in}$) and assigned $GDAP^{out}$, as defined by a policy (e.g., as an input parameter on the policy block input 1204). As another example, the proposed GDAP may be already embedded in the GD and the combination cryptographically signed. The $PG^{in}$ may then check the signature and, if policy allows, the proposed GDAP may be applied to the $GDAP^{out}$ associated with $GD^{out}$.

In such perimeter guards, the policy (e.g., data) comprises user configurable and system (dependent) parameters (such as the relation R, relation P (e.g., as defined below), decryption/encryption keys, existence/lack of connections, enforcement actions, INF, filters, firewalls, etc.) and may be implemented using hardwired logic, may be runtime configurable or modifiable, may be user definable, etc. or some arbitrary combination thereof.

The policy (e.g., provided on the policy input 1204) may include user supplied sets of rules governing the assignment of GDAP to particular data (or the determination of GD from particular data). More formally, in perimeter guards, the policy is enacted by a k-ary relation P between arbitrary elements from at least two of the following sets: input generic data ($GD^{in}$), input/output generic data associated properties set ($GDAP^{in}/GDAP^{out}$), the policy enforcement action set and other policy data.

In some embodiments, the policy input 1204 may comprise a bus or other logic on which GD is transferred. Thus, for example, the policy data may be transferred to the $PG^{in}/PG^{out}$ on the $GD^{in}$ data bus (potentially with $GDAP^{in}$ as appropriate). The system realization may differentiate the policy data from the rest of the data through the use of certain address memory range, $GDAP^{in}$, separate ports, etc.

Figure 13A:
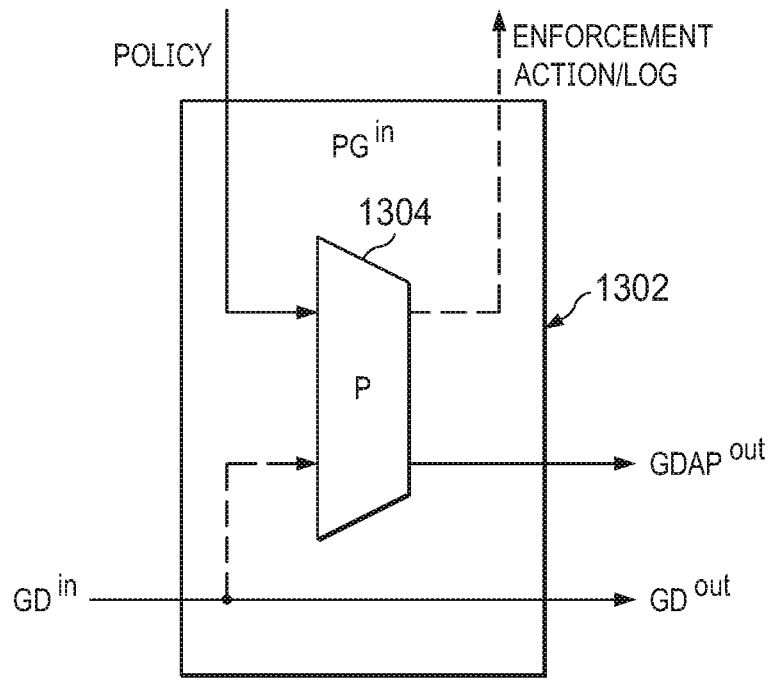
FIGS. 13A and 13B are block diagrams depicting embodiments of input perimeter guards.
Figure 13B:
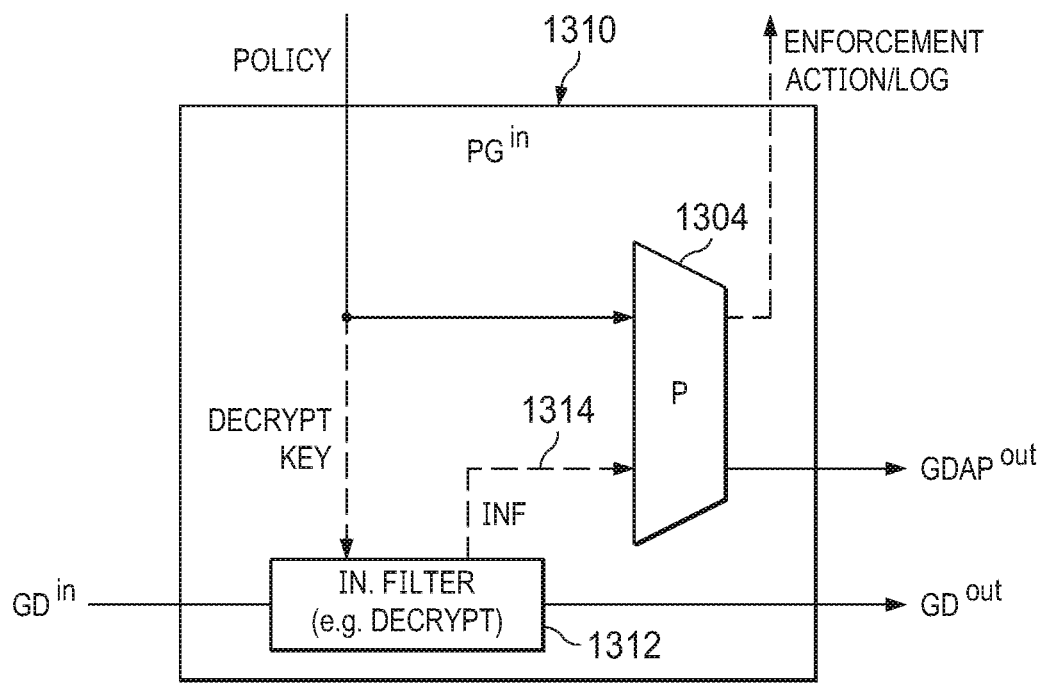

To illustrate an exemplary implementation of such a perimeter guard, the reader's attention is directed to FIGS. 13A and 13B which depict embodiments of input perimeter guards. FIG. 13A depicts an input perimeter guard 1302 $PG^{in}$ where $GDAP^{out}$ (and optionally enforcement action/log) is assigned such that it is in accordance with a policy, captured and enacted by relation P 1304 (and may optionally depend on $GD^{in}$ which may be provided to determine relation P 1304). FIG. 13B depicts an input perimeter guard 1310 $PG^{in}$ where the $GD^{in}$ is processed by IN(put) FILTER 1312 (for example a decryption function, filtering, zeroization, firewall, conversion, identical transformation, or some other filtering function or combination of filtering functions, etc.). The IN FILTER 1312 may have additional input including for example, a DECRYPT KEY (or a list of decryption keys, firewall rules, filtering rules, etc.) that are parameters for the IN FILTER block 1312 and may influence its operation. Thus, for example, the input perimeter guard 1302 may include logic for the IN FILTER 1312 to apply to an input datum to generate the output datum (e.g., by decrypting the input datum using a decryption key). IN FILTER 1312 may have an optional output INF 1314, comprised of $GD^{in}$ or some result of the IN FILTER 1312 operation (for example information about a remote data source's identity, decryption failed information, information about $GD^{in}$ filtering, etc.) The $GDAP^{out}$ or enforcement action/log of perimeter guard 1310 is determined such that it is in relation P 1304 with a policy provided on the policy input and optionally INF 1314.

Thus, as can be seen, embodiments of an input perimeter guard ($PG^{in}$) assigns $GDAP^{out}$ to the $GD^{out}$ such that the $GDAP^{out}$ is in relation P (e.g., specified by an input policy) with $GD^{in}$ and may additionally trigger a policy enforcement action, such that the policy enforcement action to be triggered is in relation P with $GD^{in}$. It is important to note that FIGS. 13A and 13B show policy enforcement action/log which is an optional output from relation P 1304 determination of perimeter guards 1302, 1310. Such a policy enforcement action may alternatively be realized by connecting $PG^{in}$ outputs to the inputs of an additional $PG^{out}$ (e.g., with appropriate policy input). As one such example, confidentiality H is in relation P with $GD^{in}$ with address 0xa000_0000. As another example, confidentiality L and integrity M is in relation P with all the $GD^{in}$. As yet another example: "trigger exception" is in relation P with $GD^{in}$ with address 0xbad_c0de.

Figure 14A:
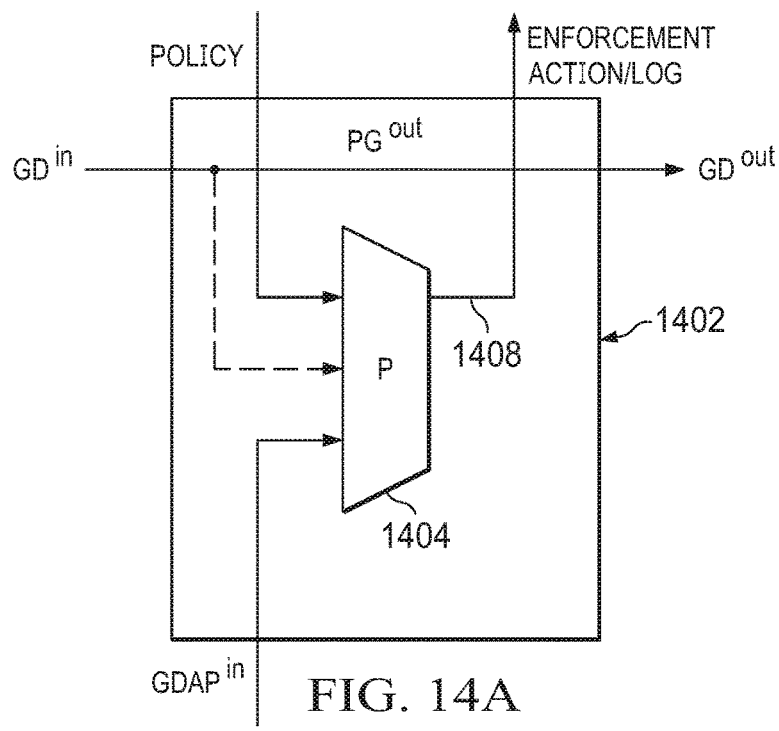
FIGS. 14A, 14B and 14C are block diagrams depicting embodiments of output perimeter guards.
Figure 14B:
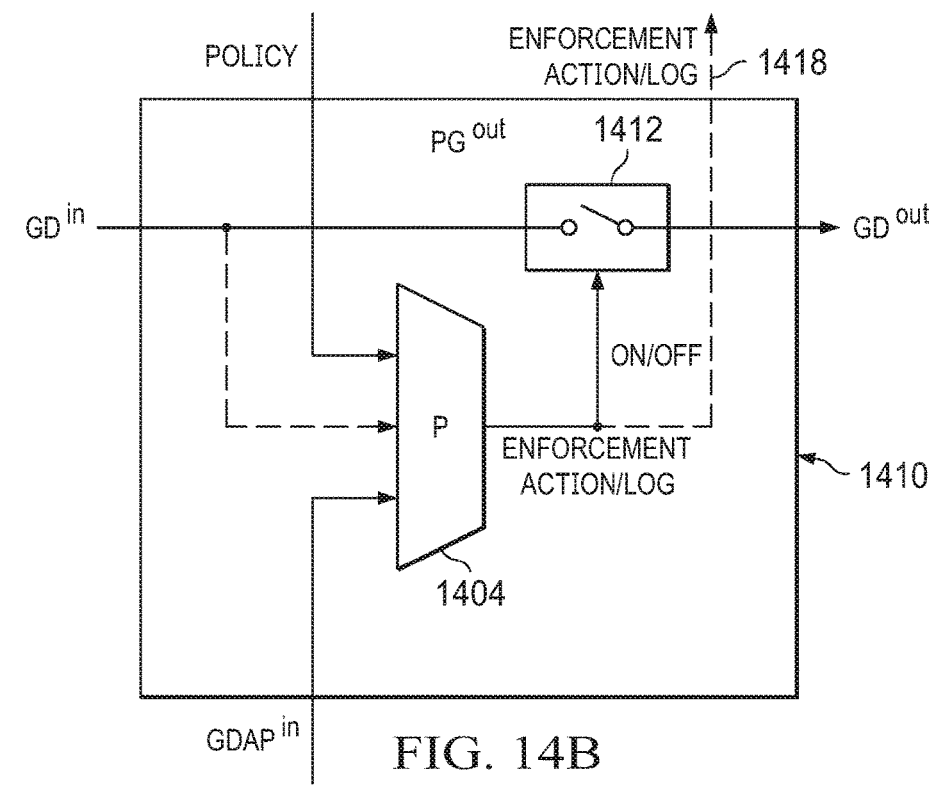
Figure 14C:
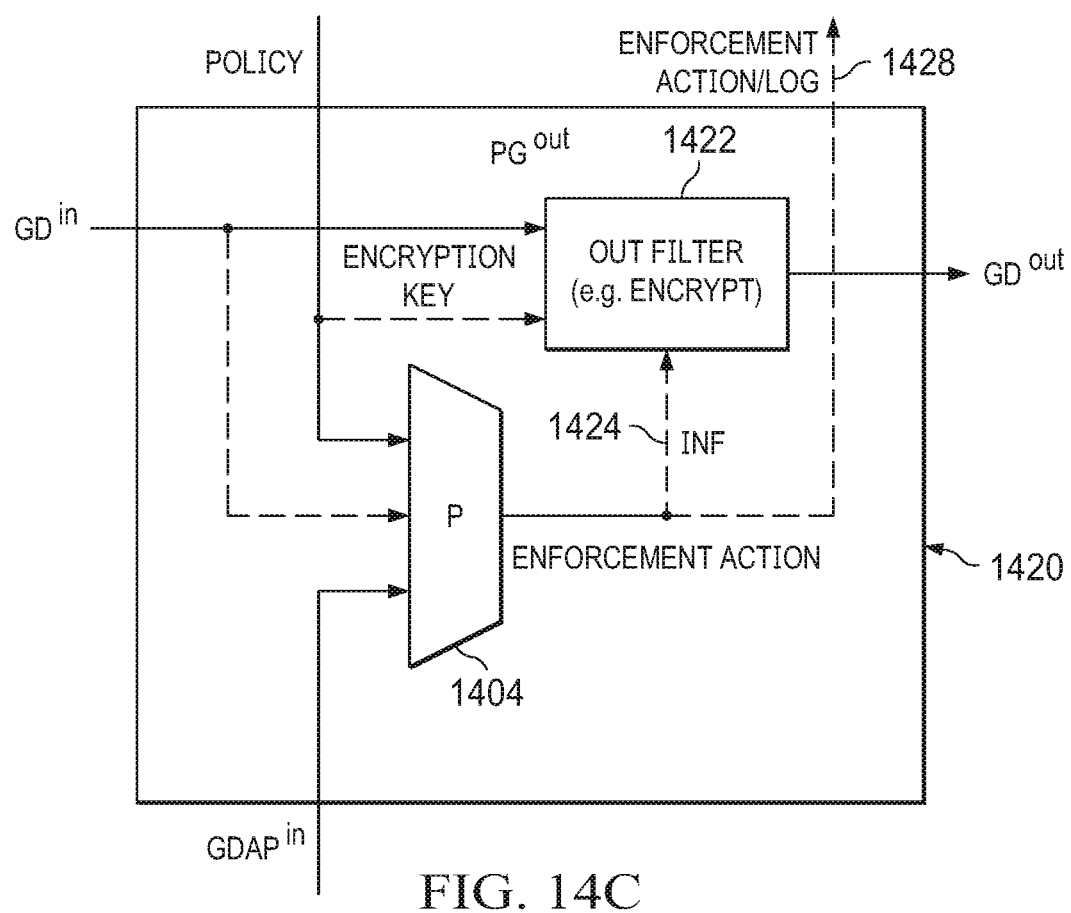

Implementations of perimeter guards are further depicted in FIGS. 14A, 14B and 14C, which illustrate embodiments of output perimeter guards. Referring first to FIG. 14A, an embodiment of an output perimeter guard 1402, where an enforcement action (like exception, zeroization, alarm, etc.) or output of log information 1408 is triggered in accordance with a user-defined policy P 1404 and depending on a provided input $GDAP^{in}$ (and optionally, an input $GD^{in}$).

FIG. 14B depicts an embodiment of an output perimeter guard 1410 where the output ($GD^{out}$) is enabled or disabled (e.g., filtered) by filtering block 1412 in accordance with the user-defined policy P 1404 and depending on an input $GDAP^{in}$ and optionally on an input $GD^{in}$. Optionally, an enforcement action or output of log information 1418 is triggered (e.g., as specified by the policy P 1404).

FIG. 14C depicts an embodiment of an output perimeter guard 1420 where an input $GD^{in}$ is processed (e.g., altered) by an "OUT FILTER" 1422 before being output as $GD^{out}$. The alteration action applied by OUT FILTER 1422 may be any transformation as specified by the policy P 1404 (for example, decryption, filtering, zeroization, firewall, conversion, identical transformation, or another filtering function or combination of filtering functions, etc.). The policy P 1404 may include optional parameters (e.g., an ENCRYPTION KEY, but may also be any other arbitrary parameters, including a list of encryption keys, filtering rules, zeroization rules, etc.) directly passed to the OUT FILTER 1422. The INF 1424 that depends on the policy P 1404, the input $GDAP^{in}$, and optionally the input $GD^{in}$ may be an optional additional input into OUT FILTER 1422. An enforcement action or the output of log information 1428 may also optionally be triggered in accordance with policy P 1404 (e.g., and depending on the input $GDAP^{in}$ or the input $GD^{in}$).

Thus, as can be seen, embodiments of an output perimeter guard ($PG^{out}$) may trigger a policy enforcement action such that the policy enforcement action is in relation P with $GD^{in}$ and GDAP$^{in}$. The policy enforcement may be performed internally in the output perimeter guard PG$^{out}$ itself, externally to the output perimeter guard or in some combination thereof. As one example, the relation P may be such that all policy enforcement actions are in relation with any GD$^{in}$, effectively making the policy enforcement action depend only on GDAP$^{in}$. As another example, the relation P may be expressed in such a way that it requires the GDAP$^{in}$ encoded in GD$^{in}$ to match the actual GDAP$^{in}$.

After a review of the above, embodiments of a system for generating generic DAP's for arbitrary transformation units such as processors or other logic will be understood. Moreover, embodiments of perimeter guards including input perimeter guards and output perimeter guards have been disclosed. As will be recalled, input perimeter guards may receive input data and a policy. Based on the policy and the input data, an input perimeter guard may produce both output data and corresponding DAP's.

In this manner, input perimeter guards may be utilized, for example, as enforcers or gates for data input to a processing system (e.g., a transformation unit or associated properties propagation unit). For example, input perimeter guards may take as input data retrieved, accessed or input from devices or media of a computing system and (e.g., based on a user policy associated with the data or input source) determine whether to provide such data to the transformation unit, what such data should be provided to the transformation unit, or determine what the corresponding DAP for that input data should be. The input perimeter guard may also determine an appropriate enforcement action or actions that should be effected in order to assure that the current policy is correctly enforced.

Similarly, as discussed, embodiments of output perimeter guards may receive input data, a corresponding DAP, and a policy. Based on the policy, optionally the input data and the DAP, an output perimeter guard may produce corresponding output data for the received input data. In this manner, output perimeter guards may be utilized, for example, as enforcers or gates for data output from a processing system (e.g., a transformation unit or associated properties propagation unit). For example, output perimeter guards may take as input data output from the transformation unit and the corresponding DAP output from the properties propagation unit and determine whether to provide that data to an output device (e.g., to output such data on a network, store such data on a storage media, etc.). Embodiments of an output perimeter guard may also determine an appropriate enforcement action that should be effected in order to assure that the associated policy is correctly enforced.

Accordingly, certain embodiments may utilize a properties propagation unit in association with a transformation unit (e.g., a CPU or the like) of a computing system along with zero or more input perimeter guard (or guards) or output perimeter guards to enforce one or more user policies on code or data utilized during processing of the computing system and data leaving such a computing system.

Figure 15:
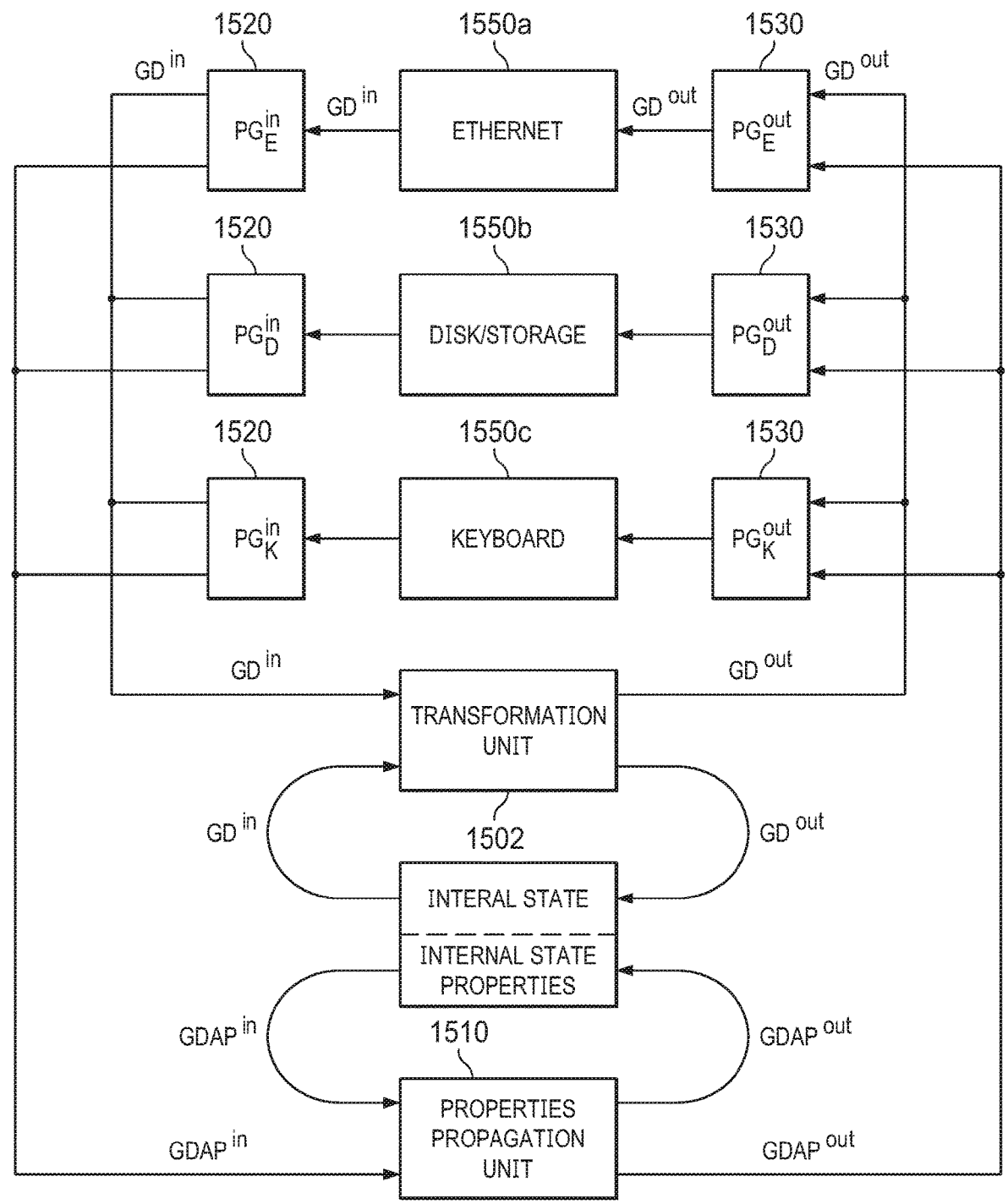
FIG. 15 is a block diagram depicting an embodiment of a computing system.

FIG. 15 depicts an embodiment of such a computing system. The computing system includes a transformation unit 1502 (e.g., such as a CPU or other processor) and a corresponding properties propagation unit 1510. The computing system may have one or more I/O, memory or other types of devices 1550 such that input data (including code) may be provided to the transformation unit 1502 from these devices 1550 for processing and data generated from the transformation unit 1502 provided to these devices 1550 for output. These devices 1550 may include, for example, Ethernet 1550a (or other network connectivity), one or more storage media 1550b (e.g., RAM, disk devices, flash memory, etc.), a keyboard 1550c. Other devices 1550 may be imagined and are fully contemplated herein.

Certain embodiments may include an input perimeter guard 1520 disposed between a device 1550 and the transformation unit 1502 and between the device 1550 and the properties propagation unit 1510, where the input perimeter guard 1520 comprises logic for receiving data from the device 1550 and determining both an input datum and the input DAP corresponding to the input datum, based on a policy. Such a policy may be specific to the device 1550.

In particular, input perimeter guards 1520 may be placed between devices 1550 and input to transformation unit 1502 and properties propagation unit 1510. These input perimeter guards 1520 may take as input data retrieved, accessed or input from devices 1550 of the computing system and determine (e.g., based on a user policy associated with the device 1550) whether to provide such data to the transformation unit 1502, what such data should be provided to the transformation unit, or determine what the corresponding DAP should be for that input data provided to the properties propagation unit 1510. The output of each input perimeter guard 1520 may thus be provided to the transformation unit 1502 and the properties propagation unit 1510. The input perimeter guard may also determine an appropriate enforcement action (or actions) that should be effected to assure that the associated policy is correctly enforced.

As there may be an input perimeter guard 1520 specific to a corresponding device 1550, the policy (and thus the determination of whether to provide such data to the transformation unit 1502, what such data should be provided to the transformation unit 1502, or what the corresponding data associated property for that input data provided to the properties propagation unit 1510 should be) may be tailored to the specific device 1550 of the computing system.

Some embodiments may include an output perimeter guard 1530 disposed between a device 1550 and the transformation unit 1502 and between the device 1550 and the properties propagation unit 1510, wherein the output perimeter guard 1530 comprises logic for receiving the output datum from the transformation unit 1502 and the output DAP corresponding to an output datum from the properties propagation unit 1510 and determining data to provide to the device 1550 based on the output datum, the corresponding output DAP corresponding to the output datum and a policy. This policy may be specific to the device 1550.

Again, output perimeter guards 1530 may be placed between output of transformation unit 1502 and properties propagation unit and devices 1550. These output perimeter guards 1530 may take data output by the transformation unit 1502 and the corresponding DAP output by the properties propagation unit 1510 as input, and based on a policy associated with the device 1550 determine whether to provide that data to the device 1550 (e.g., to output such data on a network, store such data on a storage media, etc.). The output perimeter guard 1530 may also determine an appropriate enforcement action that should be enacted to assure that the associated policy is correctly enforced.

As with the input perimeter guards 1520, there may be an output perimeter guard 1530 specific to a corresponding device 1550, the policy (and thus the determinization of whether to provide such data to the device 1550) may be tailored to the specific device 1550 of the computing system.

As can be seen, certain embodiments may thus enforce an easy-to-understand high level user policy on all code executed in the system and all data leaving the system. To illustrate an example with the depicted computing system, suppose a user policy defines GD as having two assigned properties: confidentiality and integrity. The possible values for confidentiality property comprise the set $Sc=\{c=H, c=L\}$ and possible values for the integrity property comprise the set $Si=\{i=H, i=M, i=L\}$. Thus, the GDAP of each GD may comprise tuple (c,i), where c is the confidentiality value coming from set Sc and i is the integrity value coming from set Si.

Continuing with the above example, the relation R is a composite of two relations, the relation Rc and the relation Ri. Both are binary relations with the properties of reflexivity, antisymmetry and transitivity. The relation Rc is defined so that (c=H) R (c=L) (the rest follows from the properties: (c=L) R (c=L) and (c=H) R (c=H)). The Ri is defined so that (i=M) R (i=H), (i=L) R (i=M) (and the rest follows from relation properties). The relation R is the relation between tuples (c,i) and the tuple ($c^{out}$, $i^{out}$) is in the relation R with tuple ($c^{in}$, $i^{in}$) if and only if both $c^{out}$ Rc $c^{in}$ and $i^{out}$ Ri $i^{in}$. Note that in this example, the relation R is separable into two independent relations: Rc and Ri.

Further, the high-level user policy may require that no data derived from any keyboard 1550c or storage (e.g., disk) 1550b input into the system ever leaves the system through the Ethernet 1550a and that keyboard 1550c LEDs (controlled through GD output from the system going to the keyboard 1550c) can only be controlled by an input from keyboard 1550c (e.g., by the user pressing a button). This high-level user policy can be captured by the following: $GD^{in}$ from Ethernet 1550a is assigned $GDAP^{in}$ (c=L, i=L), $GD^{in}$ from storage device 1550b is assigned $GDAP^{in}$ (c=H, i=M), $GD^{in}$ from Keyboard 1550c is assigned $GDAP^{in}$ (c=H, i=H), $PG_E^{out}$ triggers an exception policy enforcement action if $GDAP^{out}$ has c=H (regardless of i), and $PG_D^{out}$ triggers a "block the output" enforcement action if $GDAP^{out}$ has i=M or i=L (regardless of c).

Continuing with the example, all relations (e.g., relation R for properties propagation unit and relations for all of the perimeter guards 1520, 1530) are loaded into the computing system and the system is permitted to come out of reset. Due to the properties of relation R, it is possible to reach a conclusion about the GD leaving the system regardless of what and how many transformations were applied to it (e.g., by transformation unit 1502) and regardless of the source of the data which is in its dependency cone starting from reset.

Specifically, GDAP with c=H necessarily means that at least one dependency in at least one transformation of associated GD in the complete dependency cone (from reset) came from either the keyboard 1550c or the storage 1550b (e.g., disk). In other words, the GD was influenced by input from the keyboard 1550c or the storage 1550b (e.g., disk). GDAP with i=H necessarily means that all dependencies of associated GD in its complete dependency cone (from reset) came only from the keyboard 1550c. In other words, no input from either disk or Ethernet c1550a could have influenced such associated GD.

With the above in mind, now consider embodiments of two systems implementing the same functionality and with the same user-supplied policy. Both systems are considered to comply with user policy (e.g., at all times), even if one system exhibits internal policy violations that cannot be detected or exploited externally.

Figure 16:
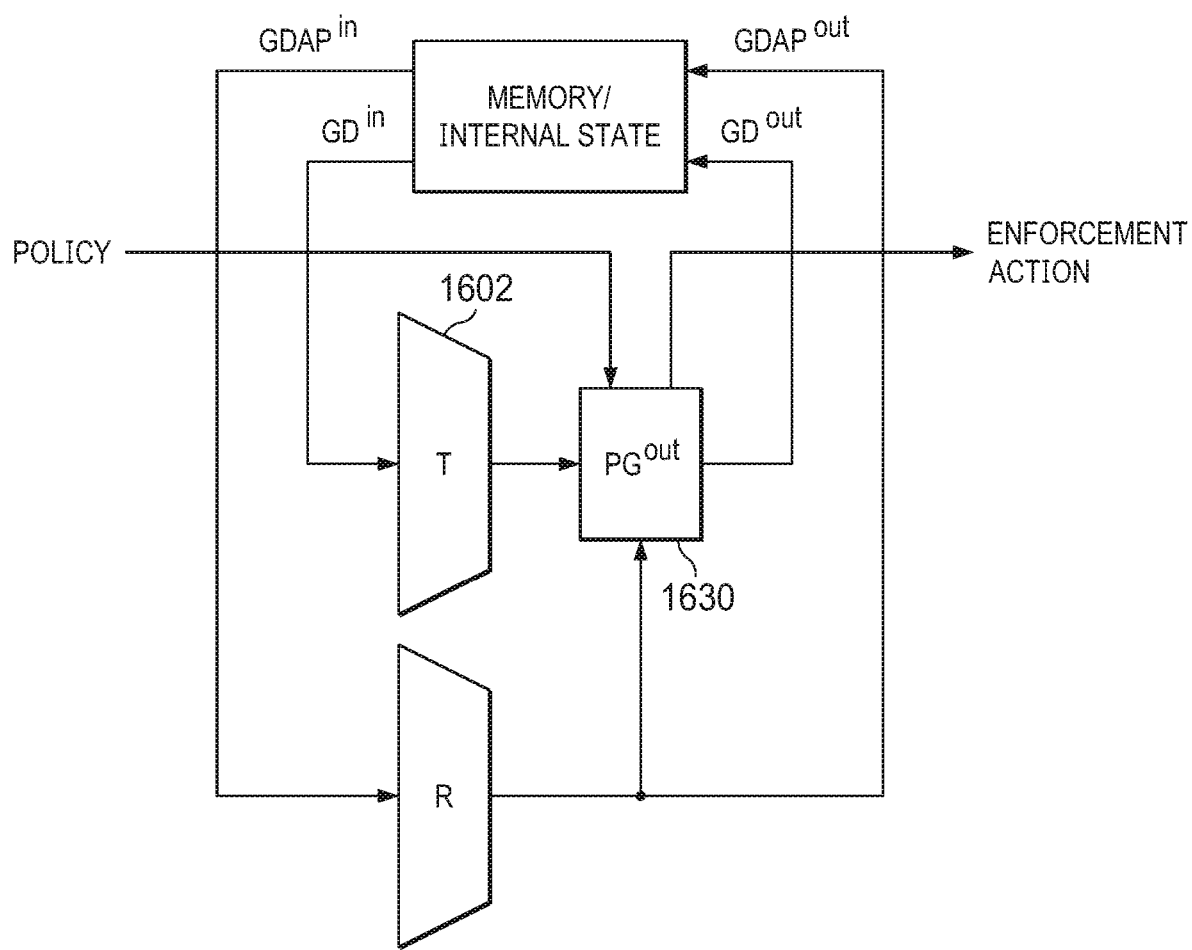
FIGS. 16 and 17A and 17B are block diagrams depicting embodiments of a computing system.
Figure 17A:
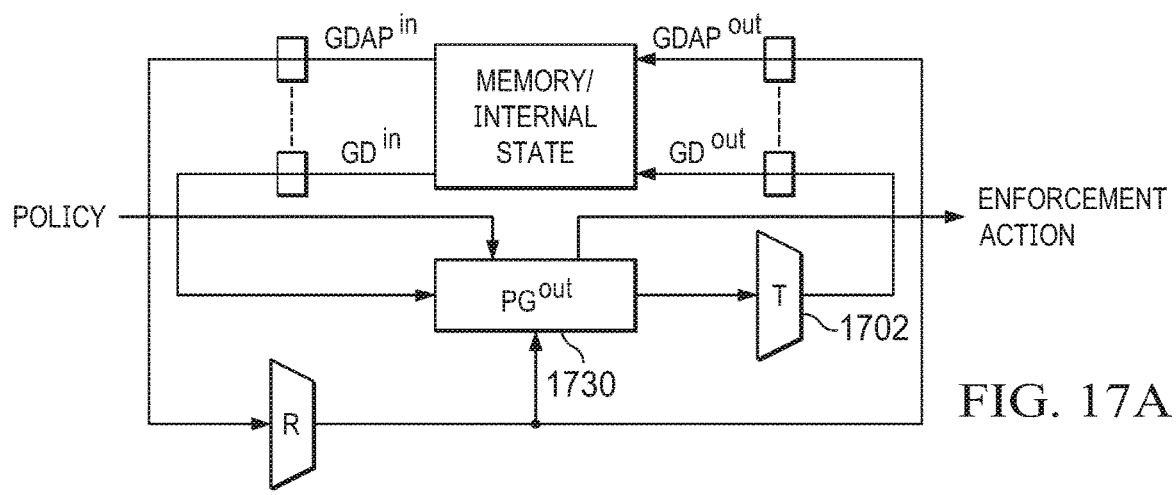
Figure 17B:
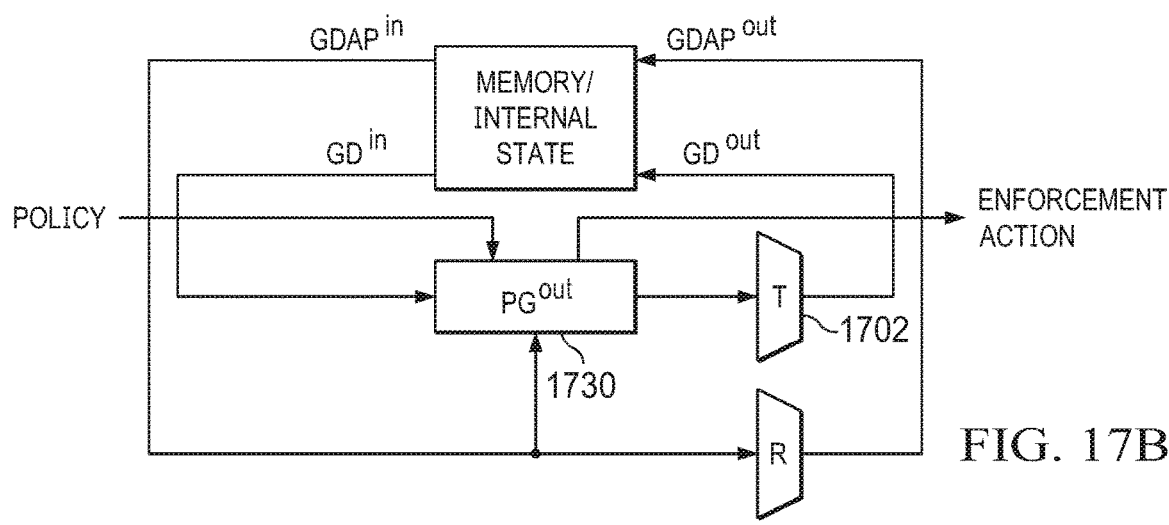

Two embodiments of the realization of these types of computing systems are depicted in FIG. 16 and FIGS. 17A and FIG. 17B (collectively FIG. 17). The embodiments depicted in FIG. 16 and FIG. 17 differ in the placement of the $PG^{out}$ block (1630, 1730 respectively) and thus exhibit different operational aspects; in this case, the difference can be seen to be in when the policy enforcement action is performed. For example, in the embodiment depicted in FIG. 16, Late Policy Enforcement (LPE) may be implemented where the $PG^{out}$ block 1630 is placed after the transformation T 1602 and thus, the policy enforcement action can be taken only after the transform T 1602 was already applied. By contrast in FIG. 17, Early Policy Enforcement (EPE) may be implemented where the $PG^{out}$ block 1730 is placed before the transformation T 1702 and thus the policy enforcement action can be taken before the application of transform T 1702. The difference among the embodiments depicted in FIGS. 17A and 17B is that policy violation detection is performed on $GDAP^{out}$ (FIG. 17A) and on $GDAP^{in}$ (FIG. 17B).

Even if one considers a system where the memory is external to the system (which is not the most typical case), it can be seen that the EPE and LPE systems as depicted in FIGS. 16 and 17 can both be implemented in a way such that there is no externally detectable (or exploitable) policy violation. As an example, suppose that the policy is that Transform T must not act on $GD^{in}$ that results in $GDAP^{out}$=HC, and the policy enforcement action is to stop the computing system. In case of an EPE system (e.g., an embodiments of which are depicted in FIG. 17), the transformation T is prevented from acting on $GD^{in}$ when $GDAP^{out}$=HC, while in the case of an LPE system (e.g., embodiment of which is depicted in FIG. 17), the transform T gets applied to $GD^{in}$. However, in this case, the resulting $GD^{out}$ is prevented from leaving the system (in this example, from being written to external memory). If transform T does not leak any (even side channel) information externally, then both systems comply with the policy. However, if transform T leaks some, for example, electromagnetic information or timing information, then the LPE system may violate the policy in a way that is observable externally while the EPE system may not.

It may be useful here to discuss some advantages of embodiments of the computing systems discussed and disclosed herein. As one advantage, dynamic measurements of the system and measurement dependent actions can be performed by choosing the appropriate relation R and policy.

As an example of enforced and measured repeatable execution, the GDAP's include the actual values of some or all GD's (e.g., the values of dependencies fed into transformation unit T, the code, or the instructions). The relation R is defined such that the output of the properties propagation unit is in relation with the input into the properties propagation unit if the output is a one way function (e.g. a hash function) of the inputs. The realization may be such that the properties propagation unit calculates the hash function (which may be cryptographic or non-cryptographic) of some or all GDAP inputs and assigns these calculated values to GDAP output.

This construction can result in a chaining of one way function values (e.g. hash values) through multiple executions (e.g., successive applications of transform T to GD and the relation R to GDAP). Thus, a match of a pre-determined hash value (e.g., pre-determined hash value is contained in the policy or determined through a trusted calculation/execution prior to the current execution time, or a representation of all or part of the policy may be hashed by an independent calculation ahead of time, or the hash value may be calculated by performing the transform T over one or more execution cycles to obtain a "comparison" value, etc.) with a dynamically computed hash value in the current execution thread. This means (subject to the one way function or cryptographic hash function strength) that the two executions have run through the same states (at least as far as the monitored, and thus hashed, dependencies go).

If all of the dependencies are hashed, the output of transform T will be the same in each case of the execution when the hashes match (subject to the birthday bound of the cryptographic hash function or other practical hash function or one way function limitations). It may also prove beneficial to ignore some inputs (dependencies), or their values. Skipping such input values in the hash calculation, or replacing them with a pre-determined value, achieves the effect of masking (e.g., ignoring certain inputs or dependencies). The act of masking is essentially similar in nature to assigning "don't care" values to some inputs. Which inputs and when (and in which step) are to be masked may also be encoded in the GDAPs (which may also be static and thus may be determined ahead-of-time). Masking may also be used to break the chaining of hash values in predetermined places or conditions.

In the case where only code (or instructions) are hashed, it is thus possible to guarantee that the code has not been modified from some previous or original form. In a similar fashion, it is possible to guarantee that the input data was also not modified and thus, that an arbitrary combination of data and code are fixed. This capability makes it possible to accomplish secure boot, measured boot and other similar functionalities that can guarantee un-modified operation of a computing system.

In general, such hash value chaining makes it possible for a system to detect any deviation from a desired dependency graph (or a desired subset thereof) or to enforce that the execution always stays bounded by the desired dependency graph. For example, to enforce that some algorithm is run without modification but on arbitrary data, one may only hash the instructions (code and immediate values) and the address or locations of the (important) input data in the memory space. Of course, it may be important that a given parameter of an algorithm that is loaded from memory has certain value in which case such value(s) could also be included in the hash calculation. Logging of the hash outputs (which may occur at the end of some computation, periodically, on-demand, etc.) can be used to reveal "fingerprints" of execution, which can be used to detect unwanted tampering of code or data.

Additional properties that may be added to the GDAP and hashed include, for example, the time, either in the form of real-time clock(s), time-stamp(s), incrementing counter(s), instruction counter(s), transformation applications, etc. This way, it is possible to guarantee not only that execution was bound by a certain dependency graph but also that it was bounded by either some predetermined or dynamically-calculated time limits. For example, if the output is not computed within a specified time, the hash of the output may not match the hash given by the policy and thus, a variation in execution time may be detected. This mechanism may be used to detect (and act appropriately on) unwanted context switches, stalling of execution (e.g., due to debugger intervention), unexpected bus contention, unresponsiveness of data sources, non-constant time algorithms, etc.

Tracking of time in GDAP's as described above also enables the measurement of GD "freshness" (when was the GD last altered, read, etc.) and enforcement actions can then be triggered based on this GD "freshness" property. For example, a system design may be desired that stipulates that a certain encryption key (or one or more from a set of keys) cannot be read within certain time frames. Thus, a policy capturing this system design feature can be used to identify and prevent unexpected or unauthorized access to such encryption keys. In an example of a control feedback loop, the freshness of control outputs can be ensured with a time (freshness) GDAP combined with a policy preventing application of a control loop that does not meet the policy-defined "freshness" threshold.

Embodiments as disclosed may also prove useful for functional safety and fault tolerant or redundant systems. Redundant computation (e.g., in time, in space or a combination thereof) is typically used to minimize the chance of mission failures due to various (often external) factors. Examples of such factors include single-event upsets (SEU), radiation, clock glitching, voltage drops, component failure, etc. Thus, embodiments of a system with an integrity GDAP can be constructed where the policy is authored such that only code implementing the required fault tolerant (or redundancy) features can produce outputs with high integrity GDAP. Such high-integrity data may be required in order to control some mission-critical aspect of a system. Also, if a system is designed such that only "high assurance" code can handle high integrity data, a policy can be enacted where exceptions can be triggered in the case of "non-high assurance" code touching any high-integrity data.

Furthermore, spatial redundancy of the transformation T can be enforced by replicating the execution of the transformation T of a transformation unit (for example 3× redundancy T1, T2, T3) and defining a relation R such that the output GDAP is assigned high integrity if all input GDAP's have high integrity, or by applying various other optional requirements, such as: the inputs into T1, T2, T3 must have the same values; the code for all T1, T2, T3 must have the same values; the outputs from T1, T2, T3 must have the same values or at least two of T1, T2, T3 must have the same input or output values, where each implementation of T may have a counter of failures (misalignment of results relative to the other implementations of T) and the determination of output GDAP's may take the possibility of failure based on frequency of past failures into account, or where each application of T1, T2, T3 may be timed and the determination of output GDAP's may take difference in application time as indication of possibility of the failure in each of the T1, T2, T3 implementations.

As may be understood, transient faults are usually much more likely and harder to detect than complete failures. For this reason, it often makes sense to implement redundancy in time, through multiple applications of a transformation T (perhaps in the same circuitry) and comparing the results between such iterations. If the results match, it is very unlikely that a transient failure shorter in duration than such multiple transformation applications could have occurred. To enforce such a time dependency, in certain embodiments of a computing system a GDAP may include a property that counts the number of successive transformation applications or a property that counts the number of mismatches between successive transformation applications and then acts on these (for example by assigning higher output integrity property only if the policy defined minimum time redundancy was applied and if number of mismatches is below the policy defined threshold).

Certain embodiments of computing systems according to these principles can also be designed to run periodic self-checks. The elapsed time since such a self-check has been run may be another input into a relation R that is used in the determination of the output data integrity level (or safety level). Another safety feature that can be used is hashing of the executed code (e.g. from a masking event that is used to break the hash chain), to detect if a code fragment (e.g., a sequence of instructions) was executed in an uninterrupted fashion or if any changes to any of the code fragments (perhaps due to transient errors) might have occurred.

Accordingly, using a detailed understanding and knowledge of the computing system implementation, it is possible to determine possible failure modes and their failure probabilities. Such data, when captured by a policy (including a relation R) can be used to determine the GDAP's confidence property, which reflects the probability that an undetected failure occurred in the GD's dependency cone. The detection of a low confidence property (as defined by the policy) can be used to trigger an enforcement action resulting in an "error log" action (such as an alert) or even an "enforcement" action (such as an increase in the time/space dependency or a forced recalculation). This enables dynamic assignment of computational resources (represented as a transform T) to achieve safety targets, based on the importance of the data. One such example could be using space and time redundancy to trade off computational power in order to achieve increased safety and the health of the system. Also, if in a triple modular redundancy setup (for example), where one replicated node permanently fails, then the system could compensate for that failure with time redundancy and using only the non-failed node to achieve redundancy requirements.

Thus, embodiments as described above pertain to dynamic system measurement or fault tolerance, functional safety or redundant systems that can be directly used to compare the equivalence of dynamic dependency graphs or their subsets/fragments (in terms of dependencies, depth, time, etc.) in order to determine the equivalence of execution (or subset of execution) between independent systems or parts of the system. They may also be used in general to reason (either formally or informally) about any differences (or lack thereof) between the dependency graphs.

We will now address another potential use case of the system described herein; that of "data unaware computing". We will define such a system as one where the computational operations of the system can be constrained (or enforced) to be carried out in such a manner that the system itself (in part or in whole) is unable to determine (or exfiltrate) either the data upon which it is being instructed to operate nor the output data resulting from the operations themselves. The basic concept has a great utility in the case where, for example, the confidentiality of private data must be maintained even when it is required to be operated upon by non-trusted code, device or public resources (e.g. cloud computing using private data as input). There have been a number of architectures that have been proposed to implement such a system. The simplest of such including the "secure element" systems described earlier and, more recently, so-called "secure enclave" computational models, such as those implemented by Intel's SGX architecture.

However, one of the more difficult issues with implementing such "secure element" systems is how to ensure that the data upon which the system operates is entirely contained within the secure elements' secure boundaries (i.e., that the confidential data is not inadvertently "leaked" to unauthorized observers). This potential leakage can either be a "direct" leak, where the confidential data is exposed or it can be an "indirect" leak, where only certain properties of the confidential data are exposed. In some cases, however, even a small amount of "indirectly leaked" data is enough to compromise the entire private data set; especially when the adversary is in possession of considerable computational resources. As described earlier, most such architectures make use of the concept of "border control", where data from each secure "enclave" is isolated from other secure or non-secure enclaves by means of address space sequestration or segregation. However, as mentioned above, this mechanism depends on a guaranteed secure (and mostly static) implementation of the address space segregation mechanism. This presents problems when the attackers have a vast resource advantage over the enforcers of that protection.

One other method for implementing such a secure computational model is that of so-called "Homomorphic Computation" systems. These are defined as systems where the processing is carried out on the private data while it is still in encrypted form. While ostensibly much more secure than the "secure element" style architectures, there are nonetheless a couple of major weaknesses to such systems. The first weakness is that Homomorphic Computation is inherently inefficient. Its security proofs are bound to setting a strict limitation on the possible Universal Turing Machine operations that may be implemented, and such limitations can cause considerable "expansions" in the number of instructions required to implement some more complex functions. A second disadvantage of Homomorphic systems are that their security proofs are also bound to computational complexity hierarchy assumptions that may or may not hold up in the case where the underlying computational hierarchy collapses. Such a hierarchical collapse could be effected, for example, by the existence of a practical quantum computer capable of running Shor's algorithm.

Figure 18:
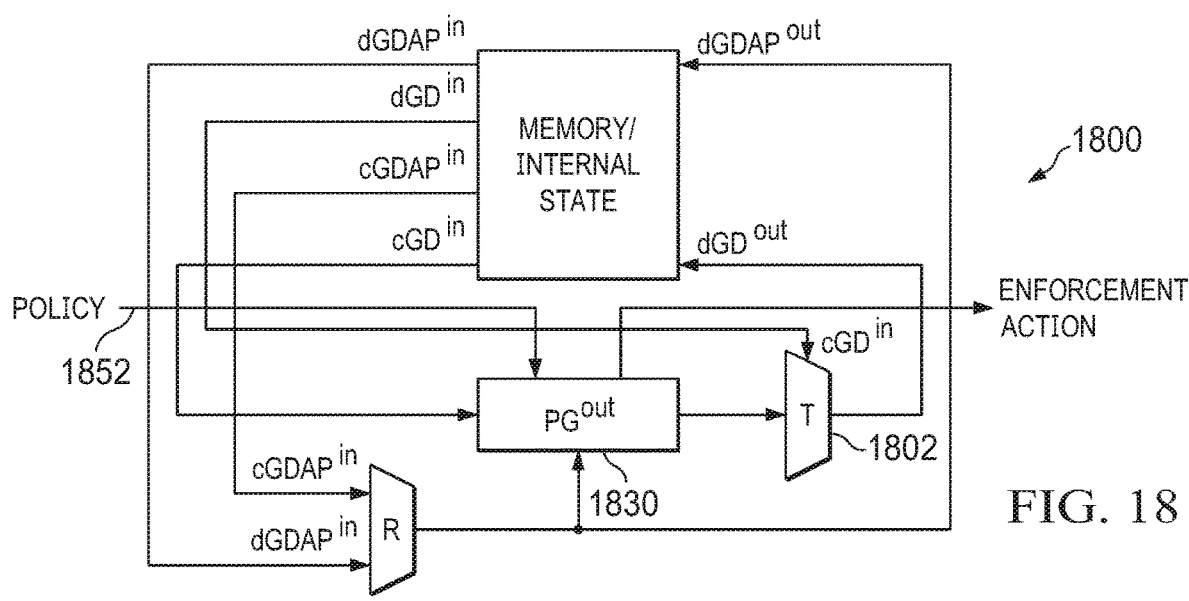
FIG. 18 is a block diagram depicting an embodiment of a computing system for enabling enforced data unaware computing.

Thus, some embodiments disclosed herein may be seen to be useful in the context of enforced data unaware computing. FIG. 18 depicts an embodiment of a system enabling enforced data unaware computing. More specifically in system 1800 the policy 1852 can enable transform T 1802 to operate only on the subset of all possible $dGD^{in}$ based on the transform T 1802 mode of operation as determined by $cGD^{in}$.

It may be understood that at the core of the embodiment of computing systems that enforce data unaware computing concept is a segmentation of the code (e.g., instructions) into different groups that are only allowed (by policy) to operate upon a subset of the data (GD). The data subset is identified by its associated GDAP and the instruction groups are defined by policy. For example, a policy-defined code segment may be grouped together based on knowledge of its transformation unit structure and that amount of data that each group of instructions can potentially leak to an observer. As a more specific example, load and store instructions accessing a processor's (e.g., CPU's) data cache have been shown to leak address information through a cache-timing side channel. Thus, it makes sense to disallow such data cache accesses for a process (or instruction group) that (or potentially only when it) uses high confidentiality data. Alternately, an instruction or mechanism that produces a constant-time access or a single-cycle logic data cache access may be used to mitigate such a side channel leak. One embodiment of exactly how this kind of constant-time access may be achieved is described below, but there are a multiplicity of design options of how such a "timing side channel" leak may be mitigated.

Often is not possible or practical to track everything that can influence the operation of transform T (complete $GD^{in}$ with associated $GDAP^{in}$) or everything that is dependent of an outcome of transform T (complete $GD^{out}$ with associated $GDAP^{out}$). Some example dependencies and leaks/results may include electromagnetic and timing side effects (or side channels), dependencies on all processor internal states (including even "non architectural" states), etc. Here, side effects may be defined as all of the influences and outcomes of (all the GD incoming to or outgoing from) the transform T that do not have assigned and propagated GDAP values.

The consequences of not being able to track and control everything are dependent on the system and its environment. For example, processor hardware may or may not be shielded, fault tolerant, etc., the implementation of the system (for example, is the transform T constant time regardless of all external factors, such as the input data, etc.). As such, systems may or may not be able to control data leakage, data corruption, or control flow corruption, etc. If these factors can be taken into account by the policy, then they may be mitigated by the system.

In embodiments of a system where the amount or type of side effects of the operation of transform T 1802 differ depending on its $GD^{in}$, it is possible for a user to control the side effects (for example side channel data leakage) by way of a user-defined policy in the following manner. Initially, the $cGD^{in}$ subsets of $GD^{in}$ that cause different amounts or types of transform T 1802 side effects can be identifier (the $dGD^{in}$ is subset of $GD^{in}$ such that union of $cGD^{in}$ and $dGD^{in}$ is $GD^{in}$). Each $cGD^{in}$ may be assigned an associated $cGDAP^{in}$ such that different values of $cGDAP^{in}$ reflect different amounts or types of transform T 1802 side effects. A policy 1852 can be assigned that disallows (e.g., triggers an enforcement action, like a system halt) processing of $dGD^{in}$ by transform T 1802 depending on $cGDAP^{in}$. An EPE (early policy enforcement) construction of the system with $PG^{out}$ 1830 enforcing the policy can then be implemented, such that processing of $dGD^{in}$ by transform T 1802 is allowed only in compliance with the policy 1852. The result is that the transform T 1802 (e.g., "code") cannot facilitate leakage of certain (policy-defined) GD through its side-effects.

To illustrate with an example, suppose the system is a CPU and the transform T comprises the following: a data store unit, a (non-constant time) divide unit, a 3 cycle multiply, a single-cycle addition and a single-cycle logical "and" unit. The selection of which unit is active (i.e., performs the transform T) may depend on $cGD^{in}$ (that represents the code). It is worth mentioning that this "code" is not necessarily the same as the "instruction" (or set of instructions) that is used to implement the transform T. An instruction may have some data embedded in it (for example, "add with immediate" (data), as was explained earlier). Thus, in this case, the instruction may comprise both the code (the "control part") and the data. This can also be generalized even further by recalling that the data portion itself may potentially represent any generic data.

In this example, the "logical and" and "addition" operations take the same amount of time to produce the result every time they execute. They are thus, non-distinguishable from a timing perspective. On the other hand it is possible to distinguish between these operations and a multiply (which may take 3 cycles). However, none of these instructions may leak anything regarding the data upon which they operate. On the other hand, the divide operation, where the time taken to achieve a result is data dependent, may leak something about the operands through the "timing" side channel. In the case where there are caches implemented in the system, the "data store" instruction may also leak some information about the destination address to which it is writing, thus potentially leaking information through the "cache timing" side channel.

As such, an example policy can be: "addition", "multiplication" and "logical and" operations are assigned $cGDAP^{in}$=HT, while "store" and "non-constant time divide" are assigned $cGDAP^{in}$=LT. Here, the $dGD^{in}$ with $dGDAP^{in}$=HC(high confidentiality data) may only be handled by transformation T when operating in constant time modes (thus when $cGDAP^{in}$=HT). An example of the relation R that captures such a design intent may be: the Exception (or system halt, etc.) is in relation with $dGDAP^{in}$ equals HC and $cGDAP^{in}$ equals LT. More formally: (enforcement action=exception) R ($dGDAP^{in}$=HC, $cGDAP^{in}$=LT). More concisely (exception) R (HC, LT).

As a further example, in some cases a system may have different types of addition instructions such as "addco" (add with carry output: where the "carry" is not an input, but it is an output), addci (add with carry input: where carry is not an output, but it is an input) or add (where carry is neither an input nor an output). In many transformation units implementing these types of instructions, the carry bit is handled as part of transformation unit's (e.g., ALU or/of CPU) internal state. If the "carry" is considered GD with GDAP, then all of the above "add" implementations may not have side channel leakage effects due to the "carry" operation (since the "carry" may be handled by the system and tracked with GDAP).

However if the "carry" operation is not handled within the system (with GDAP and following properties propagation rules), then: addco may leak information about $GD^{in}$ through the "carry" side channel, the addci instruction is controlled (in part) by the "carry" side channel, while the add instruction is neither controlled by "carry" side channel, nor leaks data through the "carry" side channel. Based on such an analysis, a use-case appropriate policy can be assigned to the system.

The amount and type of transform Tside effects are thus highly implementation and system-dependent. This also explains why the policy to handle them must also ultimately be system-dependent. For example, to prevent data leakage through the "carry" side channel in the system described above, the "addco" may not be allowed to operate on $dGD^{in}$ with $dGDAP^{in}$=HC ("high confidentiality") but it is allowed to operate on LC ("low confidentiality") data.

Figure 19:
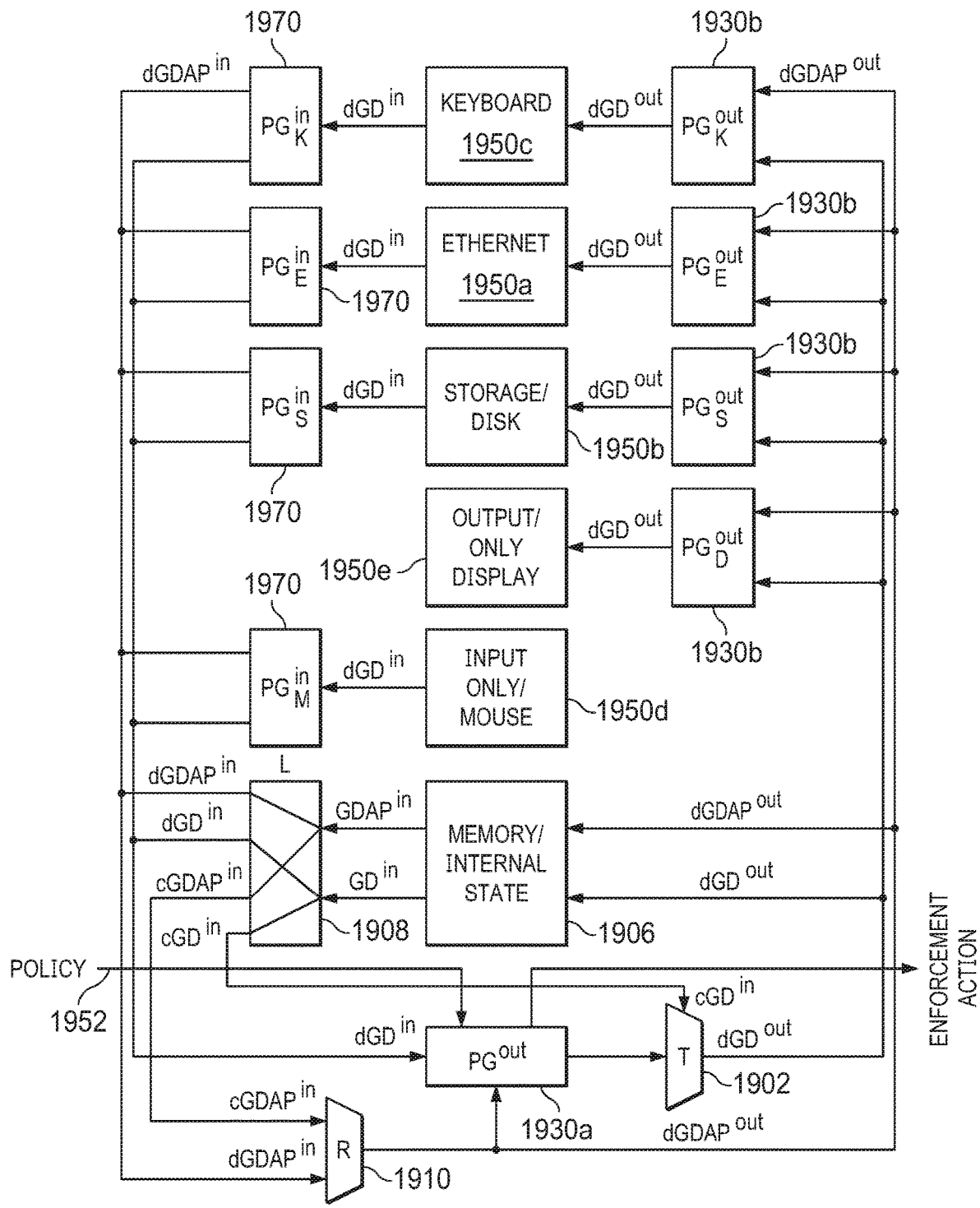
FIG. 19 is a block diagram depicting an embodiment of a computing system.

Turning to FIG. 19, a more detailed example of a computing system according to the embodiments described above is depicted. FIG. 19 depicts an example showing how input only, output only or input/output "legacy" devices not supporting GDAP can be connected to a system. This embodiment also conceptually shows how the "code" and the "data" are handled in a processor or other transformation unit (e.g., GPU, CPU, etc.). The "instructions" may comprise both "code" and "data" (e.g., an immediate value). Ultimately, the bits of information stored in the memory are generic data. How such GD (for example residing in the internal memory) is interpreted (for example as "code" or "data") is determined by generic processor logic in the usual way (e.g., as in any processor). The GD may thus comprise code, data or some combination thereof. For clarity, the GD comprising the "code" is marked as cGD and dGD in the case where it comprises the "data". The cGDAP is GDAP associated with cGD and dDGAP is GDAP associated with cGD.

Here, the computing system includes a transformation unit (T) 1902 (e.g., such as a CPU or other processor) and a corresponding properties propagation unit 1910 (implementing relation R). The computing system may have one or more I/O, memory or other types of devices 1950 such that data (including code) may be provided to the transformation unit 1902 from these devices 1950 for processing and data generated from the transformation unit 1902 provided to these devices 1950. These devices 1950 may include, for example, Ethernet 1950a (e.g., or other network connectivity), one or more storage media 1950b (e.g., RAM, disk devices, flash memory, etc.), a keyboard 1950c, an input only device 1950d like a mouse or the like and an output only device 1950e like a display device or the like. Other devices 1950 may be imagined and are fully contemplated herein.

Input perimeter guards 1970 may be placed between devices 1950 and input to an output perimeter guard (PC$^{out}$) 1930a implementing early policy enforcement based on policy 1952 and a data associated property output by properties propagation unit 1910, and outputting generic data to the transformation unit 1902 and an enforcement action. Input perimeter guards 1970 are also coupled to properties propagation unit 1910.

It will be noted that while the embodiment illustrated depicts one input perimeter guard 1970 PG$^{in}$ connected to one device 1950, it is possible and often practical to have one input perimeter guard 1970 PG$^{in}$ in front of multiple devices 1950). At that point, input perimeter guards 1970 may be assigned the same GDAPs, or appropriate GDAPs may be determined from knowledge of the source or destination of the data. This information may be determined, for example, by monitoring bus transactions and addresses (e.g., a single PG$_{E\&S}^{in}$ sitting in front of Ethernet and storage). In other cases, it may be practical to have multiple input perimeter guards 1970 PG$^{in}$ in front of a single device 1950. One example of this scenario may be when a device has multiple interfaces (e.g., a configuration interface and a data interface).

Thus, these input perimeter guards 1970 may take as input data retrieved, accessed or input from devices 1950 of the computing system and determine (e.g., based on a user policy associated with the device 1950) whether to provide such data to the output perimeter guard (PG$^{out}$) 1930a, what subset of such data should be provided to the output perimeter guard (PG$^{out}$) 1930a, or determine what the corresponding data associated property for that input data provided to the output perimeter guard (PG$^{out}$) 1930a should be and provide such data associated properties to the properties propagation unit 1910. The output of each input perimeter guard 1970 may thus be provided to the output perimeter guard (PG$^{out}$) 1930a and the properties propagation unit 1910.

The output of each input perimeter guard 1970 may also be provided to an internal state memory 1906 through logic 1908 which interprets the received input generic data and corresponding data associated property to store the received input generic data and corresponding data associated property in the memory. Thus, internal state memory 1906 may provide a (e.g., previous) generic data to transformation unit 1902 and a corresponding (e.g., previous) data associated property to properties propagation unit 1904.

It will be noted, that as depicted, internal memory 1906 only has dGD$^{out}$ (and dGDAP$^{out}$) and no cGD$^{out}$. However, this does not mean that the "code" cannot be written into internal memory 1906, but it only illustrates that even when processor is writing the code to internal memory, it will most usually be written on the "processor data bus" as data (to appropriate locations and with appropriate properties, etc.) so that it is then interpreted as code, or data, when entering the transformation unit (e.g., the processor). Usually, a processor will have instruction and data busses, where a mixture of code and data (e.g., in the form of immediate values) will enter the processor through the instruction bus (and anything entering instruction bus will be interpreted in the context of instructions). Anything entering and leaving the processor through data busses will generally be interpreted as "data". The data and instruction busses may thus be connected to separate or common memories with orthogonal, overlapping or even common address spaces.

Logic 1908 may thus be processor logic or some other mechanism that separates (determines) how generic data (bits) are to be interpreted: either as code or as data. In practical processors, such logic and mechanisms need not be so localized and are often quite complex and may be intertwined with processor control logic and the various data paths. It is also not necessarily a requirement that the code only originates from internal memory 1906, although this is commonly the case, where the data from an external storage device such as a disk or flash drive is first read from such storage into internal memory and then executed from there. In the case of code execution directly from a device (for example execute-in-place), which is listed in the figure as "storage/disk", logic 1908 would be connected to the output PG$_S^{in}$.

Properties propagation unit 1910 can apply the relation R to generate an output DAP, based on the input DAP supplied from an input perimeter guard 1970 and the input DAP sourced from the internal state memory 1906. Such an output DAP from the properties propagation unit 1910 may be provided to the output perimeter guard (PG$^{out}$) 1930a.

Thus, as discussed, output perimeter guard (PG$^{out}$) 1930a implements early policy enforcement based on policy 1952, the DAP output by properties propagation unit 1910, and outputs generic data to the transformation unit 1902 and the enforcement action. The transformation unit 1902 can thus apply the transform T to the input generic data received from output perimeter guard (PG$^{out}$) 1930a, based on the generic data supplied from the internal state memory 1906 in order to produce an output generic data.

The internal state memory 1906 may receive the output generic data from the transformation unit 1902 and the corresponding DAP generated from the properties propagation unit 1910 and store the generic data and corresponding DAP for use in determining which generic data or DAP to provide at a later point. Additionally, the generic data from the transformation unit 1902 and the corresponding DAP generated from the properties propagation unit 1910 may be received at one or more output perimeter guards 1930b.

These output perimeter guards 1930b may be placed between output of transformation unit 1902 and properties propagation unit 1910 and devices 1950. These output perimeter guards 1930b may take generic data output by the transformation unit 1902 and the corresponding DAP output by the properties propagation unit 1910 as their inputs and, based on a policy associated with the device 1950, determine whether to provide that data to the device 1950 (e.g., to output such data on a network, store such data on a storage media, etc.) or in what form to provide such data (e.g. unchanged, (partially) zeroized, encrypted, etc.).

It will be noted that the embodiments depicted in FIG. 19 and in other figures herein may primarily represent a generic logical structure, which may or may not be similar to a physical (hardware or software) implementation. One possible implementation of the system may be postulated where the system can operate without a dedicated properties propagation unit or perimeter guards. In this case, their logical functions may be performed by the transformation unit T, possibly in a time-sharing manner. In such systems, the application of transformation T (the "mission" or "functional" computations) to obtain output GD's and the application of relation R to determine the output GDAP's may be executed in phases (in time interleaved fashion).

As can be seen from the embodiments depicted, everything received on a functional input of secure systems as disclosed is deemed as data and everything transmitted to any secure device outputs is similarly considered as data. At the time when data enters such a secure system (i.e., it crosses the logically secure boundary), in certain embodiments the input PG's assign the associated data (security) properties to all incoming data in accordance with the security policy of the input perimeter guard. The values of these data security properties may be later reassigned as necessary and appropriate, but in certain embodiments all data inside the logically secure boundary of the secure system will have the following attributes assigned at all times.

A Data Integrity Level (DIL). As the name implies, this is a measure of the integrity of a datum. Instinctively, the integrity of data depends on its source, the method of transport, the integrity of any entity by which it has been manipulated, how it was manipulated, etc. Data may also be assigned a Data Confidentiality Level (DCL). Similarly, this is a measure of the confidentiality of a datum. Instinctively, it also depends on its source, the entity (entities) that have manipulated it, which (collection of) original data source(s) it came from, how any such collection was assembled, etc.

As is well understood in the context of cryptography, data integrity and confidentiality are distinct properties. For example, acting on highly confidential data that has no integrity can cause problems thus it is often assumed that highly confidential data has equally high integrity (loosely, it can be trusted), but that is not always the case. Thus, it may be desired to handle the properties of data integrity and confidentiality differently. For example: Read operations normally don't degrade integrity, write operations do. However, confidentiality is impacted by read operations and (at least indirectly) with writes. Accordingly, it is an important aspect of a secure computing architecture that both of these properties should be tracked and handled.

Additionally, in certain embodiments, everything received on the secure device functional interfaces starts as data and is assigned appropriate data security properties. For purposes of the embodiments as disclosed herein, "code" is a sequence of bits that control the transformations that the device performs. Typically, modern processors have relatively rich and complex instruction set architectures (ISAs); many comprising multiple hundreds of instructions. Furthermore, some instructions may have subtle side effects. For purposes of the embodiments discussed here, instruction dependencies may include everything that influences the instruction results. For example, source registers, source memory locations, various arithmetic statuses like carry, underflow, overflow, etc.). Instruction results include everything that is influenced by an instruction. This means that in any program (sequence of executed instructions with arbitrary data), the execution of an instruction can be indistinguishably replaced by its results.

In principle, all instruction dependencies and results are data and may have appropriate data security properties assigned and properly propagated. However, it may not be necessary nor practical to track all instruction results. Thus, instruction side effects are all observable consequences of executed instructions other than instruction results data that are marked with appropriate data security properties (DIL, DCL). Data invariant instructions are those instructions where nothing about data that they process can be established from observable side effects, and data non-invariant instructions are those instructions where some information about data they processed can be established from the observation of side effects.

Note that the grouping of instructions into Data Invariant and Data Non-Invariant is system-dependent. For example, one practical choice may be implemented as follows: Data Invariant instructions may include constant-time instructions where the instruction results are constrained to only be stored in destination registers, arithmetic flags (that can be treated and tracked as special registers) or comparison flags (that can also be treated and tracked as special registers). Data Non-invariant instructions may include all data-dependent branch instructions, all instructions with data-dependent load/store addresses, all non-constant time instructions, all processor mode-dependent or mode-influencing instructions and in one embodiment, any remaining instructions.

It may thus be a matter of a security policy to assign (e.g., some) instructions as Data Invariant instructions. Data Invariant instructions enable code comprised exclusively of them to perform computations without revealing (or being affected by awareness of) the actual data being processed by the instruction. These aspects are discussed in more detail below.

It may be clear for the discussions herein that Data Invariant instructions can offer higher security guarantees than Data non-invariant instructions. Thus, this difference should be taken into account when defining the following "Code Security Properties"—which may be assigned to all instructions in certain embodiments.

Data Invariant Code Confidentiality Trust Level (DICCTL). This is a measure of how much the code comprised of Data Invariant instructions can be trusted not to leak information. In general, it is impossible to prove that an arbitrary set of code will not ever leak any information. This is why we talk about trust. Obviously, it makes sense to assign the highest trust levels (only) to code that has been formally proven to have desired (security) properties. As an example, by correctly marking data (DCL=N), and with an appropriate Security Policy (for example, no data with DCL>=N can leave the processor), it can be seen that exposing such data to Data Invariant instructions cannot result in a data leak.

Data Invariant Code Minimal Confidentiality Escalation (DICMCE). Any resulting data computed by Data Invariant instructions will have its confidentiality escalated minimally to DCL=DICMCE. As an example, when combining data with some confidentiality, the resulting (combined) data may need to have its confidentiality level escalated.

Data Non-Invariant Code Confidentiality Trust Level (DNCCTL). This is a measure of how much the code comprised of Data Invariant instructions can be trusted not to leak information. It may make sense that DNCCTL<=DICCTL.

Data Non-Invariant Code Minimal Confidentiality Escalation (DNCMCE). Any resulting data computed by Data Non-Invariant instructions will have its confidentiality escalated minimally to DCL=DNCMCE. As an example, when combining data with a given confidentiality level, the resulting (combined) data may need to have a higher confidentiality level assigned to it.

Code Integrity Trust Level (CITL). This is a measure of how much the code can be trusted not to compromise the data integrity. For example, in case of a 2-word counter, a simple re-arrangement of the data words (e.g., swapping low with high) may compromise the data integrity, even if the data's confidentiality level is not affected. For completeness, it should be noted that data read operations normally don't compromise integrity, writes normally do. An example where reads may compromise integrity: multiple reads of magnetic tape storage may degrade it to an extent that the incorrect data is read.

Code Required Data Integrity Level (CRDIL). This makes it possible to set a minimal integrity level of all instruction dependencies for an operation to be carried out. As an example, taking an inappropriate action based on tampered data may be avoided using this mechanism.

Thus, with these definitions in place, it can be described how DIL and DCL are propagated in certain embodiments. Specifically, some embodiments may propagate data associated security properties by assigning all data security properties by an input perimeter guard (PG) and may be later reassigned; all in accordance with the current security policy (e.g., as provided to the input PG). Note that some instructions explicitly (e.g., by instruction immediate values) or implicitly (e.g., for example r0 tied to 0 used as a source operand) contain data. Such data is assigned DIL=CITL and DCL=DNCCTL.

In some embodiments, the following devices operate in a manner that the data security properties propagation, as outlined below, also reflects the data security guaranties given by the device 1. Internal Transport Devices (for example secure interconnects). All data and its data security properties are preserved intact, specifically:

a. Confidentiality propagation $DCL(d^{out}) = DCL(d^{in})$, where $d^{in}$ is data on input, and $d^{out}$ is data on output.

b. Integrity propagation $$DIL(d^{out}) = DIL(d^{in})$$

2. Internal Processing Devices (for example, a processor or any other HW that modifies data)

a. Confidentiality propagation in case of a Data Invariant instruction. An exception (error or alert as defined by Policy) is raised in case an instruction does not have sufficiently high DICTL. Otherwise, all instruction results are assigned the highest DCL of all instruction dependencies.

$$DCL(d^{out}) = \begin{cases} \text{exception, if } DICCTL(insn) < \text{MAX}[DCL(d_1^{in}), \ldots, DCL(d_n^{in})] \\ \text{MAX}[DCL(d_1^{in}), \ldots, DCL(d_n^{in}), DICMCE(insn)] \end{cases}$$

b. Confidentiality propagation in case of a Data Non-Invariant instruction. An exception (error or alert as defined by Policy) is raised in case an instruction does not have sufficiently high DNCTL. Otherwise all instruction results are assigned the highest DCL of all instruction dependencies.

$$DCL(d^{out}) = \begin{cases} \text{exception, if } DNCTL(insn) < \text{MAX}[DCL(d_1^{in}), \ldots, DCL(d_n^{in})] \\ \text{MAX}[DCL(d_1^{in}), \ldots, DCL(d_n^{in}), DNCMCE(insn)] \end{cases}$$

c. Integrity propagation. In order for computation to proceed, DIL>=CRDIL on all instruction data dependencies. All instruction results are assigned the lowest DIL of all instruction dependencies.

$$DIL(d^{out}) = \begin{cases} \text{exception, if } CRDIL(insn) > \text{MIN}[DIL(d_1^{in}), \ldots, DIL(d_n^{in})] \\ \text{MIN}[DIL(d_1^{in}), \ldots, DIL(d_n^{in}), CITL(insn)] \end{cases}$$

3. Inner Perimeter Guard a. If so required by the Security Policy, this may modify data security properties on the data traversing it.

b. This can be used to isolate internal hardware that is not trusted to fully operate as an Internal Processing Device (e.g., hardware that does not comply with the required data security properties propagation).

4. Outer Perimeter Guard a. This assigns data security properties on all incoming data according to the Security Policy of the perimeter guard.

b. Can block (drop, firewall, etc.) any traversing data, according to the Security Policy c. Can trigger alerts to the Policy Manager of any monitored condition (e.g., DCL higher than a threshold).

d. May cryptographically encrypt, decrypt or authenticate any outbound or inbound data, according to the Security Policy.

With the above in mind, it will be recalled that enforced data unaware computing (e.g., through enforced use of data-invariant instructions) may enable efficient confidential data computing without requiring the code itself to be trusted (e.g., not to attempt to exfiltrate confidential data). This efficient confidential data computing may include that the confidentiality of all input data, intermediate results and output resulting data is protected irrespective of code correctness (including potential malicious activities of the code). Moreover, the integrity of the resulting data may be limited by the integrity of all input data and the trust in the code to preserve integrity of data.

Accordingly, assuming correct and trusted transformation unit (e.g., processor) implementation, code comprised of Data Invariant instructions can execute operations on data in the same manner as if it were executed using a fully homomorphic encryption system (although the computations will clearly be much faster). This should be understood from architectural (e.g., software view) point of view. In fully homomorphic encryption case, a processor may not need to be trusted and knowledge of all internal states of processor does not reveal data. In this case however, the processor implementation must be a trusted one.

As an example, untrusted code (e.g., with a minimum DNCCTL and minimum CITL) may be used to perform computations. Here, all data confidentiality may be assured. In any case, computation can be (easily) checked for correctness, and an appropriate checker can be used to raise the integrity level of the resulting data as appropriate.

Accordingly, the system described may be mapped to FIG. 19 in the following way:

$dGD^{in} = \{d_1^{in}, \ldots, d_n^{in}\}$ $dGDAP^{in} = \{DCL(d^1_{in}), \ldots, DCL(d_n^{in}), DIL(d_1^{in}), \ldots, DCL(d_n^{in})\}$ $dGD^{out} = \{d_1^{out}, \ldots, d_n^{out}\}$ $dGDAP^{out} = \{DCL(d_1^{out}), \ldots, DCL(d_n^{out}), DIL(d_1^{out}), \ldots, DCL(d_n^{out})\}$ $cGD^{in} = \{insn\}$ $cGDAP^{in} = \{DICMCE(insn), DNCMCE(insn), CITL(insn)\}$ The relation R is greater-than-or-equal-to for confidentiality and less-than-or-equal-to for integrity (e.g., these can be expressed with MAX and MIN functions as previously discussed). It may be noted that the DICMCE(insn), DICCTL(insn), DNCMCE(insn), DNCTL(insn) CRDIL(insn) and CITL(insn) are assigned by policy. Thus, CITL(insn) <CRDIL(insn), DICMCE(insn)>DICCTL(insn), DNCMCE(insn)>DICCTL(insn) may result in trivial violations of policy as soon as the instruction is encountered. Thus, these cases can be handled by the creation of the policy and thus left out. The policy and the relation R (e.g., implemented in the $PG^{out}$) is such that exceptions or other enforcement actions may be raised appropriately.

As can be seen from the above disclosed embodiments therefore, what has been disclosed are embodiments of a system with a new paradigm for secure or safe computing that allows the security or safety policy of a given data set to be considered separately from both the code base (e.g., the transformation of the input data into output data) as well as the data processing architecture and implementation.

This ability to separate the policy from the data (may include code) and all of these from the data processor design upon which the data is processed is novel and highly useful. In effect, this separation allows for unique opportunities for more rapid security proof evaluations of a given functional system as well as for more simply-expressed security or safety policy proofs themselves.

Embodiments as described are complimentary to "Data-Driven Secure and Safe Computing" (hereafter D2SC embodiments of which are described above) paradigm of dynamic information assurance guarantees enforcement that is focused on securing information flows within a (single) compartment. The natural (efficient) implementation in a data processing device (e.g. CPU, GPU, ... ) may comprise D2SC governing intra compartment information flow assurance and this invention handling the cross compartment information flow assurance.

The invention may be applied in all the fields where D2SC may be applied even though this document focuses more on data processing in e.g. CPU's, GPU's, etc. While both inventions may be used to implement a high assurance data processing device they operate in a different way with different tradeoffs. In case of intra compartment instructions and simple inner relations the D2SC may be substantially less complex, more performant and efficient than this invention. On the other hand, implementing separation equivalent to multiple compartments or downgrading functionality with D2SC may require complex inner relations with many data-associated property (DAP) levels (states) leading to reduced performance and efficiency. Furthermore, such multi compartment emulating D2SC policies may quickly become complex to understand and evaluate against data assurance targets. This invention is especially valuable when used in combination with D2SC, where D2SC handles intra compartment data assurance and this invention handles the cross-compartment data assurance. The invention complements D2SC by efficiently addressing many of the D2SC shortcomings:

A compartment comprises generic data (GD) and generic data associated properties (GDAP) contained within (logical) boundary. The inner working of computations and propagation of properties within the compartment are described by embodiments above (e.g., that allow for the security of data (e.g., code or other data) utilized in a processing block, also referred to herein as the D2SC) and are governed by the inner policy. While these embodiments enable separation at least on par with the GWV/GWVr2 security policy (through proper selection of inner policy), it may be that such inner policy is complex and thus (i) hard to review and understand, and (ii) hard or impossible to efficiently implement.

A compartment is an entity that enforces separation. In strictest form, the data processing of one compartment if fully isolated from data processing of other compartments, such that (i) no data can pass between compartments (no infiltration and no exfiltration), directly or indirectly (through side channels) including information about data processing flow, and (ii) the data processing cannot be influenced (or inferred) by anything external to the compartment.

Such absolute isolation is most often too restrictive and of limited use. This invention describes controlled interaction between compartments enabling auditability, separation, security and safety of complex data processing systems without sacrificing efficiency and simplicity of the system of systems.

It may be useful here to describe the inner workings of data processing and (e.g., inner) policy enforcement within a compartment separately from inter-compartment operations. Inter-compartment operations controlled by an outer policy enable controlled data, controlled (code) execution, and associated properties movement between different compartments (e.g., cross compartment). Thus, the transition of execution and data from one compartment to another compartment is governed by an outer policy. In other words, any information flow crossing a compartment boundary is governed by an outer policy.

As used herein, the term domain refers to a logical (or physical) entity that comprises (e.g., is implemented by) one or more compartments and associated outer policies. It will be understood then that domains (and their associated compartments) may be nested (e.g., one domain may include, or be included in, another domain).

Figure 20:
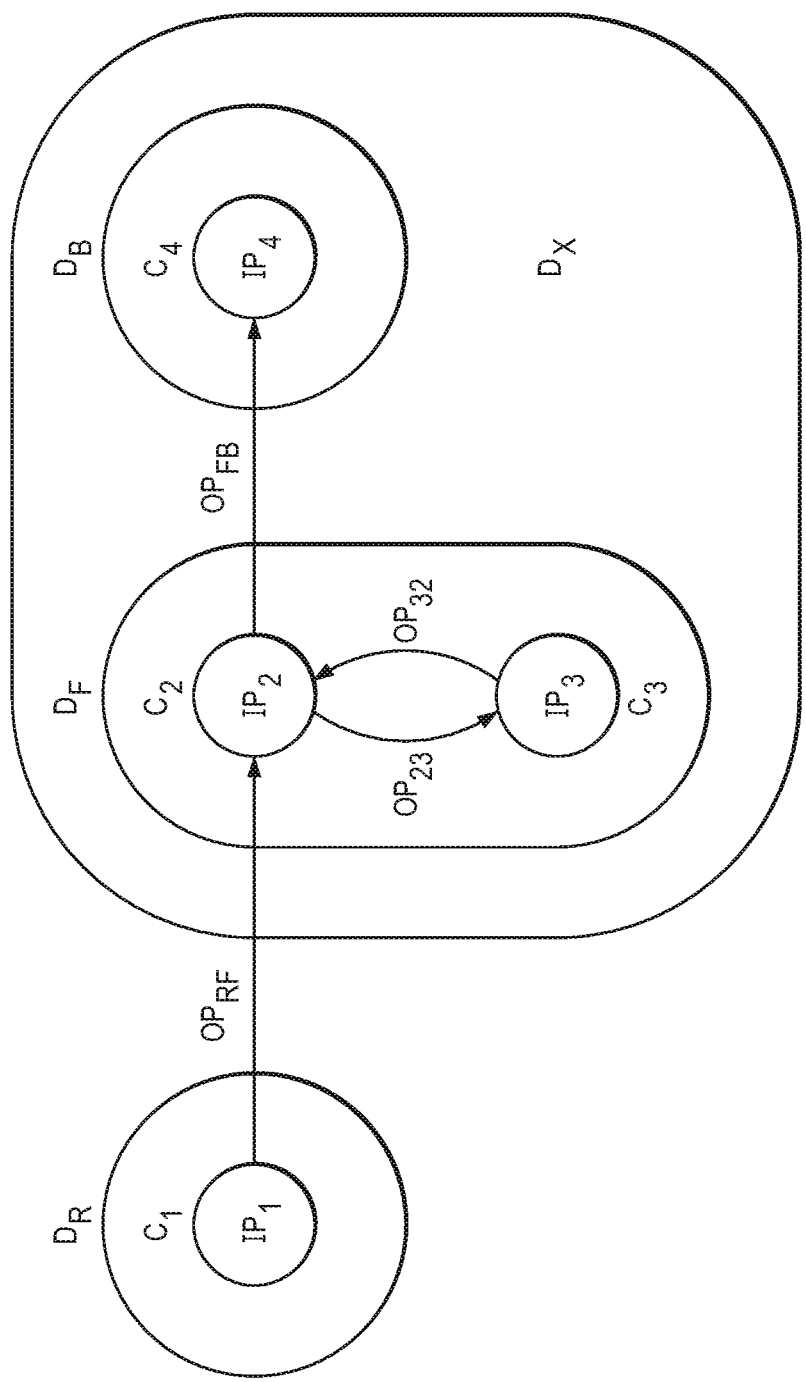
FIG. 20 is a block diagram depicting an example of nested domains.

FIG. 20 depicts one example of nested domains (referred to as DOM1). Domain D_R ($D_R$) is comprised of compartment C_1 ($C_1$) (with inner policy IP1 ($IP_1$)). D_B ($D_B$) is a domain comprised of compartment C_4 ($C_4$) (with inner policy IP4 ($IP_4$)). D_F ($D_F$) is a domain comprised of compartments C_2 ($C_2$) and C_3 ($C_3$) and outer policies OP_23 ($OP_{23}$) and OP_32 ($OP_{32}$). The outer policies OP_23 ($OP_{23}$) and OP_32($OP_{32}$) are cross-compartment outer policies (e.g., across compartments C_2 ($C_2$) and C_3 ($C_3$)) but they are not cross domain policies. Outer policy OP_RF ($OP_{RF}$) is a cross domain outer policy (e.g., across D_R ($D_R$), D_F ($D_F$) and D_X ($D_X$)). Similarly, outer policy OP_FB ($OP_{FB}$) is also a cross domain policy (e.g., across D_F ($D_F$) and D_B ($D_B$))

According to embodiments, an inner relation is defined by the inner policy and operates within a compartment as described above (e.g., by an embodiment of the systems and methods presented above that allow for the security of data utilized in a processing block. Thus, embodiments as presented below address outer relations governing cross-compartment information flows as defined in outer policies. It will be noted here that the terms "policy" and "relation" may stand for "inner" or "outer" variants, and while generally should be taken to refer to an inner or outer policy or relation as will be evident from the context. In particular, the term "policy" is often used to refer to the overall system policy comprising possibly multiple inner and outer policies. It will be understood additionally that the various functional blocks (e.g., OPE, $PG^{out}$, $m^{out}$, etc.) may have additional inputs of outputs (e.g., policy inputs) not explicitly shown in figures but understood to be present in certain embodiments as can be understood from the accompanying text. Policies may, for example, determine relations and mappings.

Moving to embodiments of policy enforcement with respect to cross compartment data movement, generic data (GD) and data-associated properties (GDAP) are synchronized. GD may comprise both data (dGD) and code (cGD). GDAP may comprise multiple properties components and GD may comprise multiple generic data components each (e.g. there may be multiple GDAP properties for each generic datum component of GD).

Outer policy enforcement (or an outer policy enforcer, both referred to as OPE) thus enables the controlled flow of data and other information movement across compartment boundaries. An OPE may be responsible to enforce a balance between fully allowing (at the expense of information assurance, etc.), and fully preventing (at the expense of functionality,) cross-compartment information flows.

Figure 21:
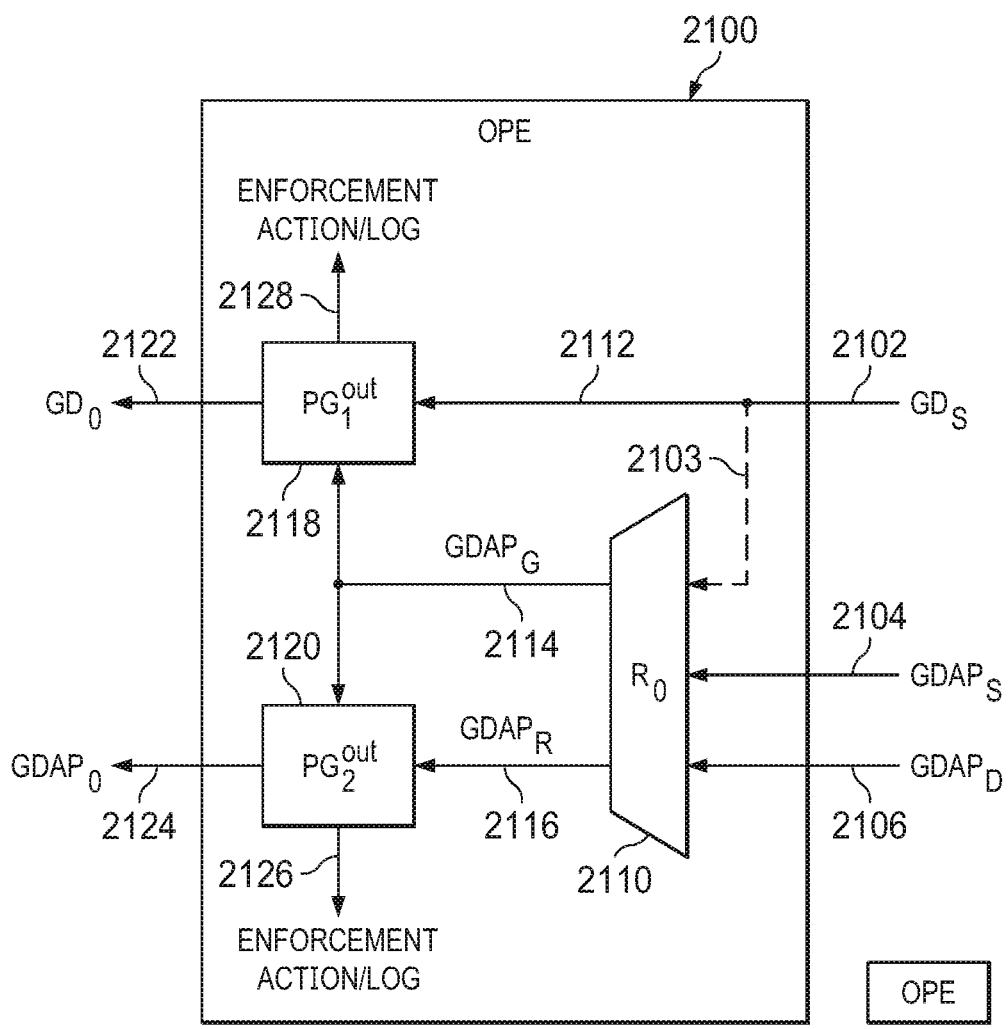
FIG. 21 is a block diagram depicting an embodiment of an outer policy enforcer.

FIG. 21 depicts one embodiment of an outer policy enforcer (OPE). OPE 2100 comprises generic data $GD_S$ input 2102, its associated $GDAP_S$ input 2104 and $GDAP_D$ input 2106 that is also associated (synchronized) with $GD_S$ 2102. The $GDAP_S$ 2104 and $GDAP_D$ 2106 may comprise DAPs including compartment identifiers for a for example, source(s) compartment and a destination (d) compartment. All the OPE inputs may also be inputs into the relation (i.e., relation logic) $R_O$ 2110. Input 2108 of $GD_S$ to $R_O$ 2110 may also optionally be utilized. Inputs 2104, 2106 may, for example, be combined into a single input, understanding that both $GDAP_S$ 2104 and $GDAP_D$ 2106 may comprise multiple components. In one embodiment, a lookup table may be utilized.

The operation of relation (values of the outputs it generates based on its inputs) may be determined by an (outer) policy which may be an input to $R_O$ 2110 (not shown). The $PG_1^{out}$ input 2112 is OPE input 2102. This is the $GD_{in}$ input into $PG_1^{out}$ 2118. The $GDAP_{in}$ input into $PG_1^{out}$ 2118 is the $GDAP_G$ 2114. $PG_1^{out}$ 2118 may also have an (outer) policy input (e.g., not explicitly shown, but understood from the structure of $PG^{out}$). The $GD_O$ 2122 is a $GD_{out}$ output from $PG_1^{out}$ 2118. $GDAP_R$ 2116 is the $GD_{in}$ input into $PG_2^{out}$ 2120. The $GDAP_{in}$ input into $PG_2^{out}$ 2120 is the $GDAP_G$ 2114. $PG_2^{out}$ 2120 may also have an (outer) policy input (not shown, but can be understood from the structure of $PG^{out}$).

The $GDAP_O$ 2124 is a $GD_{out}$ output from $PG_1^{out}$ 2120. The 2128 output from $PG_1^{out}$ 2118 and the 2126 output from $PG_2^{out}$ 2120 may, or may not, be present. The $PG_2^{out}$ 2120 may be optional. In such embodiments, the $GDAP_R$ 2116 may be coupled directly to $GDAP_O$ 2124.

OPE 2100 may operate in the following manner. $R_O$ 2110 may determine $GDAP_G$ 2114 and $GDAP_R$ 2116 based on $R_O$ 2110 inputs (as disclosed some may be optional in embodiments) that are also OPE 2100 inputs. Such a determination may be based on a policy (e.g., a policy specifying distinct $R_O$ 2110 outputs that are output in case of distinct inputs to $R_O$ 2110).

$R_O$ 2110 may be realized as a lookup table, logic, combination, both. When $R_O$ 2110 is realized as a lookup table, the inputs or their subset may form an address into the lookup table. The values at such address in the lookup table are then the values assigned to $GDAP_G$ 2114 and $GDAP_R$ 2116 outputs.

The $PG_1^{out}$ 2118 may function as any $PG^{out}$. For example, it may be implemented as a simple gating function that allows passage of its input 2112 to its output 2122 only in the case of a certain value present on its input 2114. The $PG_1^{out}$ 2118 may also perform a more sophisticated operation on its input 2112. Conditional on appropriate $GDAP_G$ input 2114 the $PG_1^{out}$ 2118 may perform encryption, decryption or some other transformation, and output such transformation result to its $GD_O$ 2112 output. This enables, for example, automatic, controlled-by-policy, encryption or decryption of data exactly on the cross-domain boundary.

The $PG_2^{out}$ 2120 may function as any $PG^{out}$. For example, it may be implemented as a simple gating function that allows passage of its input 2116 to its output 2124 only in the case of a certain value present on its input 2114. The $GDAP_R$ 2116 is from the perspective of $PG_2^{out}$ 2120 considered as generic data $GD_{in}$ and is connected to the $GD_{in}$ input of the $PG^{out}$. This may be understood by considering that the function of the $PG_2^{out}$ may be to gate (prevent) the output of the $GDAP_R$ 2116 to the $GDAP_O$ 2124 output of OPE 2100 in the case of a certain $GDAP_G$ 2114 value.

The synchronization and association between $GD_S$ 2102 and $GDAP_S$ 2104 and $GDAP_D$ 2106 is kept so that the $GDAP_O$ 2124 is associated with $GD_O$ 2122. The GDAPs on 2104 and 2106 inputs that are not associated with $GD_S$ 2102 have no influence on $GD_O$ 2122 and $GDAP_O$ 2124. For example, the data received on 2104 and 2106 inputs before or after $GDAP_S$ 2104 and $GDAP_D$ 2106 have been received has no influence on outputs $GD_O$ 2122 and $GDAP_O$ 2124 provided that the $GDAP_S$ 2104 and $GDAP_D$ 2106 are associated with $GD_S$ 2102. In such a case the $GDAP_O$ 2124 is associated with $GD_O$ 2122.

In some embodiments the $PG_2^{out}$ 2120 is optional. When leaking $GDAP_O$ 2124 is not considered problematic the 2116 input may simply be connected to 2124 (e.g., straight to the output). Additionally, one of the $PG_1^{out}$ 2118 or $PG_2^{out}$ 2120 may be optional. The OPE 2100 may still enforce full cross-domain separation by gating the unwanted output at 2122 and 2124 such that the remaining $PG^{out}$ (either 2118 or 2120) is used to trigger the enforcement action 2126 or 2128 that, for example, stops the execution or signals to the rest of the system that the OPE 2100 outputs must be discarded or ignored.

As but one example, suppose that $GD_S$ 2102 comprises data to be moved from compartment $C_S$ to compartment $C_D$ (e.g., as depicted in FIG. 20) The $GDAP_S$ 2104 comprises compartment identifier $C_S$ and $GDAP_D$ 2106 comprises compartment identifier $C_D$. If moving of the data from compartment $C_S$ to compartment $C_D$ is allowed by the outer policy, then the $R_O$ 2110 will output appropriate gate value $GDAP_G$ 2114 such that the $PG_1^{out}$ 2118 and $PG_2^{out}$ 2120 allow the passage of $GD_S$ 2112 and $GDAP_R$ 2116 to $GD_O$ 2122 and $GDAP_O$ 2124. In this example, the $R_O$ 2110 does not remap $C_D$ on the input 2106, so in the case when the outer policy allows the data movement from $C_S$ to $C_D$, the output 2122 of OPE 2100 will be $GD_S$ and the 2124 output of OPE 2100 will be $C_D$. If the outer policy does not allow the movement of data from compartment $C_S$ to compartment $C_D$, then the $GDAP_G$ value output from $R_O$ 2110 is such that the $PG_1^{out}$ 2118 and $PG_2^{out}$ 2120 block their outputs 2122, 2124 and optionally trigger appropriate enforcement action 2126, 2128.

As another example of the use of OPE 2100, the $GD_S$ input 2102 may comprise (any combination): data to be moved from compartment $C_S$ to compartment $C_D$, instruction that triggered the inputs to OPE 2100 and its PC (program counter), source address of the data to be moved, the destination address to which the data is to be moved, or other data. Any combination of these may be an input 2108 into $R_O$ 2110 and may thus influence the determination of the output of 2110. This enables restricting movement of data from compartment $C_S$ to $C_D$ only if it, for example, resides at a specific source address, was triggered by specific instruction at a specific PC address, is to be moved to specific destination address in compartment $C_D$, or for another specified condition Depending on the design of a system (e.g., that is utilized in association with OPE 2100) it may be beneficial to embed additional properties into $GDAP_S$ 2104 and $GDAP_D$ 2106. For example, the data source address may be considered as a part of code and thus part of $GD_S$ 2102 or a property of the data to be moved $GDAP_S$ 2104. The $GDAP_S$ 2104 and $GDAP_D$ 2106 may comprise DAPs including compartment identifiers, embedded addresses of data source and data destination, information about the instruction that initiated the transfer, the program counter (address) of the instruction that initiated the transfer, the time when the transfer was initiated, or other data.

As an example of an intra compartment downgrade performed by OPE 2100, the $GDAP_S$ 2104 may comprise a compartment identifier $C_S$ and DAP signaling that a confidentiality level (e.g., for the associated data GD) is high. The $GDAP_D$ 2106 may comprise a compartment identifier $C_S$ and DAP signaling a confidentiality level (e.g., of associated data GD) is low. If such a data transfer is allowed by the policy, the OPE 2100 may enable or control a confidentiality downgrade (e.g., of an associated output or data) within the compartment.

Figure 22:
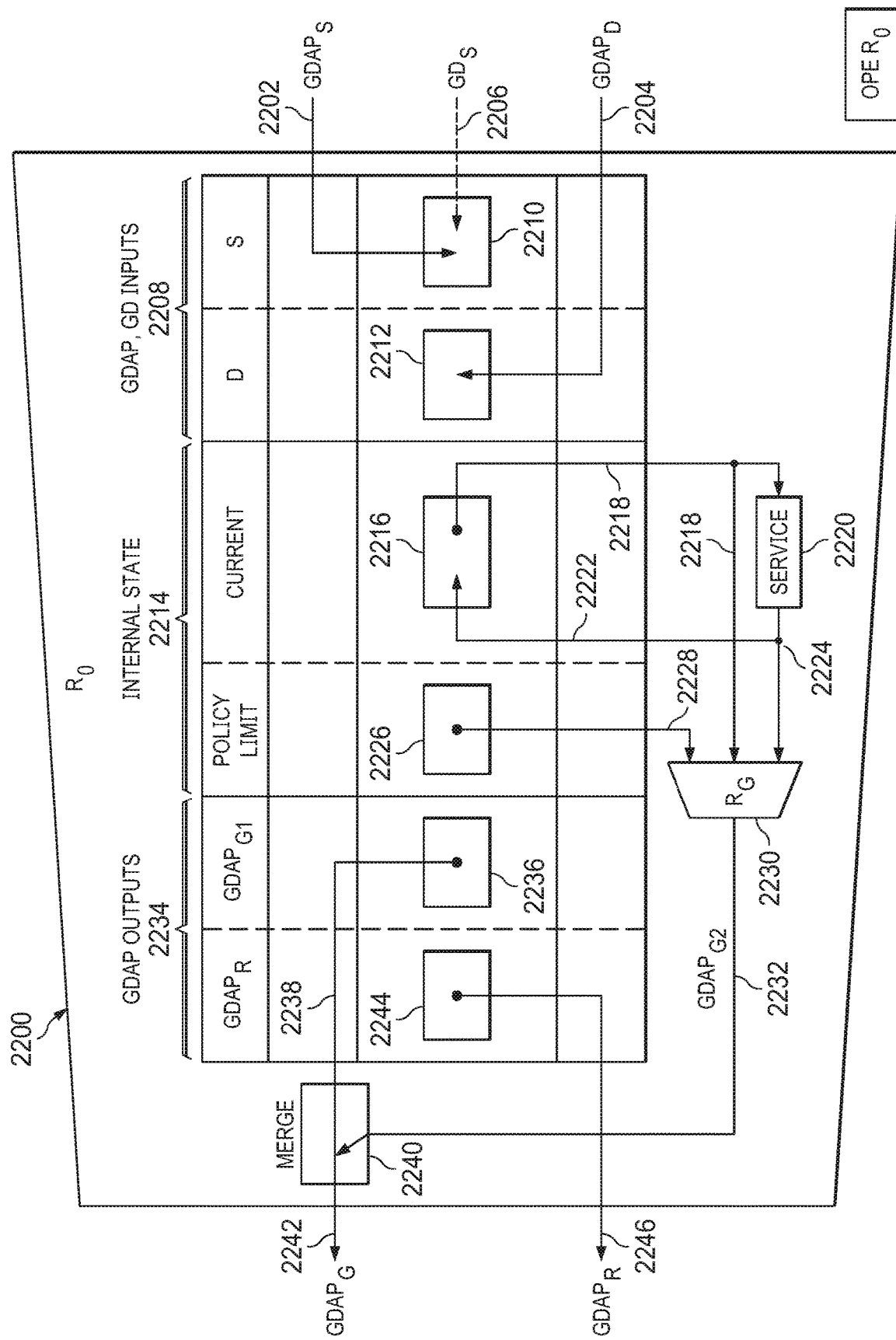
FIG. 22 is a block diagram depicting an embodiment of a relation.

Moving now to FIG. 22, one embodiment of an implementation for a relation (R) is shown. Such an embodiment may be utilized as an implementation of $R_O$ in FIG. 21. The $R_O$ determines if a transaction described by $R_O$ inputs is in compliance with the (outer) policy and (e.g., optionally) also evolves (e.g. remaps) the generic data associated properties. The described realization of $R_O$ additionally enables limiting the amount of data moved between the compartments.

In this embodiment, $R_O$ 2200 comprises input section 2208 with inputs $GDAP_S$2202, $GDAP_D$2204 and $GD_S$2206 that describe a requested transaction. All inputs are optional (in part or in full), as long as at least one part of one input remains. For example, $GDAP_S$2202 may comprise source compartment identifier $C_S$ and other DAPs (e.g. a confidentiality level, an integrity level, or other property. It may suffice if the sole input into $R_O$ 2200 is, for example, $C_S$ part of $GDAP_S$2202.

Internal state section 2214 is adapted to hold (e.g., current) internal state value 2216, a mechanism to evolve the state 2220, the (outer) policy determined threshold 2226 and relation $R_G$ 2230 to determine if the internal state is in compliance (or not) with the (outer) policy. The inputs into the relation $R_G$ 2230 may be a value of the internal state before the update 2218, a value of the internal state after the update 2224 or the policy-set threshold input 2228. The internal state value after the update 2220 may be stored to form a new internal state 2216 using connection 2222.

One of the inputs 2218 and 2224 into $R_G$ 2230 may be optional. When 2218 is not an input into $R_G$ 2230, the value before the internal state update 2220 is not considered and only the value 2224 of the internal state after the update 2220 is taken into account by $R_G$ 2230.

GDAP outputs section 2234 holds the value of $GDAP_{G1}$ 2236 and $GDAP_R$ 2244 that $R_O$ 2200 may output on 2242 and 2246. The $GDAP_{G1}$2236 may be merged with the $GDAP_{G2}$(2232) output from $R_G$ 2230. The merging may be a simple concatenation or it may be a simple logic AND operation or a more complex logic function. The merge may also be performed by $R_G$ 2230. In such case the 2238 output is connected to the input of $R_G$ 2230 and the output $GDAP_{G2}$ (2232) of $R_G$ 2230 is connected directly to output 2242 with merge 2240 removed.

In one embodiment, $R_O$ 2200 may operate in the following manner. Data 2226, 2236, 2244 in GDAP Outputs 2234 and Internal state 2214 and the initial value of 2216 may be populated from the (outer) policy and their values are considered part of the policy.

The operation of $R_G$ 2230 and $f_{EVOLVE}$ 2220 may also be determined by the policy. Such policy inputs are not explicitly shown. All $R_O$ 2200 inputs 2202, 2204, 2206 or any subset of $R_O$ 2200 inputs 2202, 2204, 2206 may be a key for a lookup in a lookup table. Such a lookup table may be implemented, for example, utilizing a memory with rows and columns 2214 containing values 2216, 2224 and columns 2234 including values 2236, 2244. The values of each row may be populated by the policy.

The inputs 2202, 2204, 2206 or any subset of such inputs may form an address into the memory identifying a particular row. From such example it is clear that the order of inputs 2202, 2204, 2206 may not be important. Also, it is clear that the, for example, source address may be a part of $GDAP_S$ 2202 or $GD_S$ 2206 or even $GDAP_D$ 2204 without impacting functionality of embodiments, provided that the policy is appropriately modified.

For example, a search of the values in columns 2214 and 2234 may be performed using content-addressable memory, logic function, simple memory, database query, etc., or any combination. Furthermore, it is understood that some values in columns 2214 and 2234 in such embodiments may apply for multiple different combinations of inputs 2210 and 2212. For example, the values 2216 and 2224 may be global and apply for all transactions (thus multiple rows) in association with a particular source compartment.

Furthermore, such a lookup can be optimized by assigning a default output such as $GDAP_{G1}$2236 if the entry corresponding to specific inputs 2202, 2204, 2206 is not found. In this way the policy non-compliant transactions as described by inputs 2202, 2204, 2206 may not need to be specified. If the entry is not found, a default $GDAP_{G1}$2236 signaling a forbidden transaction may be generated. In such case, the $GDAP_R$ 2244 is not relevant and may have an arbitrary value as it is expected that the $PG^{out}$ usually following $R_O$ 2200 in the context of an OPE will gate the outputs from an OPE that includes $R_O$ 2200.

Internal state section 2214 is comprised of at least one value 2216 that may be selected based on the inputs 2202, 2204, 2206 as previously described. The internal state value 2216 may be initialized by an (outer) policy. The internal state value 2216 is an optional 2218 input into $R_G$ 2230 and an input to $f_{EVOLVE}$ 2220. $f_{EVOLVE}$ 2220 may update (evolve) the internal state value to the next internal state 2222 that is an optional input into $R_G$ 2230. The updated internal state 2222 is fed back to 2216 location where it is stored for future use. The internal state before an update 2218 and after an update 2224 are together with policy-set threshold values 2226 through 2228 all inputs into $R_G$ 2230. The operation of $R_G$ 2230 may be determined by the policy. The $R_G$ 2230 determines if a current invocation of transaction is in compliance with the policy set constraints residing in 2226 and outputs appropriate $GDAP_{G2}$(2232) to signal compliance or non-compliance with the policy.

For example, internal state value 2216 may count the number of invocations of a certain transaction defined by inputs 2202, 2204, 2206. In this example, suppose internal state value 2216 has a current value of "5". The internal state value 2216 is an input 2218 into $t_{EVOLVE}$ 2220, which in this example increments the value received on its input 2218. Thus output 2224 gets a value of "6" that is written back to internal state value 2216 location for future use.

Now suppose that the policy being enforced only allows up-to and including "7" invocations of a given transaction and that the initial value of internal state value 2216 was "0". Thus, not counting current invocation, 5 previous invocations were executed. The $R_G$ 2230 may test compliance with the policy by computing if input 2218 is less than value "7" present on input 2228 or if the value received on 2224 input into $R_G$ 2230 is less than or equal to value "7" obtained from 2226 on input 2228. In this example, it is clear that one of 2218 or 2224 inputs into $R_G$ 2230 suffices. If the state or evolution function is different or more complex, both 2218 and 2224 may be beneficial. A policy may also define behavior of $R_G$ 2230, by, for example, specifying the relation (or compare function) and inputs to use. As but one example, a policy may specify that "output 2224;<=" some value or "input 2218;<" some value.

The GDAP outputs section 2234 comprises values (e.g., in columns) including values 2236, 2244 that are written by the policy e.g. being enforced). The $GDAP_R$ 2246 may be the resulting GDAP that determines the generic data-associated properties of $GD_S$ 2206 in the destination compartment. The $GDAP_{G1}$ 2236 may contain (encode) information that signals whether transaction is allowed by the currently set policy and what (if any) postprocessing should be applied on the $GD_S$ 2206 and $GDAP_R$ 2246 externally of the $R_O$ 2200 (e.g. by the $PG^{out}$'s before they leave the OPE including $R_O$ 2200). For example, the $GDAP_{G1}$ 2238 may simply signal that the transaction is allowed. It may also signal that the transaction is allowed but the data to be transferred must be encrypted, or certain bits of data zeroized, or randomized, etc.

MERGE 2240 may simply concatenate $GDAP_{G1}$ 2238 and $GDAP_{G2}$ 2232 to form a $GDAP_G$ 2242. As previously disclosed, the functionality of MERGE 2240 may also be implemented as part of $R_G$ 2230. Internal state section 2214, comprising 2216, 2218, 2220, 2222, 2224, 2226, 2228, 2230 and 2232 is optional. If it does not exist, the MERGE 2240 may also not be included in an embodiment of $R_O$ 2200 and 2238 is connected directly to 2242. Additionally, the column containing $GDAP_R$ 2244 may also be optional. If it does not exist in an implemented embodiment, the $GDAP_D$ 2204 may be connected to $GDAP_R$ output 2246 or alternatively a combination of $GDAP_D$ 2204 and $GDAP_S$ 2202 may be connected to $GDAP_R$ output 2246.

As should be clear from embodiments of the operation of $R_O$ 2200, it may not be important what information enters $R_O$ 2200 on which input 2202, 2204, 2206 as long as the same category of information enters in a consistent way. For example, $GDAP_D$ 2204 may contain source address and instruction that triggered the data movement (even if those might be expected to be a part of the input 2202 or 2206). Since whatever inputs 2202, 2204, 2206 that may be present are inputs into the lookup table or other memory, it does not matter how the fields are grouped and positioned as long as the positioning and grouping is consistent (does not change when a given policy is valid). The rows of internal state 2214 and the GDAP outputs 2234 initialized by the policy need only be correctly arranged to be consistent with the placement of information in $R_O$ 2200 inputs 2202, 2204, 2206. From the described operation of $R_O$ 2200 and from the previous example it is also clear that all $R_O$ 2200 inputs may be optional, as long as at least one part of one input remains. Even if all inputs 2202, 2204, 2206 are present, only part of all information present on the said 2202, 2204, 2206 inputs may be used as a key for the lookup.

Figure 23:
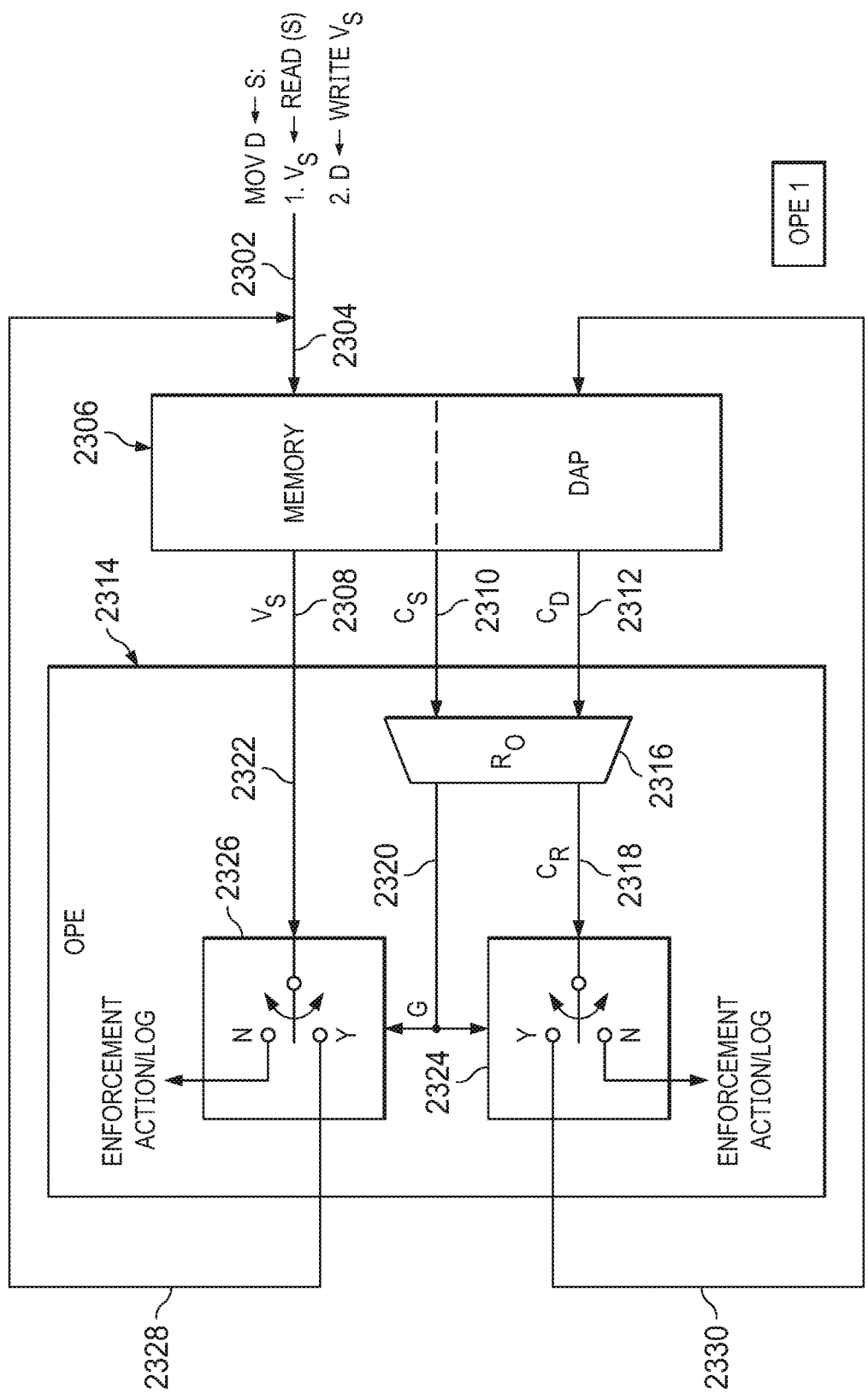
FIG. 23 is a block diagram depicting an embodiment of a computing system.

FIG. 23 is a block diagram depicting controlling data movement between compartments in a system comprising data memory and instructions utilizing an embodiment of an OPE, and in particular, depicting details of controlling the execution of a "MOV D←S" instruction copying the data at location S to location D.

In this embodiment, instructions (e.g., a "MOV D←S" instruction) enter the system on input 2302. As a "MOV D←S" instruction may be broken down into a read operation followed by write operation with appropriate operands it is in this context that this embodiment will be described. The details of how a "MOV D←S" instruction may be broken down into a read operation followed by write operation with appropriate operands will be understood by those of skill in the art.

Memory 2306 holding the data to be copied and its DAPs (properties). The DAP section of the memory 2306 may be implemented as memory, logic deducing $C_S$ 2310 or $C_D$ 2312 or a combination thereof. The input 2304 to the memory comprises: location S, and later data $V_S$ 2308 that was previously read from location S and the location D.

OPE 2314 comprises relation $R_O$ 2316 and two $PG^{out}$ 2326 and 2324. The inputs to OPE 2314 are $V_S$ 2308, $C_S$ 2310 and $C_D$ 2312. Outputs 2328 and 2330 are feedback (are fed back) to memory 2306.

The system may operate as follows when the operation to be performed (e.g., the instruction on input 2302) is MOV D←S, where data at location S residing in compartment $C_S$ is to be copied to location D holding the data in compartment $C_D$ before the operation and $C_R$ after completion of the operation. In one embodiment, the "MOV D←S" operation is executed in two steps. First, the data is read from the location S and then it is written to the location D, both residing in memory 2306.

The data is held in the memory 2306. The memory 2306 may comprise single or multiple instances with different organizations and partitioning between "data" and DAPs. The DAP for the "data" may comprises compartment IDs associated with (e.g., user) data in the memory 2306. Data $V_S$ 2308 is read from the memory 2306 location S. Also reads from the memory 2306 are $C_S$ 2310 DAP associated with $V_S$ 2308 and $C_D$ 2312 DAP associated with the data located at the location of D in memory 2306. $V_S$ 2308, $C_S$ 2310 and $C_D$ 2312 are inputs into OPE 2314.

OPE 2314 determines G 2320 and $C_R$ 2318 such that they are in relation $R_O$ 2316 with $C_S$ 2310 and $C_D$ 2312. In general, any and all inputs into OPE 2314 (which, in this example, may also include 2308 $V_S$) may be used to determine G 2320 and $C_R$ 2318.

G 2320 acts as a control of the gates 2326 and 2324. The gates either allow output of $V_S$ 2328 and output of $C_R$ 2330 or block those outputs and optionally trigger an enforcement action (e.g. raise exception, interrupt, log the event, etc.) for the system. The relation $R_O$ 2316 may be adapted such that $C_R$ 2318 always equals $C_D$ 2312. In such case, the $C_R$ 2330 output may be omitted. It effectively means that partitioning of compartments is static and that content at location D remains in its $C_D$ 2312 compartment.

Accordingly, the output $C_R$ 2330, if present, is written onto the DAP location associated with the memory location of D. The output $C_R$ 2330 is associated with the output $V_S$ 2328 and kept in sync as is the case for all DAPs ($C_R$ 2330 is a DAP associated with $V_S$ 2328). The $V_S$ 2328 and $C_R$ 2330 are written into memory 2306 before the next operation potentially waiting on 2302 can be executed. The $V_S$ 2328 is written to the location D and $C_R$ 2330 is written into the location holding the DAP associated with the data at location D.

It may be noted here, that in the example given, $C_S$ is the DAP of the data at location S, $C_D$ is the DAP of the data at location D at the beginning of the MOV D←S operation. The $C_R$ is the DAP of the data at location D at completion of the MOV D←S operation. The memory 2306 returns the content identified by GD 2304, which may comprise code (information which operation to perform), source and destination locations, or other data. The memory 2306 may be any other device which output (2308, 2310, 2312) depends on its input 2304. The OPE 2314 comprises GD input 2308 and GDAP (2310 and 2312) associated with GD 2308. The output comprises potentially transformed GD 2328 and its associated GDAP 2330. Such GDAPs may comprise compartment identifiers and also other properties of the associated data GD.

Figure 24:
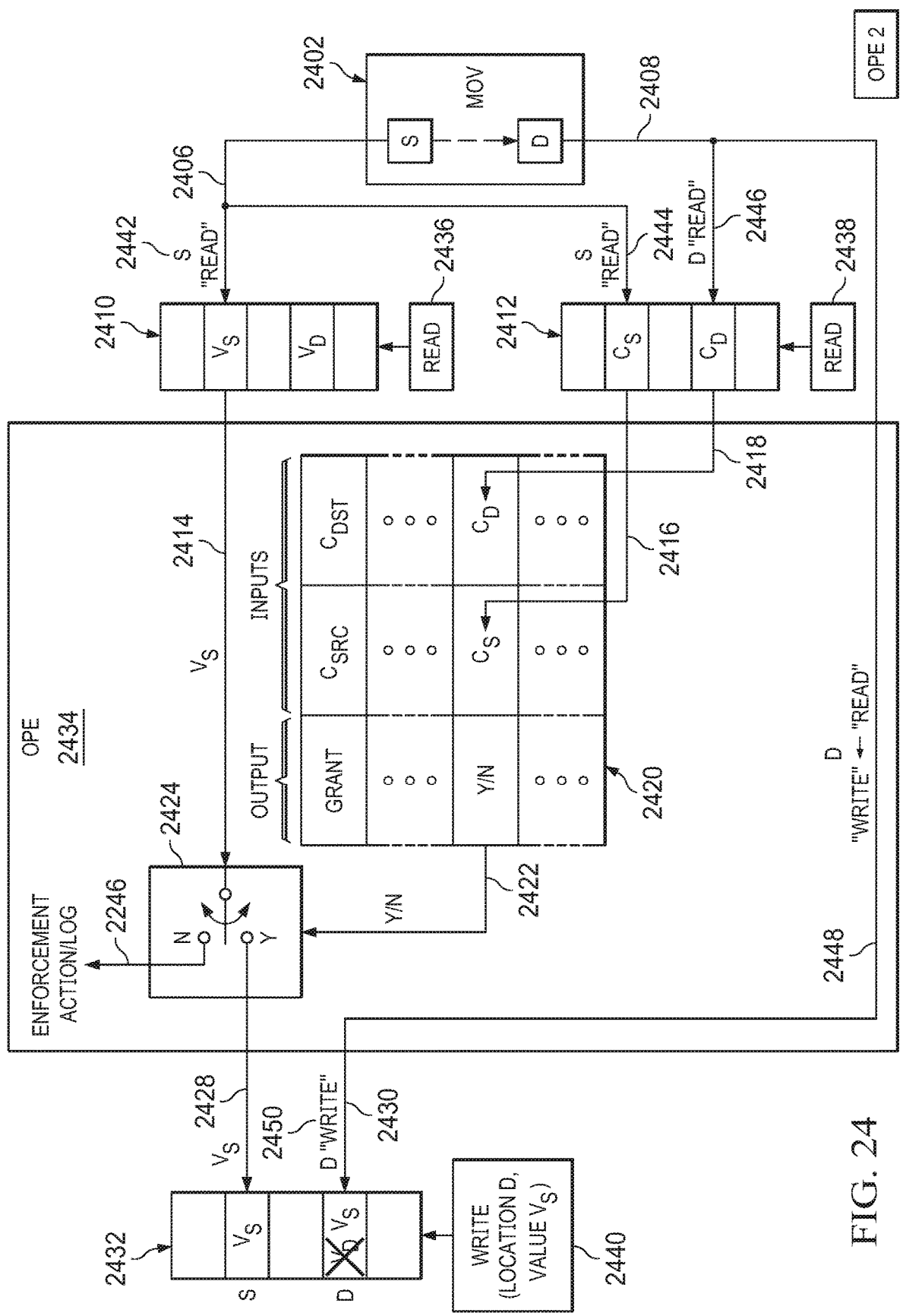
FIG. 24 is a block diagram depicting an embodiment of an outer policy enforcer used in a cross compartment data copy.

FIG. 24 depicts an embodiment of an outer policy enforcer (OPE) depicted in use with a cross-compartment data copy with static destination compartment assignment in a system with separate memories for data and their associated DAPs. Here, separate data memories 2410 and DAP memories 2412 may be used. This arrangement may be beneficial for performance and efficiency reasons. Additional level of detail is shown here relative to FIG. 23, including explicit memory operations and sources of operands. For clarity, the feedback loop is omitted from FIG. 24, though memory 2432 may or may not be physically the same entity as memory 2410. Furthermore, the system in FIG. 24 does not alter the compartment ID ($C_D$) of the location where it may write the data to, resulting in static compartment assignment. This may be beneficial from complexity, performance, size, efficiency perspectives, provided that the locations are pre-assigned to compartments and the described data copy instructions do not alter compartment identifiers. The memory 2412 may be realized, for example, as ROM, flash, logic deducing the compartment identifier (e.g. from address) or any combination thereof. While RAM may also be utilized, in embodiment the use of ROM, flash or other logic may be more powerful, area efficient, performant, or have less complexity.

Here, instruction 2402 may be input to the system to be executed by the system. In this example, such an instruction may be "MOV D←S" instruction. A "MOV D←S" instruction 2402 may be broken down into a read operation followed by write operation as discussed. Memory 2410 holds data to be read and memory holding its compartment identifier 2412. The memory 2412 may be implemented as memory, logic deducing $C_S$ 2416 or $C_D$ 2418 or a combination thereof. The input 2406 into the memory 2410 comprises location S 2406. The input 2406 into the memory 2412 comprises location S 2406 and the input 2408 to the memory 2412 comprises location D 2408.

OPE 2434 comprises $PG^{out}$ 2424 that may be realized as a switch 2424 controlled by the output 2422 of the relation $R_O$ 2420, shown as a lookup table. The inputs to OPE 2434 are $V_S$ 2414, $C_S$ 2416, $C_D$ 2418 and location to write the $V_S$ 2414 to D 2408. Memory 2432 to which the data $V_S$ 2428 is written includes location D 2430. The memory 2432 may or may not be physically distinct from memory 2410. The memory 2432 and memory 2410 may, for example, represent a separate read and write ports of the physically same memory.

In operation an instruction 2402 may be received by the system. Here, an example, "MOV D←S" instruction 2402 to read the data from the memory 2410 at location S 2406 in compartment $C_S$ 2416 and write it to the memory 2432 at location D 2408 in compartment $C_D$ 2418 has been received by the system. Data associated with location D 2408 and S 2406 is extracted from the instruction 2402.

The data GD is residing in the memory 2410 (or another device that may produce whose output 2414 based on input 2406). The memory 2410 thus returns $V_S$ on 2414 when presented with S on its input 2406. The GDAP comprising compartment identifiers is residing in the memory 2412 (e.g., or another device that can produce outputs 2416 and 2418 based on inputs S and D). An example of a possible realization of 2412 is a simple logic that determines the value of $C_S$ and $C_D$ based on S and D in a manner where $C_S$ equals "0" if the S address lies in the lower half of the addressable memory and "1" if it lies in the upper half of the addressable memory. The memory 2412 may operate similarly for $C_D$. The logic to determine $C_S$ may be more complex. In general, $C_S$ may be an arbitrary function of S. Specifically, $C_S$=FUNCTION(S) and $C_D$=FUNCTION(D).

According to the depicted embodiment, DAPs are stored and accessible separately from the data with which they are associated. Specifically, the DAPs are accessible through memory 2412 independently from 2410 holding the GD. Inputs to OPE 2434 are $V_S$ 2414 GD, its associated $C_S$ 2416 GDAP and $C_D$ 2418. In OPE 2434 the relation (e.g., between GDs and GDAPs) may be realized as a lookup table 2420. The $C_S$ and $C_D$ form the lookup table key such that the "GRANT" field value corresponding to $C_S$ 2416 and $C_D$ 2418 is the output 2422 of the lookup. The lookup table 2420 output 2422 is gating (preventing or allowing) the passage of $V_S$ 2414 to the OPE 2434 output 2428. The gate 2424 may be realized as a switch, where the input 2422 determines the position of the switch. The gate 2424 may trigger an enforcement action (exception, log, interrupt, stop of execution, alert, etc.) signaling that the passage of $V_S$ is not allowed.

Input 2408 into OPE 2434 may be simply passed through to output 2430. In the depicted realization, "READ" (2442, 2444, 2446) and "WRITE" 2450 commands may be passed together with the locations or (statically or otherwise) driven (2436, 2438, 2440) in the memories. If such commands are part of GD then OPE 2434 may transform 2448 the "READ" command on its input driven by 2408 into "WRITE" command on its 2430 output. It is understood that "WRITE" 2450 command may only be relevant in presence of $V_S$ 2428 and may not be executed if enforcement action 2426 is taken.

Lookup table 2420 may be implemented as a memory, which address comprises concatenation of $C_S$ and $C_D$ and the content of the memory holds value of the "GRANT" field (e.g. "0" for not allowed and "1"). Alternative implementations optimizing the lookup functionality including partial or full logic implementation are possible (e.g. there may be default output of "0" or "1" in case the searched $C_S$ and $C_D$ combination is not present in the lookup table). Gate 2424 may be implemented as an output perimeter guard ($PG^{out}$) and may additionally transform the $V_S$ (e.g. encrypt or decrypt it, etc.). $V_S$ 2428 and D 2430 are GD and may be synchronized such that $V_S$ 2428 is written to appropriate location D 2430 in the memory 2432, which may, for example, be physically the same as memory 2410. It will be noted that the depicted embodiment omits the change of compartment associated with the location D which may result in assigned compartments ahead of time.

Figure 25:
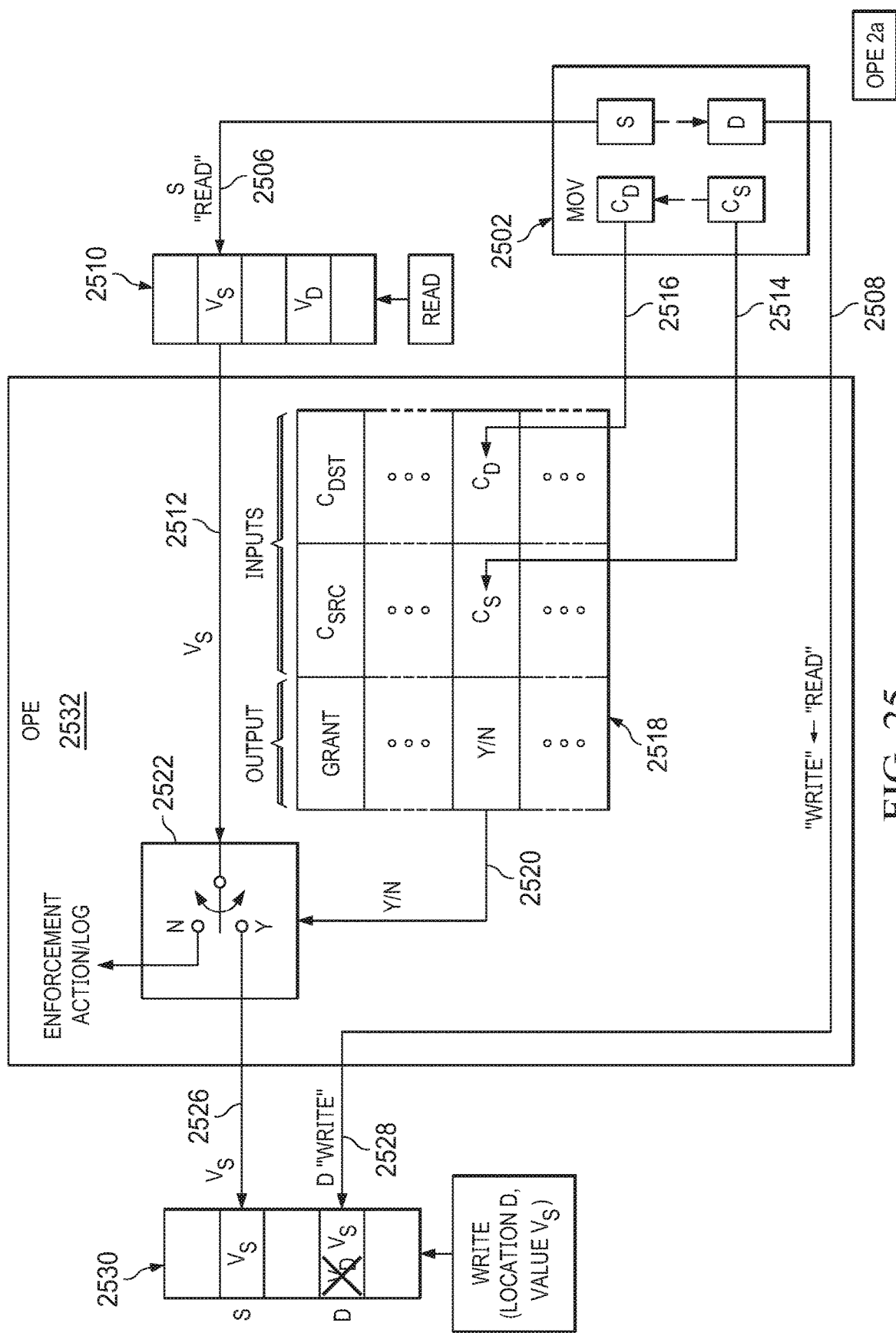
FIG. 25 is a block diagram depicting an embodiment of an outer policy enforcer used in a cross compartment data copy with explicit compartment identifiers.

FIG. 25 depicts the use of one embodiment of an OPE in a system for cross-compartment data copy with explicit compartment identifiers. In comparison to the embodiment of the system in FIG. 24, there are depicted in FIG. 25 additional $C_D$ and $C_S$ arguments related to a "MOV D←S, $C_D \leftarrow C_S$" instruction. This way a memory accesses (or other means) to determine $C_D$ and $C_S$ from D and S may be avoided, resulting in improved efficiency, power, area, performance, or other advantages.

In the depicted embodiment, the system may receive an instruction to be executed by the system on input 2502. Again, a "MOV D←S, $C_D \leftarrow C_S$" instruction 2502 may be broken down into a read operation followed by a write operation with appropriate operands. Memory 2510 holds the data to be read. The $C_S$ 2514 and $C_D$ 2516 may be in memory 2510 or they may be extracted directly from the instruction 2502 where they are explicitly given. The input 2506 of the memory 2510 comprises location S 2506.

OPE 2532 comprises $PG^{out}$ 2522 realized as a switch controlled by the output 2520 of the relation $R_O$ 2518 shown as a lookup table. The inputs to OPE 2532 are $V_S$ 2512, $C_S$ 2514, $C_D$ 2516 and location to write the $V_S$ 2512 to D 2508. Memory 2530 may be where the data $V_S$ 2526 is written at the location D 2528. The memory 2530 may or may not be physically distinct from memory 2510. The memory 2530 and memory 2510 may utilize, for example, a separate read and write ports of the physically same memory. The embodiment of the system in FIG. 25 may operate in substantially the same way as the embodiment of the system described above with respect to FIG. 24 with the exception that $C_S$ 2514 and $C_D$ 2516 are obtained directly from the instruction 2502 avoiding the read requests into a memory (or other means) to determine $C_S$ and $C_D$.

It will be noted that the approach of utilizing explicitly compartment identifiers as shown in FIG. 25 may be combined with other approaches of other embodiments described herein. For example, some operands may have explicit compartment identifiers and others not. When an operand does not have explicit compartment identifiers, it may be said to have implicit compartment identifiers (e.g. obtained from the DAP memory, etc.). Another example, in embodiments of the system the operands may have explicit compartment identifiers as described with respect to FIG. 25. In addition to this, embodiments of the system may obtain implicit compartment identifiers (e.g. as described with respect to the embodiment of FIG. 24 and other embodiments) and input into the OPE as both explicit and implicit compartment identifiers. The OPE may then make a determination of its outputs based on both implicit and explicit compartment identifiers. Moreover, besides explicit compartment identifiers, there may be explicit GDAPs. It will be understood from a review of this disclosure that compartment identifiers are one possible component of GDAP (e.g., the properties associated with data).

Figure 26:
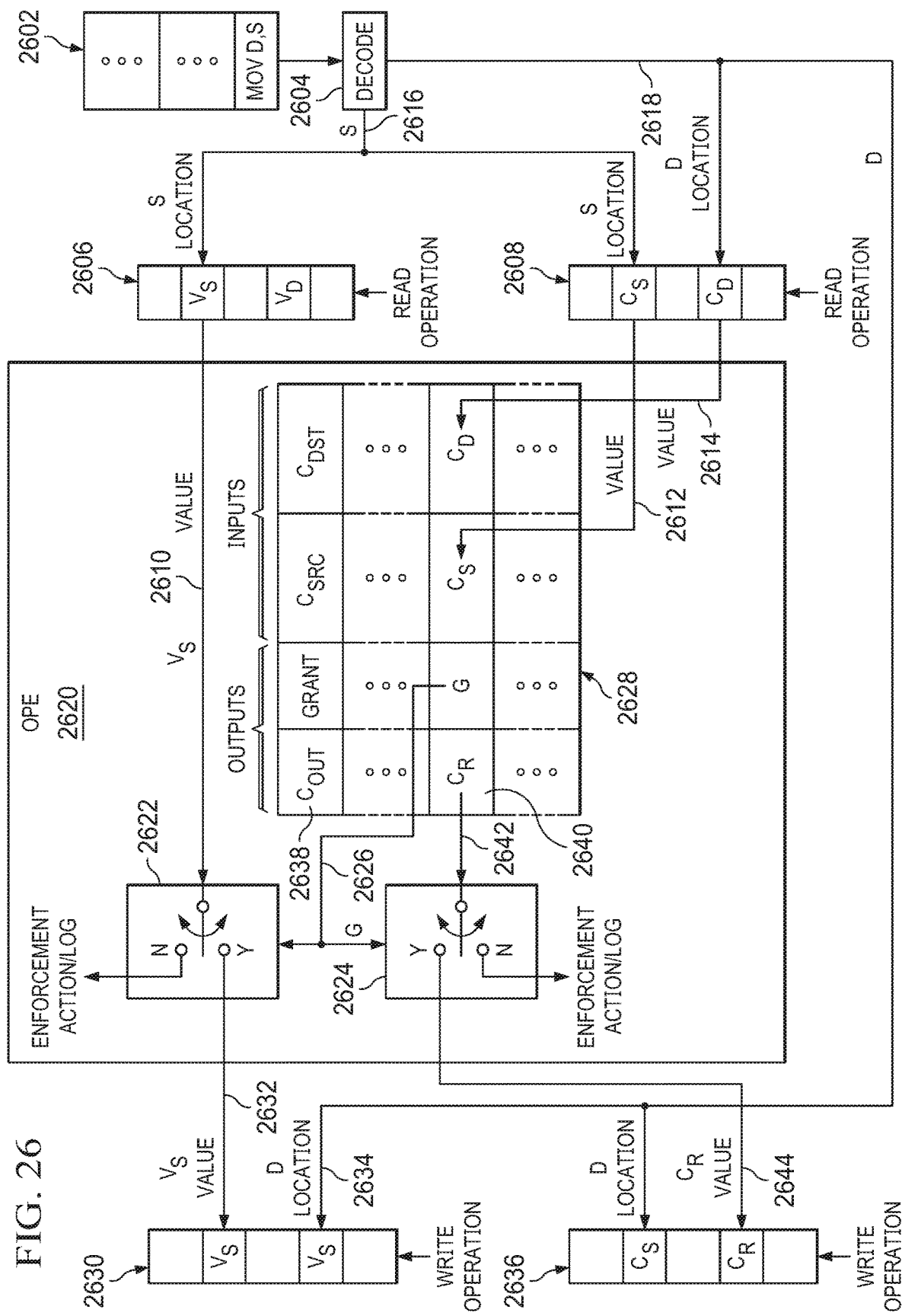
FIG. 26 is a block diagram depicting an embodiment of an outer policy enforcer used in a cross compartment data copy.

Moving now to FIG. 26, the use of one embodiment of an OPE in a system as illustrated in FIG. 24 is depicted with the additional capability to modify a destination compartment identifier. The system shown in OPE2 is simpler and more efficiently implementable but may lack flexibility essential to applications where dynamic compartment assignment is required. Comparing to the system in Figure OPE2, the system shown in Figure OPE3 enables (but does not require) modification of the destination compartment identifier on every cross-compartment data copy. The system in FIG. 26 also shows the concept of the instruction queue 2602 and decode 2604 that extracts relevant operands from instructions to be executed.

In this embodiment, the system may include a queue 2602 of instructions to be executed by the system. Again, a "MOV D←S" instruction as depicted in this example may be decoded 2604 and broken down into a read operation followed by write operation with the appropriate operands Memory 2606 holds the data to be read and an associated compartment identifier may be stored in memory 2608. The memory 2608 may be implemented as memory, logic deducing $C_S$ 2612 or $C_D$ 2614 or combination thereof. The input 2616 into the memory 2606 comprises location S 2616. The input 2616 into the memory 2608 comprises location S 2616 and the input 2618 into the memory 2608 comprises location D 2618.

OPE 2620 comprises two $PG^{out}$ 2622 and 2624 realized as two switches and both controlled by the output 2626 of the relation $R_O$ 2628 shown as a lookup table. The inputs to OPE 2620 are $V_S$ 2610, $C_S$ 2612, $C_D$ 2614 and location to write the $V_S$ 2610 to D 2618. The system may also comprise memory 2630 in which the data $V_S$ 2632 is written at location D 2634. The memory 2630 may or may not be physically distinct from the memory 2606. The memory 2630 and memory 2606 may, for example, represent a separate read and write ports of the physically same memory. The system also comprises memory 2636 to which the $C_R$ 2644 is written at location D 2634. The memory 2636 may or may not be physically distinct from the memory 2608. Again, the memory 2636 and memory 2608 may represent separate read and write ports of the physically same memory.

The embodiment of the system depicted in FIG. 26 may operate in the substantially same way as the system in FIG. 24. Here, however, more details are shown how S 2616 and D 2618 operands may be extracted from the instruction at the bottom of the instruction queue 2602 and the embodiment depicted here includes additional circuitry enabling dynamic destination compartment assignment. Specifically, the $R_O$ 2628 shown as a lookup table comprises an additional column marked $C_{out}$ 2638. This column 2638 includes a value $C_R$ 2640 that is an input 2642 into the additional $PG^{out}$ 2624 that is realized as a switch controlled by the output 2626 from $R_O$ 2628. The additional output 2644 of OPE 2620 is an input into the memory 2636 holding the compartment identifiers.

Figure 27:
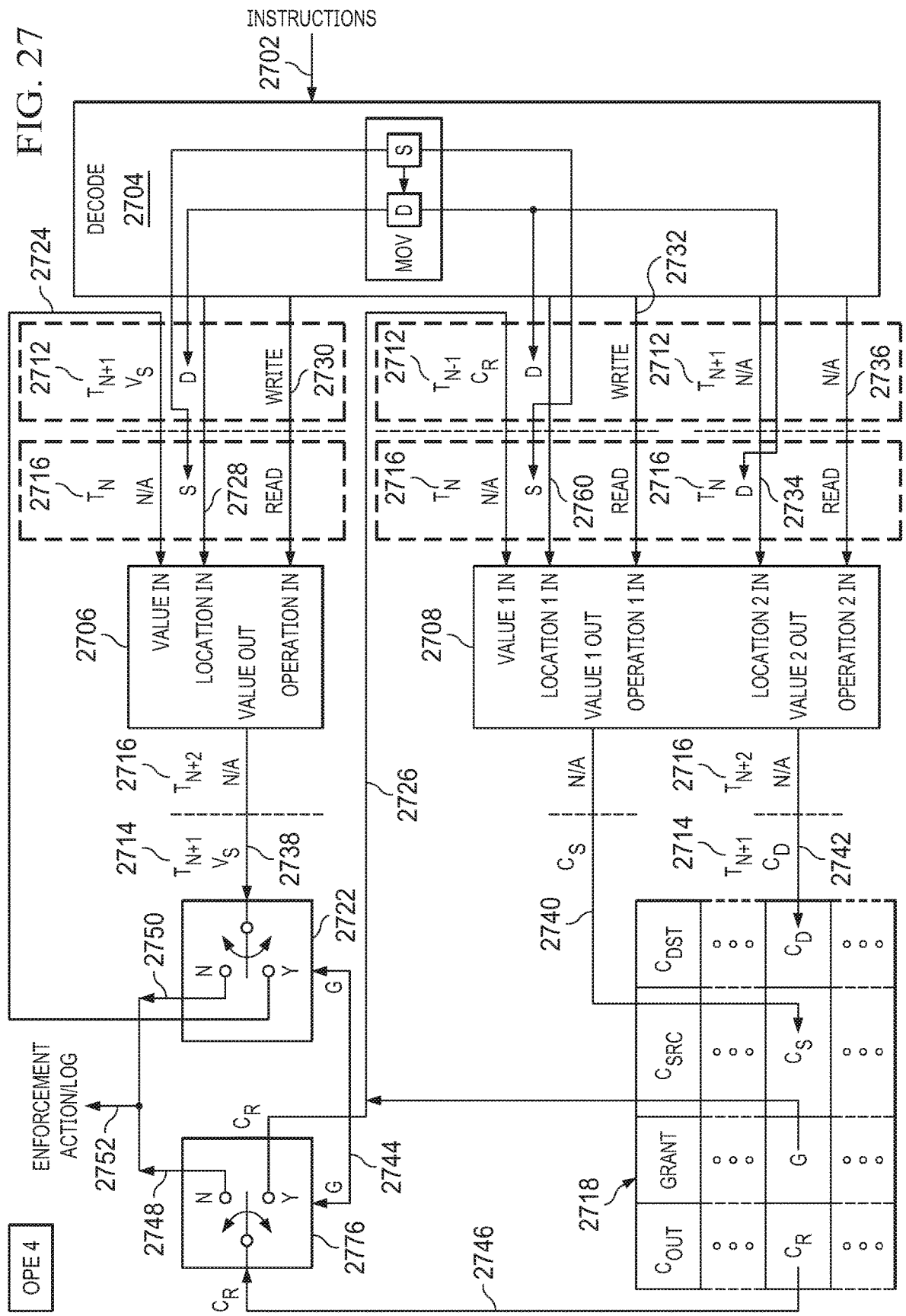
FIG. 27 is a block diagram depicting an embodiment of the use of an outer policy enforcer.

FIG. 27 depicts an embodiment of a system utilizing an OPE similar to that depicted in FIG. 26 with additional details ducting how a "MOV D←S" operation may be performed where data at location S is read and later written back to location D in the same memory 2706. Also, the DAPs (in this case comprising compartment identifiers) are read from the memory 2708 and written back to the same memory 2708.

Here, this system comprises an input 2702 with incoming instructions. The system also includes decode 2704 logic that decodes instructions and extract operands and necessary control signals to drive the rest of the system to execute desired instruction. Memory 2706 holds data and memory 2708 holds the compartment identifiers or other GDAP. The inputs into the memories 2706 and 2708 at the time $T_N$ are shown in the column marked $T_N$ 2710. The inputs into the memories 2706 and 2708 at time $T_N+1$ are shown in the column marked $T_N+1$ 2712. The outputs of the memories 2706 and 2708 at the time $T_N+1$ are shown in the column marked with $T_N+1$ 2714. The outputs of the memories 2706 and 2708 at the time $T_N+2$ are shown in the column marked with $T_N+2$ 2716. The OPE functionality is implemented by the relation $R_O$ 2718 shown realized as lookup table, and the two $PG^{out}$s 2720, 2722 realized as two switches. The outputs of OPE comprise data $V_S$ 2724 to be written into the memory 2706 and compartment identifier $C_R$ 2726 associated with $V_S$ 2724. The $C_R$ 2726 is to be written into the memory 2708 at the time $T_N+1$ 2712.

In operation, the instructions 2702 to be executed enter the system and are decoded 2704 to extract operands and the appropriate signals 2728, 2730, 2760, 2732, 2734, 2736 to drive the rest of the system to execute given instruction. In this example, values of inputs into memories 2706 and 2708 are shown at the time $T_N$ 2710 and $T_N+1$ 2712. Memories 2706, 2708 produce outputs 2738, 2740, 2742 at one time slot following the presentation of valid inputs. The outputs at the time $T_N+1$ 2714 and at the time $T_N+2$ 2716 are shown in columns 2714 and 2716. Shown is the case where the memory gives no output (e.g., N/A) in case of write operation.

Outputs $C_S$ 2740 and $C_D$ 2742 of memory 2708 are inputs into $R_O$ 2718 based on which the control signal G 2744 and the destination compartment identifier $C_R$ 2746 are obtained. Output $V_S$ 2738 of the memory 2706 is an input into $PG^{out}$ 2722, which allows the passage of $V_S$ 2738 depending on the gating signal G 2744. Similarly, the $PG^{out}$ 2720 gates the passage of $C_R$ 2746 depends on the gating signal G 2744. In the case where a cross-compartment copy operation is not permitted by the policy and as determined by $R_O$ 2718, the enforcement action 2748, 2750, 2752 may be triggered. If cross-compartment copy operation is permitted by the policy and as determined by $R_O$ 2718 the $V_S$ 2724 is passed to the input of the memory 2706 and $C_R$ 2726 is passed to the input of memory 2708, both to be written into their respective memories. As will be realized, the examples of timing given herein are but one example, other timings in other embodiments may differ based on the embodiment of the system implemented and are fully contemplated herein.

It will be noted here that FIG. 23 depicts an embodiment a system with an OPE with a common memory holding data and DAPs while FIGS. 24, 26 and 27 depict embodiments of systems with separate data and DAP memories. Thus, as may be understood, realizations with any combination of common data and DAP memories, separate data and DAP memories, as well as separate memories for each component of DAP or data are contemplated. Furthermore, the term memory or memories in such contexts should be interpreted additionally to include almost any mechanism to obtain such data or DAPs. In certain applications it may be beneficial for power, performance, cost, area, efficiency, etc. to determine DAPs (e.g. compartment identifiers) by applying a logic function on, for example, a source or destination address, etc. In other applications (e.g. in case of system with caches) it may be beneficial to extend the data memory width and add DAPs to the same memory word as the data itself. This results in a single access to the single memory outputting both data and DAPs at the same time, possibly saving power, area, cost, or other benefits.

Figure 28:
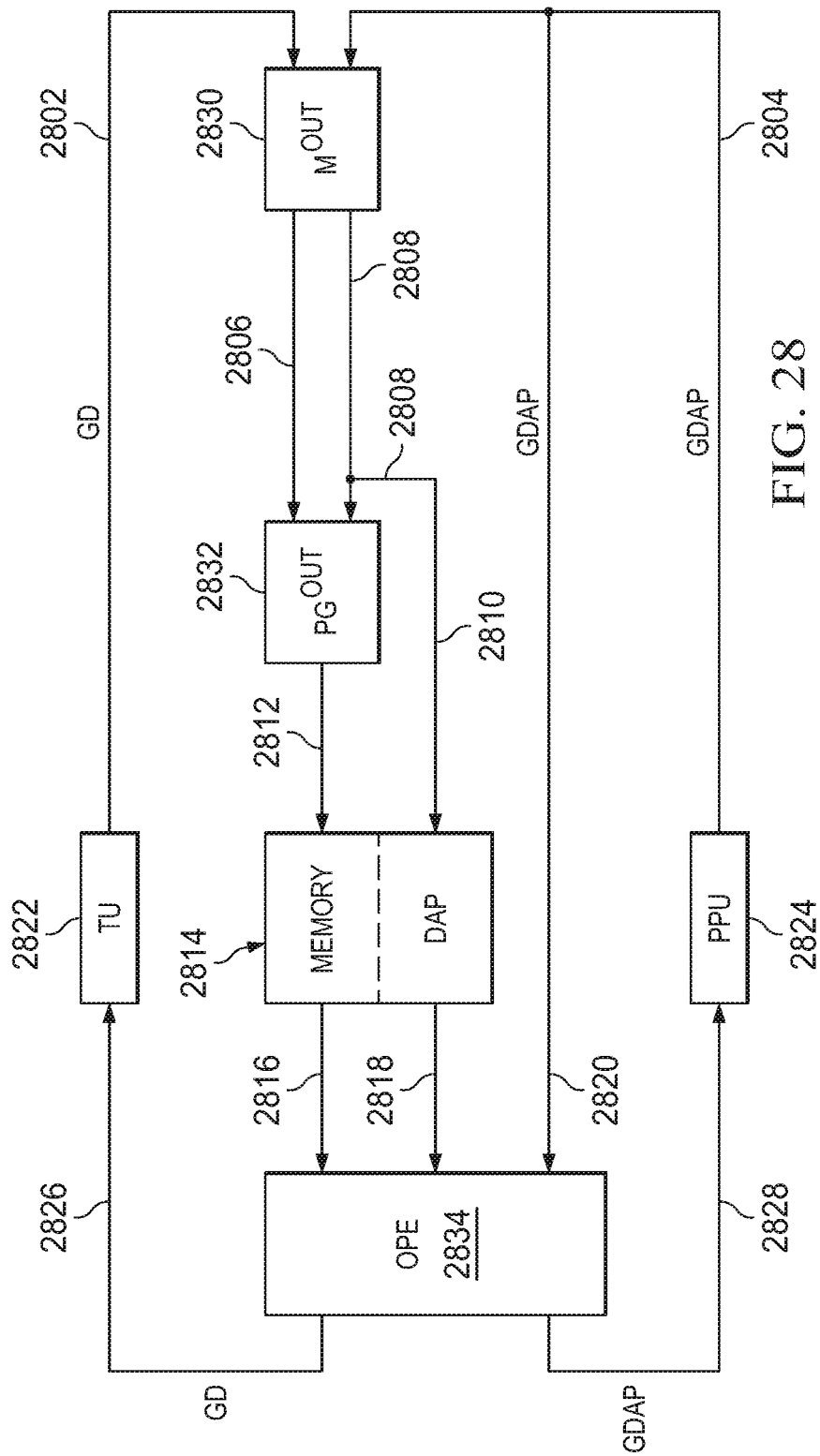
FIG. 28 is a block diagram depicting an embodiment of a cross compartment data load.

FIG. 28 depicts one embodiment of a cross-compartment (or cross-domain) data load in the context of a data processing system. The data processing system may include Transformation unit (TU) 2822 performing data processing without directly handling the GDAPs. TU 2822 may, for example, be a data processing unit may include any standard functionality required to process data such as a CPU, GPU, Turning machine, data processor, data processing pipeline, etc. TU 2822 may internally comprise a fetch unit, decode unit, operand access, register file, etc. associated with processing of data (including instructions). Properties propagation unit (PPU) 2824 ensures GDAP synchronization with GD, fetching the GDAPs associated with GD. In particular, PPU may include functionality of properties propagation unit as described herein and additionally may also include any functionality handling GDAP's and logic adapted to keep GDAP in synchronization with GD.

$m^{out}$ 2830 is a mapping unit. For a given GD 2802, GDAP 2804 pair, $m^{out}$2830 deterministically produces a new GD 2806, GDAP 2808 pair. The mapping function (configuration) is defined by a policy (not explicitly shown). The TU 2822 output comprising GD 2802 is connected to the GD input of $m^{out}$ 2830. The PPU 2824 output 2804 is connected to GDAP input 2804 of $m^{out}$ 2830. $m^{out}$ 2830 may be optional. If reut 2830 is not included in an embodiment, GD input 2802 is directly connected to GD output 2806 and its GDAP input 2804 is connected to GDAP 2808 output.

$PG^{out}$ 2832 is an output perimeter guard as previously described above. Its configuration is also defined by the policy (again, not explicitly shown). $PG^{out}$ 2832 takes as input GD input 2806 connected to GD output 2806 of $m^{out}$ 2830. $PG^{out}$ 2832 GDAP input 2808 is connected to $m^{out}$ 2830 GDAP output 2808. GD output 2812 of $PG^{out}$ 2832 is connected to memory 2814. The $PG^{out}$ 2832 is optional in certain embodiments. If it is not present, line 2806 connects directly to line 2812 and line 2808 connects directly to line 2810. The 2810 connection may be optional, regardless of if $PG^{out}$ 2832 is present or not.

Memory 2814 provides a way to access data and DAPs. As discussed herein, multiple implementations are possible, with single wide memory, separate data and DAP memories, logic, etc.

OPE 2834 has GD input 2816, GDAP input 2818 and GDAP input 2820. The GDAP 2818 and GDAP 2820 keep association (synchronization) with GD input 2816. The OPE's 2834 GD output 2826 is feedback to TU 2822 and the OPE's 2834 GDAP output 2828 is feedback to PPU 2824. As discussed, the GDAP may comprise compartment identifiers and other data associated properties for corresponding data GD.

As TU 2822 is processing a (e.g., load) instruction in the usual way (the instruction is fetched, decoded, etc.), the address of location where foreign data is residing and (e.g., optional) encoding signaling load is part of GD output 2802. The associated properties (and other GDAP if any) may be output 2804 from PPU 2824. The 2802 GD and 2804 GDAP thus are input to the $m^{out}$ 2830 unit. The $m^{out}$ 2830 unit may simply pass the GD (data) through 2806. The $m^{out}$ 2830 keeps synchronization between GD 2806 and GDAP 2808 as it is kept between lines 2802 and 2804. The incoming GDAP on line 2804 may be mapped to line 2808. Again, the $m^{out}$ 2830 unit is optional (in which case GD and GDAP are simply passed through).

Additionally, $PG^{out}$ 2832 is optional. If it is not implemented, the $m^{out}$ 2830 output 2806 connects directly to line 2812, and line 2808 to line 2810. $PG^{out}$ 2832 operates as the output perimeter guard, and in accordance with the policy, it may prevent access to the next unit, in this example to the memory 2814. $PG^{out}$ 2832 may also be used to prevent side-channel leakage (e.g., if access to device 2814 causes side-channel leaks). Line 2810 is optional. In such case where line 2810 is not present, there may be no GDAP input into memory 2814.

When processing load instruction, the GD 2812 may comprise a memory address or other identifier of the content to be loaded. $PG^{out}$ 2832 may transform or otherwise modify GD 2806 onto line 2812 according to the policy. Memory 2814 returns the content identified by GD 2812. It will be understood that memory 2814 may be any other type of device which is adapted to output 2816 depending on input 2812. The memory 2814 also returns the DAP (may comprise GDAP and may comprise compartment identifier and other properties).

Thus, line 2818 is synchronized with line 2816. Line 2820 is synchronized with line 2816 such that the instance of GDAP at point 2804 that is associated with GD at 2802 remains synchronized with GD at point 2816 even if GD was transformed on its way from 2802 to 2816. Outer policy enforcer 2834 operates according to the outer policy governing the cross-domain or cross-compartment interactions. An outer policy comprises a definition of the outer relation.

The OPE 2834 may determine if the GDAP 2818 is in relation with the GDAP 2820. The OPE 2834 may also determine if GD 2816 and GDAP's 2818 and 2820 are in relation. Based on this, the OPE 2834 may allow or prevent GD 2816 to be output to GD 2826 or perform GD transformation according to the policy. The OPE 2834 may also perform mapping of GDAP 2818 into GDAP 2828 and GD 2816 into GD 2826. The GD 2826 comprises loaded data from a foreign domain (e.g., which may be transformed). The GDAP 2828 comprises OPE 2834 assigned GDAP's. Lines 2828 and 2826 remain synchronized.

As an example, if a policy specifies that loading the data from domain F into domain M is allowed (so read from domain F with result arriving into domain M). Domain F GDAP's: $T^F=\{0_F, 1_F, 2_F\}$, Domain M GDAP's: $T^M=\{0_M, 1_M, 2_M\}$, Outer Relation: $1_M$ is in relation with $0_F$ for loads.

In this example if line 2818 comprises $0_F$ and line 2820 comprises $1_M$, the Outer Relation applications shows read is allowed, and OPE2334 allows passage of 2816 into 2826. There may be further mapping of 2818 into 2828, in the example 2818 of $1_M$ may be mapped into $2_M$ so that 2828 becomes $2_M$.

As another example, if line 2818 comprises $0_F$ and 2820 comprises $0_M$, the Outer Relation applications shows read is not allowed, and OPE 2834 triggers an enforcement action (e.g., exception, blanking of the data, create a log, etc.).

Figure 29:
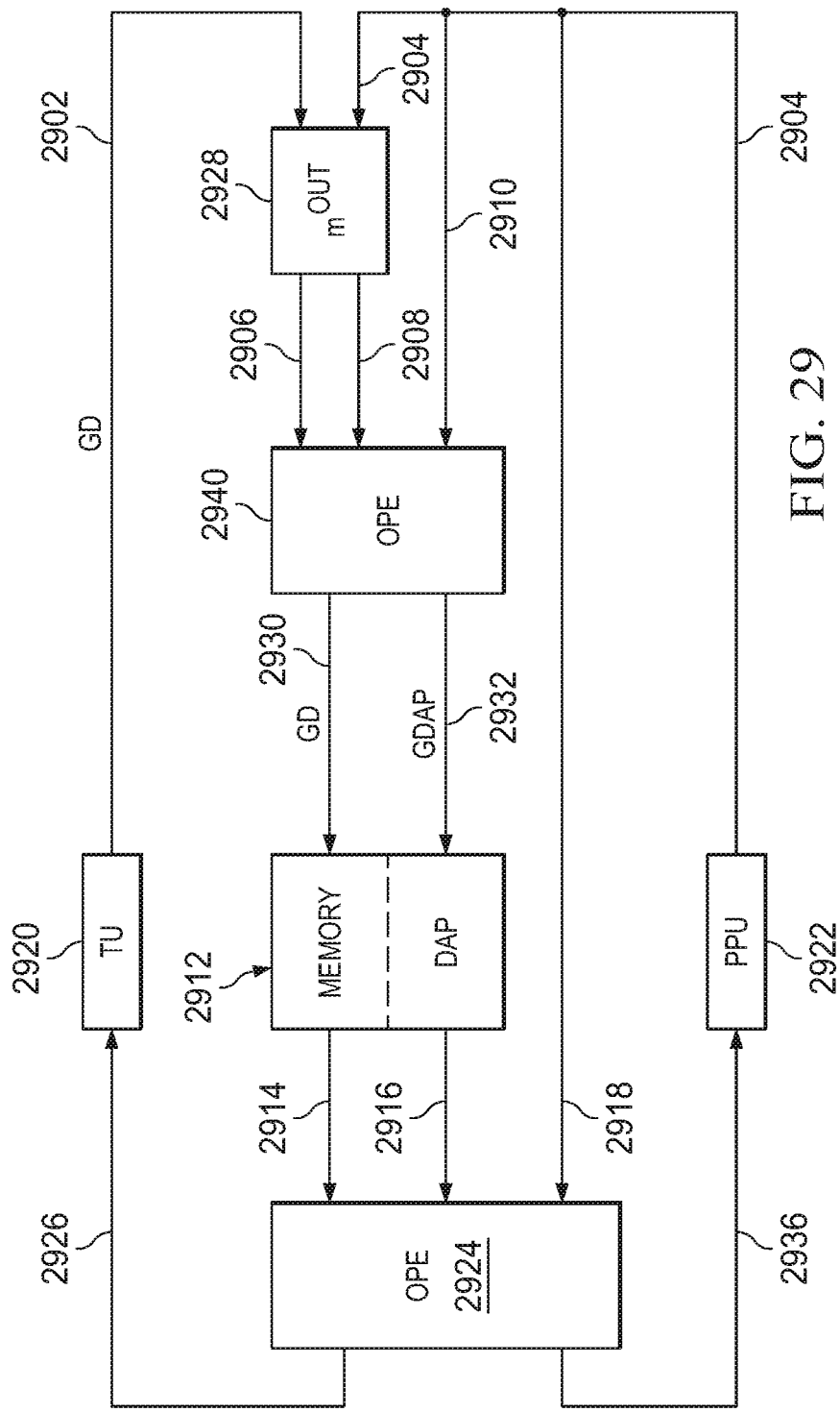
FIG. 29 is a block diagram depicting an embodiment of a cross compartment data store and flow.

FIG. 29 depicts an embodiment of cross-compartment (or cross-domain) data stores and flow in the context of a data processing system. The system in FIG. 29 comprises a TU 2920 performing data processing without directly handling the GDAPs (e.g., CPU, GPU, etc.). TU 2920 may internally comprise processing elements as id known (e.g. fetch unit, decode unit, operand access, register file, etc.).

PPU 2922 ensures GDAP synchronization with GD, fetching the GDAPs associated with GD. $m^{out}$ 2928 is a mapping unit. For a given GD 2902, GDAP 2904 pair, it deterministically produces a new GD 2906, GDAP 2908 pair. The mapping function (e.g., configuration) of $m^{out}$ 2928 is defined by a policy (not explicitly shown). The TU 2920 output comprising GD 2902 is connected to GD input of $m^{out}$ 2928. The PPU 2922 output 2904 is connected to GDAP input 2904 of $m^{out}$ 2928. $m^{out}$ 2928 may be optional and, if not included, GD input 2902 may be directly connected to GD output 2906 and GDAP input 2904 connected to its GDAP 2908 output.

OPE 2940 comprises GD input 2906, GDAP input 2908 and GDAP input 2910. The GDAP 2908 and GDAP 2910 keep association (synchronization) with the GD input 2906. The OPE 2940 GD output 2930 and GDAP output 2932 are inputs into the memory 2912.

Memory 2912 may be adapted to store and retrieve data and DAPs. OPE 2924 is coupled to GD input 2914, GDAP input 2916 and GDAP input 2918. The GDAP 2916 and GDAP 2918 keep association (synchronization) with the GD input 2914. The OPE 2924 GD output 2926 is feedback to TU 2920 and the OPE 2924 GDAP output 2936 is feedback to PPU 2922.

OPE 2924 may be optional and, if not present in an embodiment, input 2918 into the OPE 2924 may be discarded (e.g., or the input may not exist), line 2916 is connected to line 2936 and 2914 is connected to line 2926. Again, a GDAP may comprise compartment identifiers and other data associated properties.

When writing data (e.g., to a foreign domain), TU 2920 may be processing a store instruction in the usual way (e.g., the instruction is fetched, decoded, etc.). The address of the location where the data is to be written, the data to be written itself and (optional) encoding signaling store is part of the GD output 2902. The associated properties (and other GDAP if any) are output 2904 from PPU 2922. The GD 2902 and GDAP 2904 arrive to $m^{out}$ 2928 unit. The $m^{out}$ 2928 unit may simply pass the GD (data) through to 2906. The $m^{out}$ 2928 keeps synchronization between GD 2906 and line 2908 as it is kept between 2902 and 2904. The incoming GDAP 2904 may be mapped to 2908. The $m^{out}$ 2928 unit may be optional (in which case GD and GDAP are simply passed through).

OPE 2940 operates according to the Outer Policy governing the cross-domain or cross-compartment interactions. The Outer Policy comprises definition of the Outer Relation. The OPE may determine if the GDAP 2908 is in relation with the GDAP 2910. The OPE 2940 may also determine if GD 2906 and GDAP's 2908 and 2910 are in relation. Based on this the OPE may allow or prevent GD 2906 to be output to GD 2930 or perform GD transformation according to the policy. The OPE may also perform mapping between the GDAP 2908 into GDAP 2932 and GD 2906 into GD 2930.

In the case of store (e.g., instruction) the GD 2930 may include a memory location or other identifier of content to be stored and the content itself. The GDAP 2910 may comprise a compartment identifier of the memory location where the content is going to be stored. Such compartment identifier may also be obtained as described in association with a cross-compartment data copy with explicit compartment identifiers (see e.g., the accompany description associated with FIG. 25).

If store is allowed (as determined by the OPE 2940 and as may be indicated by the OPE 2940 by outputting the GD 2930 and GDAP 2932), the data 2930 is written to the memory at the location that is also part of GD 2930. The GDAP 2932 is also written into memory 2912 in association with GD 2930.

There may be no output from memory 2912 or there may be an output from 2912 (example given, acknowledge). If there is an output, it may be handled by the OPE 2924 as described for loads (e.g., as described with respect to the embodiment of FIG. 28). Memory 2912 may only signal on its outputs 2914, 2916 that the store operation is successfully completed. Such signaling may even be implicit (e.g. memory completes operation in one cycle). If OPE 2924 is absent, the 2926 and 2936 may comprise control signals (implicit or explicit). The outputs 2914, 2916 of memory 2912 may be passed through OPE 2924 e.g. to prevent potential side-channel leakages. For example, the OPE 2924 may keep the GD 2914 and GDAP 2916 unmodified in the content but normalize delays to prevent side-channel leakages. Furthermore, if there is an output from the memory 2912, such an operation may be considered and handled as two phases of one operation (store followed by load). Other combinations are possible and contemplated herein.

For example, assume storing data from domain M into domain F is allowed (e.g., as a policy). Here, Domain F GDAP's: $T^F=\{0_F, 1_F, 2_F\}$, Domain M GDAP's: $T^M=\{0_M, 1_M, 2_M\}$ and Outer Relation: $0_F$ is in relation with $1_M$ for stores.

In this example 2904 comprises $1_M$ GDAP associated with the GD comprising data and address to be stored into the F domain. The $m^{out}$ may map $1_M$ 2904 into $0_F$ on 2908. The data 2906 to be stored and address remain in sync with its GDAP 2908. 2910 remains $1_M$. Furthermore, if 2908 comprises $0_F$ and 2910 comprises $1_M$, the Outer Relation applications shows write is allowed, and OPE 2940 allows the passage of 2906 into 2930. There may be further mapping of 2908 into 2932, but in this example we assume there is none. Thus, GD 2930 together with its GDAP 2932 is written into the memory location as identified by the memory address that is also part of the GD 2930.

As another similar example, if 2908 comprises $0_F$ and 2910 comprises $0_M$, the Outer Relation applications shows write is not allowed, and the OPE 2940 triggers an enforcement action (ex. exception, blanking of the data, log.).

Figure 30A:
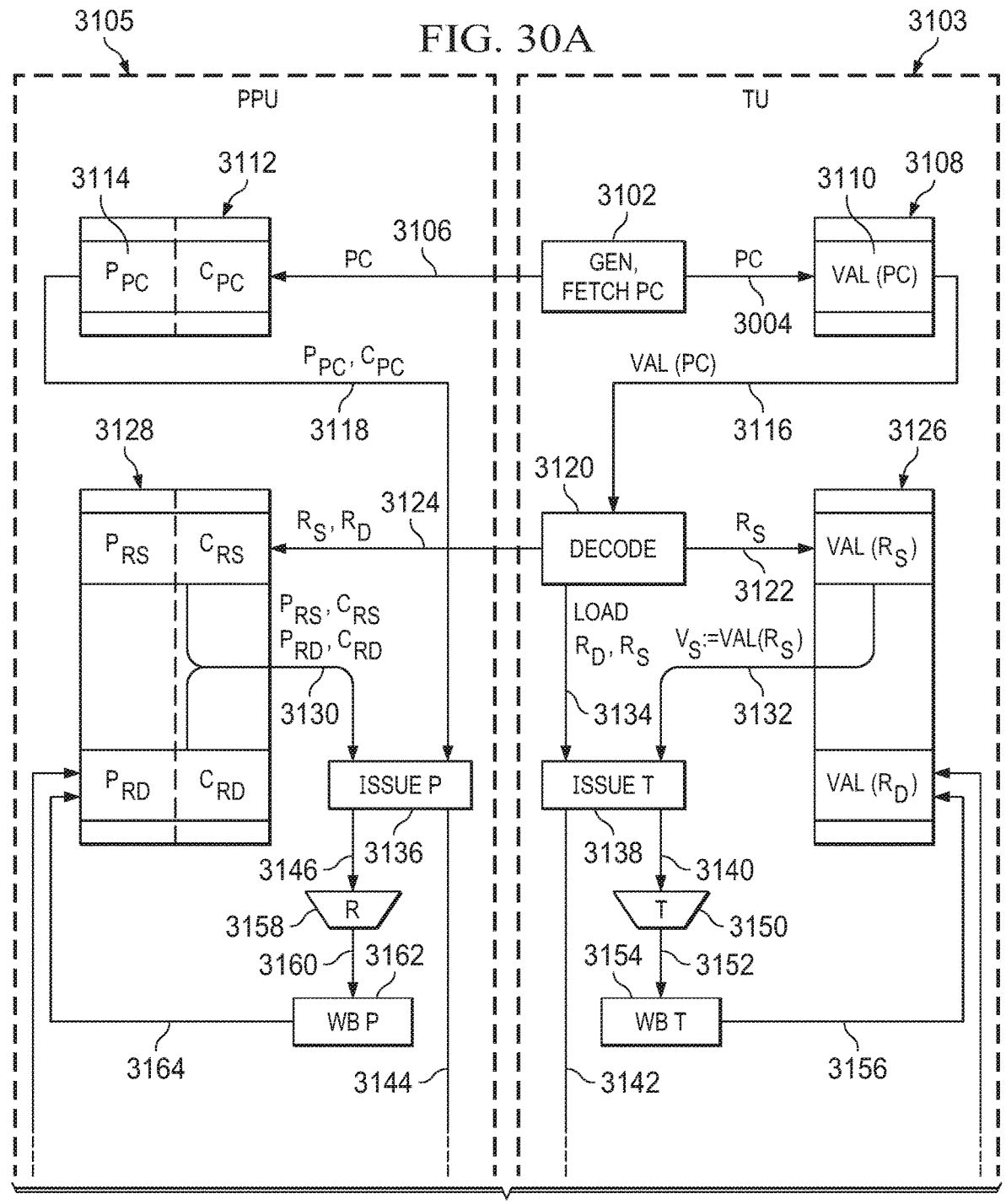
FIGS. 30A and 30B (collectively FIG. 30) is a block diagram depicting an embodiment of an outer policy enforcer.
Figure 30B:
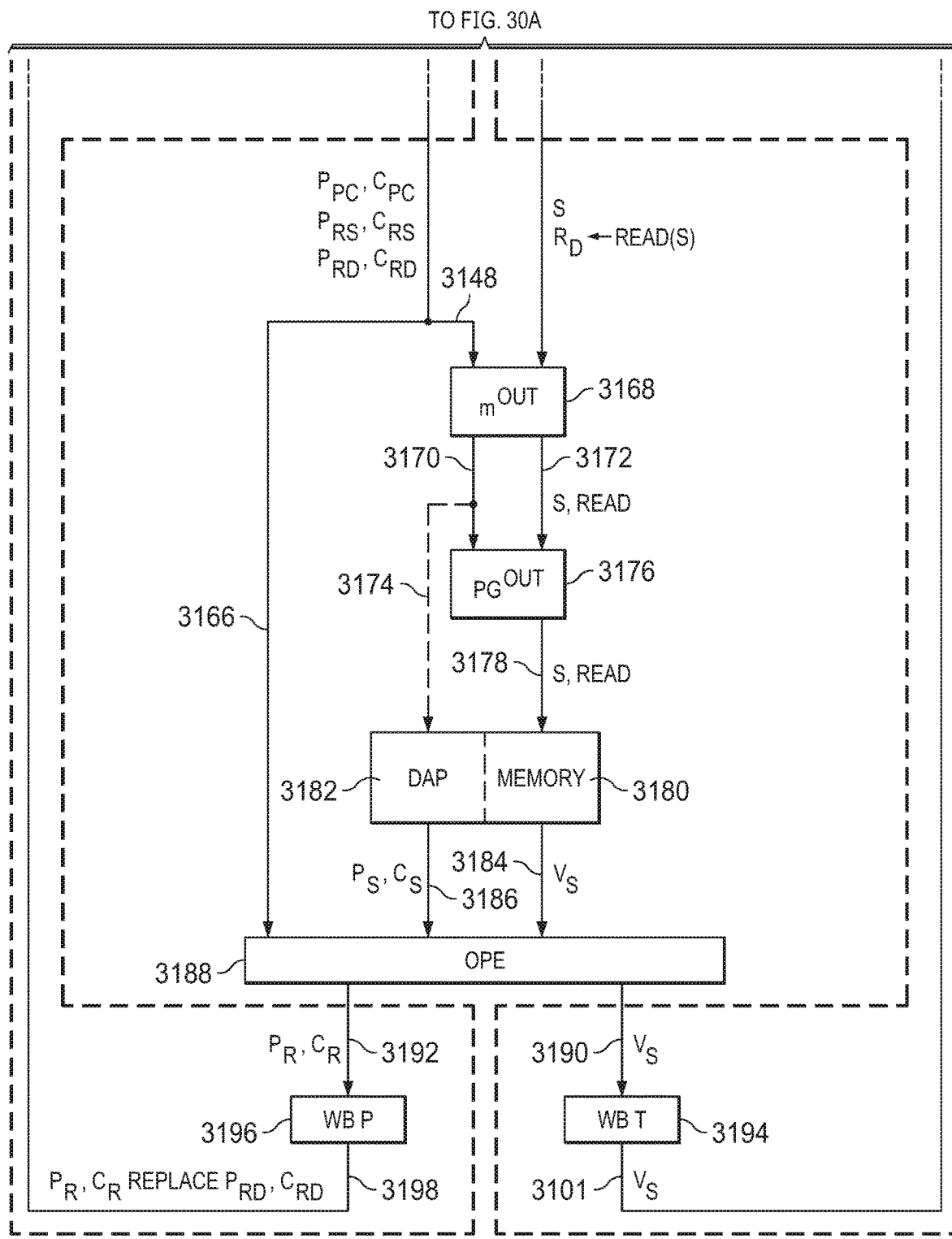

In FIG. 30, an embodiment of an OPE as implemented and integrated with a data processing system is disclosed. In particular, FIG. 30 depicts how an embodiment may be integrated into with components of a data processing device (e.g. CPU).

The system in FIG. 30 may comprise TU 3103, which may further comprise instruction fetch unit 3102 generating program counter (PC) 3104 that may fetch VAL(PC) 3116 data located at PC location 3110 from the instruction memory 3108. The decode logic 3120 may extract instruction 3134 and its operands 3122 from the register file 3126 that may hold the values of register operands 3132. The issue logic 3138 may determine the appropriate functional path 3142 or 3140 to which it may issue the instruction 3134.

A cross-compartment load may be issued to 3142. The intra-compartment instructions may be issued to 3140, which may be an input of functional transformation T 3150. T 3150 may be, for example, an ALU or other more or less complex functional unit or pipeline. The results of T 3150 are input to WBT 3154, which may handle the T 3150 results writeback via 3156 back to the register file 3126. The TU 3103 may have multiple writeback paths. The writeback path starting at 3190 may handle the cross-compartment load writeback operation. The writeback unit WBT 3194 with writeback path 3101 to register file 3126 may be the same entity as 3154 or they may be distributed and implemented as separate entities. As depicted, TU 3103 is a generic model for a data processing device e.g. CPU, GPU, etc.), it will be understood that other variations may be utilized with other embodiments, and all such variations are fully contemplated herein.

PPU 3105 may further comprise instruction properties memory 3112 holding the instruction GDAPs 3114 associated with the instruction identified by PC 3106 obtained from the TU 3103. The memories 3112 and 3108 may be the same memory (e.g., which may be wider in such cases). GDAPs 3118 in this example comprises compartment identifier of instruction $C_{PC}$ 3118 and other properties of instruction $P_{PC}$ 3118. The PPU 3105 may obtain the GDAPs of instruction operands $R_S$, $R_D$ 3124 from register file properties memory 3128. The GDAPs 3118 of the instruction identified by PC 3106 and GDAPs 3130 of instruction operands $R_S$, $R_D$ 3124 are input to issue logic 3136.

Issue logic 3136 keeps synchronization with issue logic 3138 so that GDAPs 3144 are associated with GD 3142 and GDAPs 3146 are associated with GD 3140. The $R_O$ 3158 may determine the output properties 3160 such that they are in relation with the input properties 3146. The GDAPs 3160 are associated with GD 3152. The GDAPs 3160 are input into the WBP 3162, which may handle the $R_O$ 3158 results writeback via 3164 to the register file properties memory 3128. The PPU 3105 may have multiple writeback paths. The writeback path starting at 3192 may handle the cross-compartment load writeback operation. The writeback unit WBP 3196 with the writeback path 3198 to the register file properties memory 3128 may be the same entity as 3162 or they may be distributed and implemented as separate entities.

$m^{out}$ 3168 is a mapping unit. For a given GD 3142, GDAP 3148 pair, it may deterministically produce a new GD 3172, GDAP 3170 pair. The mapping function (configuration) is defined by the policy (not explicitly shown). The TU 3103 output comprising GD 3142 is connected to the GD input of $m^{out}$ 3168. The PPU 3105 output 3144 is connected to GDAP input of $m^{out}$ 3168. $m^{out}$ 3168 is optional and if it does not exist its GD input 3142 is directly connected to its GD output 3172 and its GDAP input 3148 is connected to its GDAP 3170 output.

$PG^{out}$ 3176 is an output perimeter guard as previously described. Its configuration is also defined by the policy (not explicitly shown) being enforced. $PG^{out}$ 3176 GD input 3172 is connected to $m^{out}$ 3168 GD output 3172. $PG^{out}$ 3176 GDAP input 3170 is connected to $m^{out}$ 3168 GDAP output 3170. $PG^{out}$ 3176 GD output 3178 is connected to memory 3180. The $PG^{out}$ 3176 is optional. If it is not present, 3172 connects directly to 3178 and 3170 directly connects to 3174. The 3174 connection is optional, regardless of if $PG^{out}$ 3176 is present or not.

Memory 3180, 3182 may provide access to data and DAPs. As elsewhere discussed, multiple implementations are possible, with single wide memory, separate data and DAP memories, logic, etc. OPE 3188 includes GD input 3184, GDAP input 3186 and GDAP input 3166. The GDAP 3166 and GDAP 3186 keep association (synchronization) with GD input 3184. The OPE 3188 GD output 3190 is feedback to TU 3103 and the OPE 3188 GDAP output 3192 is feedback to PPU 3105. As previously detailed, the GDAP may comprise compartment identifiers and other data associated properties.

In operation, of an embodiment of such a system, TU 3103 may fetch, decode, and issue a cross-compartment load instruction located at PC 3104 to logic with input 3142. PPU 3105 obtains GDAPs associated with the cross-compartment load instruction and the instruction's operands. The GDAPs comprise compartment identifiers marked with "C" and other properties excluding compartment identifiers marked with "P". Specifically, these properties may include the properties of instruction located at PC 3106 $P_{PC}$ 3118 and the compartment identifier of instruction located at PC 3106 $C_{PC}$ 3118, the properties $P_{RS}$ and $P_{RD}$ 3130 associated with the values of operands $R_S$ and $R_D$ 3124, compartment identifiers $C_{RS}$ and $C_{RD}$ 3130 associated with the values of operands $R_S$ and $R_D$ 3124. For example, one implementation of PPU 3105 may be tightly integrated with TU 3103 such that the 3108 and 3112 are a part of one (e.g., wider) memory. In this way, the synchronization is easily kept and no duplication of control logic is necessary. Similar applies to memories 3126 and 3128. The PPU 3105 is closely tied to the TU 3103. The PPU 3105 may leverage same control structures as the TU 3103.

Depicted is an example of how cross-compartment "LOAD $R_D$, $R_S$" instruction 3134 residing at PC 3104 address of instruction memory 3108 may be executed. Functionally, the instruction "LOAD $R_D$, $R_S$" may read the value S 3132 held in the $R_S$ register 3122 of the register file 3126. The value S 3132 may be an address or other location identifier in the memory 3180 from where the value $V_S$ 3184 may be read. The value $V_S$ 3184 may be then written back to the $R_D$ register held in the register file 3126.

The execution of the cross-compartment instruction outside of TU 3103 may start with the issue logic 3138 passing required operand value S 3142 and control signal indicating a read operation 3142. $m^{out}$ 3168 and $PG^{out}$ 3176 may be optional. Their operation may be as disclosed previously. In this example they are considered absent and implemented as a simple pass through.

Memories 3180 and 3182 may be presented with the address S 3178 and control signals indicating read command 3178. The 3180 and 3182 may be a single memory with each word of memory holding both GDAPs and GD. Memory 3180 outputs value $V_S$ 3184 that is held at the location S. The memory 3182 outputs $P_S$ and $C_S$ 3186 associated with value $V_S$ 3184.

The $V_S$ 3184, $P_S$ and $C_S$ 3186 and other GDAPs 3166 are inputs into OPE 3188. As discussed previously, the GDAPs may hold any information necessary for the OPE 3188 to check compliance with the (outer) policy. For example, $R_S$ and $R_D$ are not required to execute the described load operation, but may be passed to the OPE 3188 through GDAPs by the (e.g., slightly modified) PPU 3105.

The OPE 3188 outputs $V_S$ 3190 and $P_R$, $C_R$ 3192 if $P_S$, $C_S$ 3186, $P_{PC}$, $C_{PC}$, $P_{RS}$, $C_{RS}$, $P_{RD}$, $C_{RD}$ 3166 and $V_S$ 3184 are in relation with $P_R$, $C_R$ 3192 and in compliance with outer policy (as described previously). The compartment identifier $C_R$ 3192 and other properties $P_R$ 3192 are feedback into the PPU 3105. The $C_R$, $P_R$ 3192 are associated (and kept in sync) with $V_S$ 3190, which is feedback into the TU 3103.

It will be noted that the example embodiments shown in FIG. 30 is presented to allow is to better understand one out of many possible ways how an embodiment may be integrated within a data processing device (e.g. CPU, GPU, etc.). It will be understood that based on a review of this disclosure a designer of data processing device will be able to design other embodiments (e.g., of an OPE or PPU) for use with other types of data processing devices, and all such embodiments are fully contemplated herein.

Figure 31A:
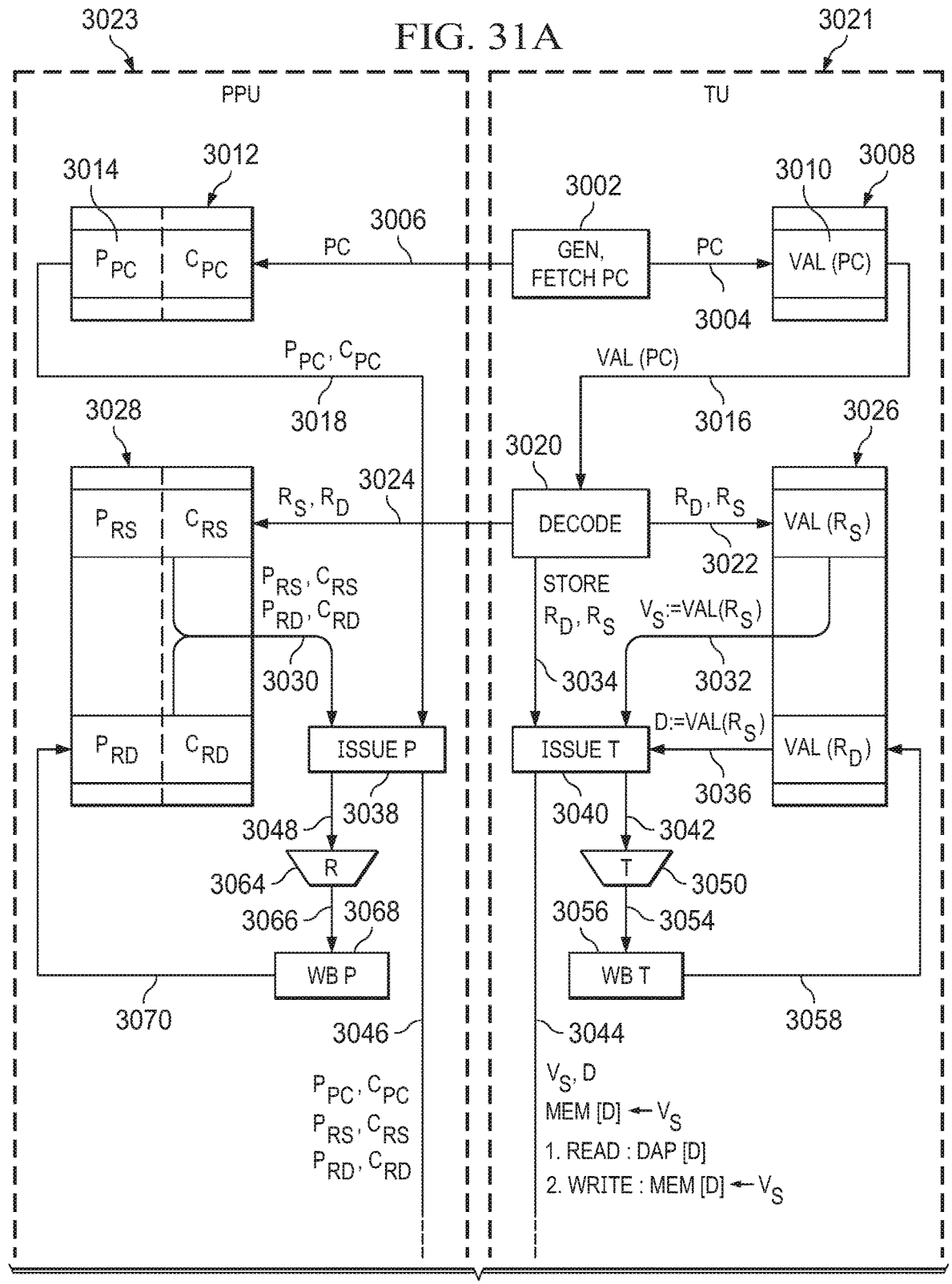
FIGS. 31A and 31B (collectively FIG. 31) is a block diagram depicting an embodiment of an outer policy enforcer.
Figure 31B:
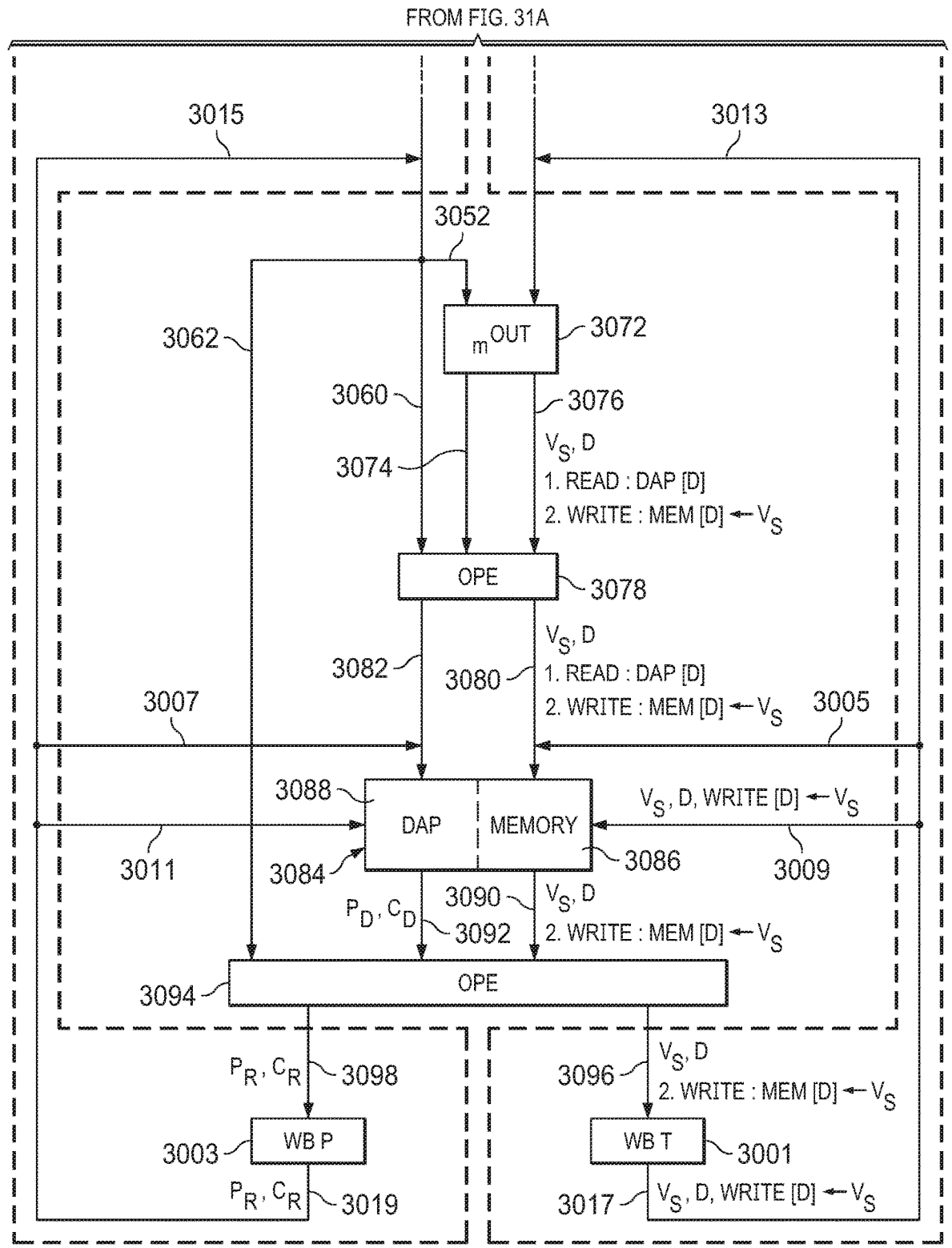

Moving now to FIG. 31, an embodiment of an OPE as implemented and integrated with a data processing system is disclosed. In particular, FIG. 30 depicts how an embodiment may be integrated with components of a data processing device (e.g. CPU). In comparison to FIG. 30, the embodiment of FIG. 31 is described with a single structure supporting cross-compartment load and store instructions with or without explicit compartment identifiers and side channel protection.

An embodiment may thus comprise TU 3021, which may further comprise fetch unit 3002 generating program counter (PC) 3004 and may fetch VAL(PC) 3016 data located at PC location 3010 from the instruction memory 3008. The decode logic 3020 may extract instruction 3034 and its operands 3022 from the register file 3026 that may hold the values of register operands 3032. The issue logic 3040 may determine the appropriate functional path 3044 or 3042 to which it may issue the instruction 3034. The cross-compartment load may be issued to 3044. The intra-compartment instructions may be issued to 3042, which may be an input of functional transformation T 3050. The T 3050 may be for example, an ALU or other more or less complex functional unit or pipeline.

The results of T 3050 are input to WBT 3056, which may handle the T 3050 results writeback via 3058 back to the register file 3026. The TU 3021 may have multiple writeback paths. The writeback path starting at 3096 may handle the cross-compartment store writeback operation. The writeback unit (WBT) 3001 with writeback path 3005 to memory 3086 may be the same entity as 3056 or they may be distributed and implemented as separate entities. The writeback path 3005 may also connect to register file 3026 (not shown in this figure but depicted with respect to FIG. 30) to enable write back of loaded data. As will be understood, many variations of TU 3021 may be utilized with embodiment's and are fully contemplated herein.

PPU 3023, which may further comprise instruction properties memory 3012 holding the instruction GDAPs 3014 associated with the instruction identified by PC 3006 obtained from the TU 3096. The 3012 and 3008 may be the same memory (just wider). The GDAPs 3018 in this example comprise compartment identifier of instruction $C_{PC}$ 3018 and other properties of instruction $R_{PC}$ 3018. The PPU 3023 may obtain the GDAPs of instruction operands $R_S$, $R_D$ 3024 from register file properties memory 3028. The GDAPs 3018 of instruction identified by PC 3006 and GDAPs 3030 of instruction operands $R_S$, $R_D$ 3024 are input to issue logic 3038.

The issue logic 3038 keeps synchronization with the issue logic 3040 so that GDAPs 3046 are associated with GD 3044 and GDAPs 3048 are associated with GD 3042. The $R_O$ 3064 may determine the output properties 3066 such that they are in relation with the input properties 3048. The GDAPs 3066 are associated with GD 3054. The GDAPs 3066 are input into the writeback path or unit (WBP) 3068, which may handle the $R_O$ 3064 results writeback via 3070 to the register file properties memory 3028. The PPU 3023 may have multiple writeback paths. The writeback path starting at 3098 may handle the cross-compartment store writeback operation. The writeback unit WBP 3003 with the writeback path 3007 to the properties memory 3088 may be the same entity as 3068 or they may be distributed and implemented as separate entities. The writeback path 3019 may also connect to register file properties memory 3028 (e.g., as seen in FIG. 30) to enable write back of the loaded data associated properties.

$m^{out}$ 3072 is mapping unit. For a given GD 3044, GDAP 3052 pair, it may deterministically produce a new GD 3076, GDAP 3074 pair. The mapping function (configuration) is defined by the policy (not explicitly shown). The TU 3021 output comprising GD 3044 is connected to the GD input of $m^{out}$ 3072. The PPU 3023 output 3046 is connected to GDAP input of $m^{out}$ 3072. $m^{out}$ 3072 is optional and if it does not exist its GD input 3044 is directly connected to its GD output 3076 and its GDAP input 3052 is connected to its GDAP 3074 output.

OPE 3078 includes GD input 3076, GDAP input 3074 and GDAP input 3060. The GDAP 3060 and GDAP (10*d*) keep association (synchronization) with GD input 3076. The OPE 3078 GD output 3080 is an input 3080 into the memory 3084 and GDAP output 3082 is a GDAP input into memory 3084. Memory 3084 may provide a way to access data 3086 and DAPs 3088. As elsewhere discussed, multiple implementations are possible, with single wide memory, separate data and DAP memories, logic, etc.

OPE 3094 (which may be the same as OPE 3078) includes GD input 3090, GDAP input 3092 and GDAP input 3062. The GDAP 3062 and GDAP 3092 keep association (synchronization) with GD input 3090. The OPE 3094 GD output 3096 may be feedback to memory 3084 and the OPE 3094 GDAP output 3098 may be feedback to memory 3084. The OPE 3094 GD output 3096 may be feedback to TU 3021 where the results are written to the appropriate destinations, e.g. memory 3084 as shown, or optionally register file 3026 and other internal TU 3021 structures as appropriate. Similarly, the OPE 3094 GDAP output 3098 may be feedback to PPU 3023 where the results are written to the appropriate destinations, e.g. DAP 3088 section or memory 3084 as shown, or optionally to register file associated properties memory 3028 and other internal PPU 3023 structures as appropriate. Again, the GDAP may comprise compartment identifiers and other data associated properties.

The embodiment of the system depicted may operate in the following manner. TU 3021 may fetch, decode, and issue a cross-compartment load instruction located at PC 3004 to logic with input 3044. PPU 3023 obtains GDAPs associated with cross-compartment load instruction and the instruction's operands. The GDAPs comprise of compartment identifiers marked with "C" and other properties excluding compartment identifiers marked with "P". Specifically, the properties of instruction located at PC 3006 $P_{PC}$ 3018 and the compartment identifier of instruction located at PC 3006 $C_{PC}$ 3018, the properties $P_{RS}$ and $P_{RD}$ 3030 associated with the values of operands $R_S$ and $R_D$ 3024, compartment identifiers $C_{RS}$ and $C_{RD}$ 3030 associated with the values of operands $R_S$ and $R_D$ 3024. For example, one implementation of PPU 3023 may be tightly integrated with TU 3021 such that the 3008 and 3012 are a part of one but wider memory. In this way, the synchronization is easily kept and no duplication of control logic is necessary. Memories (e.g., registers) 3026 and 3028 may be similarly structured.

The PPU 3023 may also be closely tied to the TU 3021. To illustrate, the PPU 3023 may leverage same control structures as the TU 3021. Depicted is an example of how cross-compartment "STORE $R_D$, $R_S$" instruction 3034 residing at PC 3004 address of instruction memory 3008 may be executed. Functionally, the instruction "STORE $R_D$, $R_S$" may read the value $V_S$ 3032 held in the $R_S$ register operand 3022 of the register file 3026. The "STORE $R_D$, $R_S$" may also read the value D 3036 held in $R_D$ register operand 3022 of the register file 3026. The value D 3036 may be an address or other location identifier in the memory 3084 to which the value $V_S$ 3005 may be written.

The execution of the cross-compartment instruction outside of TU 3021 may start with the issue logic 3040 passing required operand values S 3044, $V_S$ 3044 and control signal indicating a store operation 3044. The store operation may comprise initially a read from DAP memory 3088 at location D and followed by a write of value $V_S$ 3005 to location D of memory 3086. $m^{out}$ 3072 may be optional and operate as previously discussed. In this example it is implemented as a simple pass through (e.g., considered absent).

The OPE 3078 may similarly be optional in embodiments. In case it is not present 3076 connects to 3080 and 3074 connects to 3082. The OPE 3078 is a superset of $PG^{out}$ and may operate as in case as described with respect to FIG. 30. Specifically, it may be used to prevent side channel leaks forbidden by the outer policy, etc. It may also perform outer policy enforcement in case of explicit compartment identifiers.

The memory 3084 comprising DAP memory 3088 and data memory 3086 may be presented with the address D 3080 and control signals indicating read command 3080 from DAP memory 3088. The memories 3086 and 3088 may be a single memory with each word of memory holding both GDAPs and GD or distinct memories as discussed elsewhere. In this case the memory 3086 may not need to be accessed.

The DAP memory 3088 may output value $P_D$ and $C_D$ 3092 that may be held at the location D of DAP memory 3088. The location D, value $V_S$ and control signals 3080 may bypass memory 3086 and be an input 3090 into OPE 3094.

The D, $V_S$ 3090, $P_D$ and $C_D$ 3092 and other GDAPs 3062 are inputs into OPE 3094. As disclosed previously, the GDAPs may hold any information necessary for the OPE 3094 to check compliance with the (outer) policy.

The OPE 3094 may output D, $V_S$ 3096 and $P_R$, $C_R$ 3098 if $R_D$, $C_D$ 3092, $P_{PC}$, $C_{PC}$, $P_{RS}$, $C_{RS}$, $P_{RD}$, $C_{RD}$ 3060, D and $V_S$ 3090 are in relation with $P_R$, $C_R$ 3098 and in compliance with outer policy (as described previously). The compartment identifier $C_R$ 3098 and other properties $P_R$ 3098 may feedback 3011 into DAP memory 3088. This feedback may be realized through direct connection 3011 to 3088, or through connection 3007, or via PPU 3023 through connection 3015. The 3007 connection may enable reuse of same data path to DAP memory 3088. The 3015 connection may enable that the OPE 3078 performs the function of OPE 3094, in which case the 3092 and 3062 inputs to OPE 3094 are combined into 3098 connection. And line 3090 is passed through to 3096. The $C_R$, $P_R$ 3098 are associated (and kept in sync) with D, $V_S$ 3096, which may be feedback into the memory 3086. This feedback may be realized directly through 3009 or by sharing the same memory 3086 interface through 3009. In case OPE 3078 performs the function of OPE 3094 the feedback is achieved via TU 3021 through connection 3013.

In the case of store instruction with explicit compartment identifiers the OPE 3078 may make the determination about compliance with outer policy and in case such compliance the output 3080 may be written to memory 3086 and output 3082 may be written to DAP memory 3088. In such a case, the DAP memory 3088 output 3092 may not be present or it may comprise acknowledgement (especially if device 3088 may be connected through system interconnect or bus). Also, the memory 3086 output 3090 may not be present, or it may comprise an acknowledgement (especially if device 3088 may be connected through system interconnect or bus). The OPE 3094 may be optional or it may function as the OPE as described with respect to FIG. 29.

Embodiments of the system disclosed here may also be useful to protect against side channel leaks in case of a load instruction. In such case the read of memory 3086 may leak side channel information (e.g. if 3086 is a cache, etc.). In such case the properties associated with load address may need to be read from DAP memory 3088 first, so that the outer policy compliance determination may be made by OPE 3094 before the memory 3086 at load address may be read. The memory 3086 may then be accessed for read through 3005 or 3009 or even 3013 feedback connection. The loaded value may then be written back to register file 3026 passing through OPE 3094, writeback logic 3001 and connection not shown in FIG. 31 (but as shown and described with respect to FIG. 30). The DAP memory 3088 need only be accessed once for each load, so the connections 3007, 3011 or even 3015 are passed through DAP memory 3088 in a way that association with 3005, 3009 or 3009 are kept. As in the case of GD the GDAP may be simply passed through on the second pass of OPE 3094, such if the 3092 may be directly connected with 3098.

It will be understood the depicted embodiment is only one manner in which an embodiment may be integrated within a data processing device (e.g. CPU, GPU, etc.). Examples are described with explicit compartment identifiers and how store and load instructions may be implemented with common structures. Other configurations, options and architectures are possible and are fully contemplated herein. It will also be understood that a suitable design for a PPU for use with various embodiments may be contemplated by those of ordinary skill in the art after a review of the disclosure.

Embodiments as disclosed may also be usefully utilized in applications where data assurance is critical. In such cases it is often required (or beneficial) that data isolated to certain domain may only be processed by code isolated to the same domain. The cross-compartment control flow enables processing in multiple domains on a single device by allowing controlled (by outer policy) cross-compartment transfer of execution. For example, suppose that red, black, crypto separation is achieved by physically isolating functionality to 3 physically distinct devices. The device B performs cipher text interfacing, device C performs cryptographic operations and device R performs plain text interfacing. In this example, device B is connected to device C and device C is connected to device R. The encryption functionality is achieved by device R receiving plain text, which is then passed to device C for encryption, which is then passed to device B for transmission of cipher text. Such setup prevents any possibility of directly passing data from device R to device B (and vice versa) and thus makes it easier to show that any data from device R will always be encrypted when leaving the system on device B. Since the only connection of device R to device B goes through device C, it is sufficient to trust (prove) that device C correctly encrypts all the data it receives from device R.

Figure 32:
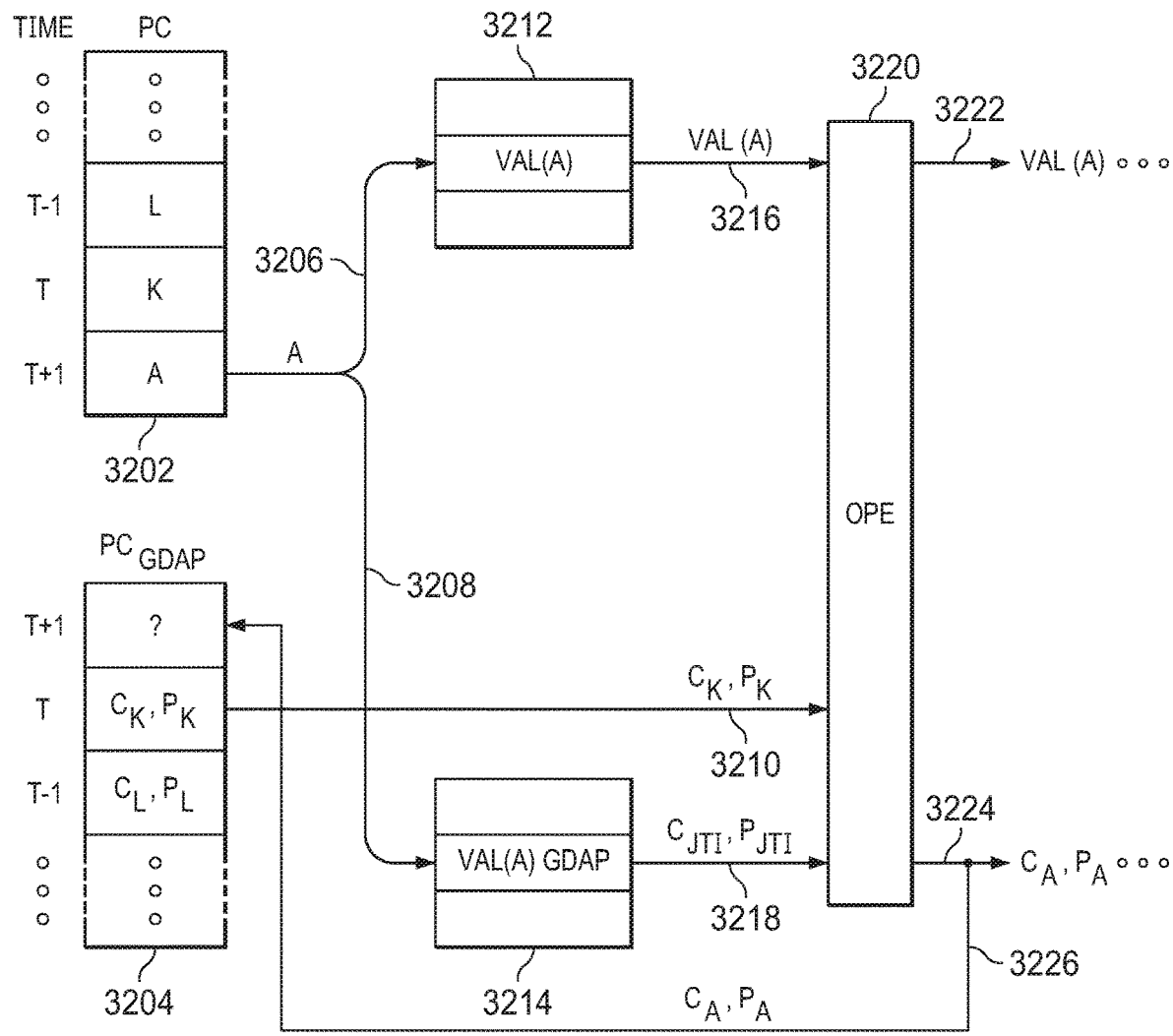
FIG. 32 is a block diagram depicting an embodiment of a cross compartment control flow system.

The cross-compartment control flow system shown in the embodiment depicted in FIG. 32 enables single device with multiple compartments to maintain data assurance guarantees comparable to physical separation. For example, code running in compartment R may only process the data in compartment R. The transfer of execution (and data) from compartment R to compartment C is limited to transfers explicitly allowed by a policy. The policy may be very restrictive, limiting cross-compartment control flows to specific "from" address, "to" address and compartment pairs, number of transfers, etc. In this way it is easy to prevent direct R to B compartment transfers of data and control flows (simply by not allowing any such transfers in the policy), consolidate three physical devices into one device with three compartments while retaining desired e.g. data movement restrictions.

Specifically, the embodiment of the system in FIG. 32 comprises Table (T1) showing values of PC address in column (C2), values in instruction memory at PC address VAL(PC) in column (C3), GDAP associated with values at PC addresses VAL(PC), GDAP in column (C4), GDAP of PC addresses in column (C5), all at different time steps (e.g. cycles) as shown in column (C1). The time indicated in table (T1) and next to 3202 and 3204 is only indicative and for illustration purposes to show which values "belong" together. In real-world realizations, it may not be possible nor required to guarantee that all values change at the same time. Also in, for example, a pipelined design, asynchronous and synchronous logic designs, column (C1) may have a meaning of a step or an association or similar. What may be important is that there are data flow (or information flow) dependencies, which are evident from the descriptions of operation.

There may be a distinction between GDAP of the value at PC address (C4), which is the GDAP associated with an instruction (C3) and PC GDAP (C5) which is GDAP associated with PC address (C2). The column (C5) is the GDAP of address that points to location where instruction (C3) is located and (C4) is the GDAP of the instruction (C3) itself.

The system may also include Program Counter (PC) and fetch logic 3202 and PC GDAP logic 3204. The PC fetch logic 3202 output 3206 may be an input of the instruction memory 3212 and the PC fetch logic 3202 output 3208 may be an input of the instruction GDAP memory 3214. The "TIME" column next to 3202 indicates the values of PC 3206 at the indicated time. The "TIME" column next to 3204 indicates the values of PC GDAP 3210 at the indicated time.

Instruction memory 3212 may hold the instructions. The value at PC address A 3206 of the instruction memory 3212 may be a (e.g., non-decoded) instruction 3216. The instruction GDAP memory 3214 may hold instruction-associated properties. The value at PC address A 3208 of instruction GDAP memory 3214 may hold the properties 3218 associated with the instruction VAL(A) 3216. OPE 3220 may include GD input 3216, GDAP inputs 3210 and 3218, GD output 3222 and GDAP output 3224 that is also feedback 3226 to PC GDAP 3204.

In operation, instructions may be executed on a data processing device (e.g. CPU, GPU, etc.). Instructions are thus fetched (loaded) from the instruction memory 3212 at location indicated by PC 3206 output of PC and fetch logic 3202. Such a fetch may be performed while previous instructions (in this example, instructions at PC address K, L) may still be executed by the processor. The instructions may even be fetched speculatively.

PC 3208 may also be an input into instruction properties memory 3214. As discussed, the memory holding instructions 3212 and the memory holding their properties 3214 may be physically the same single physical memory or the memories 3212 and 3214 may consist of multiple physical memories.

The PC with value A 3206 at time step T+1 may only be known after the relevant results (e.g., including side effects) of an instruction fetched in previous time step T were resolved. For example, the value A of PC at time T+1 may only be conclusively determined after the previous instruction's PC effecting outcomes are known, and the PC at time T+1 may be conclusively determined as a function of K (PC at time step T), outcomes of instruction at PC address K ("XJUMP A"), etc.

As a further example, in case of pre-fetching, speculative fetching, speculative execution, etc., the side effects of instruction that may have been speculatively executed need to be reverted, as if it was never (attempted) to be executed. This is one of the reasons embodiments are described in a non-speculative model of data processing device with steps necessary to implement it in e.g. speculative fetching, execution, etc. clear to a person familiar with functioning of such speculative techniques in a data processing device.

In the time step T, the VAL(K) at output 3216 comprising instruction "XJUMP A" and fetched from PC 3202 address K may be executed after it may have passed the OPE 3220 on its 3222 output. The OPE 3220 output 3224 may hold the VAL(K) associated properties comprising compartment identifier $C_K$ and other GDAP's $P_K$. The instruction "XJUMP A" is executed with PC value K and PC GDAP comprising $C_K$ and $P_K$. In other words, the "XJUMP A" instruction starts execution and is executed within the context of compartment $C_K$. As is described further down the "XJUMP A" instruction may, according to policy and as enforced by OPE 3220, change the compartment in which the next instruction may be executed in.

In this example, the jump to absolute address instruction "XJUMP A" instructs the processor to continue execution at PC address A. The details how a new PC may be determined from current one are not material to the invention. It is only important that there is a way to determine the PC of value of the next instruction. Other variants (e.g., non-jump and non-branch instruction, exception entry or exit instructions, conditional branch instructions, relative jump, or branch instructions, etc.) are possible and may be handled in a similar manner.

FIG. 32 shows a scenario when the next PC following "XJUMP A" instruction execution may already be known. Initially, for example, only the next PC value A 3206 may be known. Next, the instruction 3216 located at PC address A 3206 in instruction memory 3212 may be read. Also, the GDAP value associated with the instruction at PC location A 3208 may be read from instruction properties memory 3214.

The value of instruction memory 3212 at location A 3206 comprises instruction VAL(A) 3216 which is output 3216 from instruction memory 3212. The value of instruction properties memory 3214 at location A 3208 comprises instruction associated properties $C_{JTI}$, $P_{JTI}$ 3218 which are output 3218 from instruction properties memory 3214. OPE 3220 may determine the output 3222 and 3224 in compliance with (outer) policy as previously described. Optionally and as previously described it may also, for example, decrypt, authenticate, etc. the VAL(A) on its 3216 input, and output 3222 potentially modified VAL(A) as appropriate. The OPE 3220 GD output 3222 in time step T+1 may comprise value VAL(A) 3222. In the example shown in FIG. 32 the OPE 3220 GDAP output 3224 in time step T+1 comprises $C_A$, $P_A$ 3224 which are associated with VAL(A) 3222.

OPE 3220 GDAP output 3224 may hold the value of PC GDAP at time T+1 and it is feedback 3226 to PC GDAP 3204. The $C_A$, $P_A$ are GDAP's of the "JTI" instruction that may be executed in the time step T+1. This means that the "JTI" instruction executes in the context of $C_A$ compartment. The PC with value A of the instruction "JTI" has $C_A$ and $P_A$ properties associated with it. These may be used to enforce separation of information flows. The processing of instructions may continue from 3222 and 3224 e.g., through decode logic, issue, execute, writeback, etc., as previously disclosed and is typical in operation of processing devices.

In a simple architectural model of a data processing device, PC 3202 may be changed after execution of each instruction, often incremented in case of a non-jump, non-branch, and non-exception, etc. instructions and changed in a non-linear way in case of jump, branch, exception, etc. instructions. However, normally all instructions modify the PC and may be in context of this invention understood as PC altering or jump instructions. The physical implementation of a data processing device as utilized with embodiments may use a range of techniques (e.g. branch prediction, pre-fetching, etc.) that improve performance and present a fiction of execution in a simple architectural model to run software on such device. Embodiments have been described in a context of simple processing device model. It is however understood that embodiments are compatible with a wide variety of techniques used in data processing device design to improve performance. The integration of embodiments with data processing devices implementing various performance enhancement techniques will be well understood to a person familiar with this disclosure and the operation of such performance enhancing techniques and are fully contemplated herein.

Embodiments such as those shown in FIG. 32 may also be optimized for cases where same compartment execution is predominant. Since the majority of instructions in typical code are expected not to cross the compartment boundary, it may be beneficial to optimize for such common case.

Embodiments may thus achieve such optimization by the following modification of the following operations previously disclosed with respect to FIG. 32. Here, cross-compartment control flow instructions may have distinct opcodes and are the only instructions allowed to transfer execution between different compartments. As a part of its usual operation, the decode logic connected to the OPE 3220 output 3222 may detect a cross-compartment control flow instruction and output a signal indicating a cross-compartment property. The detection of cross-compartment control flow instruction may also be performed by the OPE 3220 itself, by feeding the appropriate bit(s) of VAL(A) input 3216 to the $R_O$ input, which then generates the additional GDAP property indicating cross-compartment control flow instruction. Such additional GDAP property may be a part of the output 3224 that is feedback to 3204.

In such an embodiment, OPE 3220 may be optimized to only do a full $R_O$ lookup in the case when its 3210 input PC GDAP indicates the cross-compartment control flow instruction. If a cross-compartment control flow instruction is not indicated, the OPE 3220 may assert that the compartment identifier on OPE 3220 input 3210 is equal to the compartment identifier on OPE 3220 input 3218 and trigger an enforcement action if the assertion is not met.

The embodiment shown in FIG. 32 may also be optimized to rely on an explicit compartment identifier encoded in a cross-compartment control flow instruction. In such a case, the lookup in 3214 may be avoided and simplifying the logic, improving performance, area, and efficiency of the solution.

Such an optimization of the embodiment shown in FIG. 32 by the following modifications. Memory 3214 may not be included such an optimized embodiment. Here, cross-compartment control flow instructions may have an explicit operand(s) specifying the information otherwise present in 3214. In FIG. 32, the "XJUMP A" instruction would thus be replaced with the "XJUMP A, $C_{JTI}$, $P_{JTI}$" instruction. The $C_{JTI}$ and $P_{JTI}$ operands may thus be available at the same time or earlier than the "A" operand specifying the next instruction PC. The $C_{JTI}$ and $P_{JTI}$ may thus be determined and routed in same way as the "A" operand. PC location A 3208 would thus comprise $C_{JTI}$ and $P_{JTI}$ and connects directly to 3218.

Embodiment's as described with respect to FIG. 32 may thus be combined with previously disclosed embodiments into an optimized controlled cross-compartment control flow with explicit compartment identifier. It should be noted here, that as with respect to other FIGURES presented the "$P_{JTI}$" and the GDAPs other than compartment identifiers may, or may not be, utilized.

It should also be noted that the memories (including the memories) discussed herein may include almost any storage device or location, including embedded memories, memories accessible through system interconnect or buses, other devices (including other data processing devices) accessible through a system interconnect or bus or other communication methodology, or any combination thereof.

Additionally, while embodiments have been described with respect to certain instructions, embodiments may be applicable generally to any instructions achieving cross-compartment effects including a variety of "MOV" or "COPY" instructions or the like (e.g., instructions that read from source memory location, write to destination memory location, etc.), "LOAD" instructions (e.g., instructions that read from source memory location), "STORE" instructions (e.g., instructions write to destination memory location) with, for example, direct addressing, indirect addressing, offset addressing, etc. In addition, embodiments may also apply to intra-compartment instructions that achieve effects not possible through inner relations (or not compliant with inner policy),for example, the downgrade functionality. Embodiment may also apply in a similar manner to cross-compartment control flow instruction, where the invention applies to any instruction triggering control flow or execution flow to the cross-compartment boundary.

Moreover, a number of potential implementation options exist for implementing the features of embodiments and for implementing systems that embody such concepts. However, it should be noted that these and other embodiments of the concepts discussed herein can be implemented in many ways without loss of either generality or of functional correctness or completeness. Additionally, several potential utilities for such a novel system have also been disclosed, however, there are many other potential options for utilizing the advances described above in a wide variety of use cases.

More generally then, although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention.

Reference throughout this specification to "one embodiment," "an embodiment," or "a specific embodiment," "a specific implementation," or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description, numerous specific details are provided, such as examples of components or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Any suitable programming language can be used to implement the routines, methods or programs of embodiments of the invention described herein, including Verilog, C, C++, Java, assembly language, etc. Different programming techniques can be employed such as procedural or object oriented. Data may be stored in a single storage medium or distributed through multiple storage mediums, and may reside in a single database or multiple databases (or other data storage techniques A "computer-readable medium" may be any medium that can contain, store, communicate, propagate, or transport the program for use by or in connection with the instruction execution system, apparatus, system or device. The computer readable medium can be, by way of example, only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code).

Furthermore, the term "or" as used herein is generally intended to mean "and/or" unless otherwise indicated. As used herein, a term preceded by "a", "an" or "a set" (and "the" when antecedent basis is "a" or "an") includes both singular and plural of such term (i.e., that the reference "a", "an" or "a set" clearly indicates only the singular or only the plural). Also, as used in the description herein, the meaning of "in" includes "in" and "on" unless the context clearly dictates otherwise.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed:

1. A system for data driven secure computing, comprising:
a computing system including:
a processor;
a memory; and
an outer policy enforcer operating according to an outer policy, the outer policy enforcer comprising logic for receiving an input datum associated with a transaction for that input datum between a source compartment and a destination compartment, receiving a first data associated property distinct from the input datum that is synchronized with the input datum and specific to that input datum, and receiving a second data associated property distinct from the input datum that is synchronized with the input datum and specific to that input datum, wherein the first data associated property is associated with a first compartment identifier specifying the source compartment for the input datum associated with the input data and the second data associated property is associated with a second compartment identifier specifying the destination compartment for the input datum associated with the input data, the outer policy enforcer adapted to: determine when an output datum and a first associated output data associated property can be sent to the destination compartment based on the outer policy, and when the output datum and the associated output data associated property can be sent to the destination compartment synchronously outputting the output datum on a output datum line and the associated first output data associated property on an output data associated line, and when the output datum cannot be sent to the destination compartment, outputting an enforcement action.

2. The system of claim 1, wherein the outer policy enforcer comprises relation logic adapted to receive the first data associated property and the second data associated property, wherein the relation logic is adapted to determine compliance with the outer policy based on the first data associated property and the second data associated property and output a second output data associated property based on the outer policy and the first data associated property or the second data associated property.

3. The system of claim 1, wherein the second output data associated property signals whether transaction is allowed by the currently set policy.

4. The system of claim 2, wherein the relation logic is a lookup table.

5. The system of claim 4, wherein the lookup table is populated based on the outer policy.

6. The system of claim 5, wherein the lookup table includes a default data associated property and the relation logic is adapted to output the default data associated property if no entry in the lookup table is associated with the first data associated property or the second data associated property.

7. The system of claim 6, wherein the default data associated property signals a forbidden transaction.

8. The system of claim 2, wherein the first data associated property or the second data associated property comprise an address associated with the source compartment or the destination compartment.

9. The system of claim 2, wherein the first data associated property or second data associated property comprises a first data confidentiality level.

10. The system of claim 9, wherein the first output data associated property comprises a second data confidentiality level associated with the output datum.

11. The system of claim 10, wherein the outer policy enforcer comprises outer perimeter guard logic adapted to determine the associated first output data associated property based on the second output data associated property from the relation logic.

12. The system of claim 11, wherein the outer perimeter guard is a switch.

13. The system of claim 2, wherein the input datum comprises an instruction for a transformation unit coupled to the outer policy enforcer.

* * * * *